(12) United States Patent
Lebo et al.

(10) Patent No.: US 12,024,270 B2
(45) Date of Patent: Jul. 2, 2024

(54) MARITIME VEHICLE SYSTEMS AND METHODS

(71) Applicant: ANDURIL INDUSTRIES, INC., Costa Mesa, CA (US)

(72) Inventors: William Timothy Lebo, Costa Mesa, CA (US); Timothy George Raymond, Costa Mesa, CA (US); John Joseph Fisher Junior, Costa Mesa, CA (US); Jeffrey Alan Wylie, Costa Mesa, CA (US); Hayden Allen Henderson, Costa Mesa, CA (US); Samuel John Russo, Costa Mesa, CA (US); Jerrold Sgobbo, Costa Mesa, CA (US); Noah Michael Bracci, Costa Mesa, CA (US); James Gabriel Buescher, Costa Mesa, CA (US); Izirlei Guimaraes Filho, Costa Mesa, CA (US); Edward Anthony Celkis, Costa Mesa, CA (US)

(73) Assignee: ANDURIL INDUSTRIES, INC., Costa Mesa, CA (US)

(*) Notice: Subject to any disclaimer, the term of this patent is extended or adjusted under 35 U.S.C. 154(b) by 320 days.

(21) Appl. No.: 17/403,307

(22) Filed: Aug. 16, 2021

(65) Prior Publication Data
US 2021/0371067 A1    Dec. 2, 2021

Related U.S. Application Data

(63) Continuation of application No. PCT/US2021/012223, filed on Jan. 5, 2021, which is
(Continued)

(51) Int. Cl.
*B63G 8/04*    (2006.01)
*B29C 64/393*    (2017.01)
(Continued)

(52) U.S. Cl.
CPC ............. *B63G 8/04* (2013.01); *B33Y 80/00* (2014.12); *B63G 8/001* (2013.01); *B63G 8/08* (2013.01);
(Continued)

(58) Field of Classification Search
CPC . B63G 8/00; B63G 8/001; B63G 8/04; B63G 8/08; B63G 2008/004; B33Y 10/00;
(Continued)

(56) References Cited

U.S. PATENT DOCUMENTS 5,381,751 A * 1/1995 Richards ................ B63G 8/001
                                                    114/264
5,613,460 A * 3/1997 Stallard, III ............ B63G 8/30
                                                    114/321
(Continued)

FOREIGN PATENT DOCUMENTS

| CN | 108058797 A | 5/2018 | |
|---|---|---|---|
| IN | 472KP2015 A | 12/2017 | |
| WO | WO-2022251910 A1 * | 12/2022 | ............. F42B 33/00 |

OTHER PUBLICATIONS

First Examination Report for Indian Patent Application No. 202117022510 dated Nov. 16, 2022 (6 pages).
(Continued)

*Primary Examiner* — Daniel V Venne
(74) *Attorney, Agent, or Firm* — Polsinelli PC

(57) ABSTRACT

Implementations described and claimed herein provide an underwater vehicle includes a vehicle body having a frame enclosed by a fairing. The vehicle body extends between a proximal end and a distal end and defining an interior. A nose is disposed at the proximal end of the vehicle body. The nose has a tow system configured to move between a tow position and a stow position. A propulsion system is disposed at the distal end of the vehicle body. The propulsion system
(Continued)

includes a plurality of control fins and a thruster. A power distribution system is housed in the interior of the vehicle body. The power distribution system includes a first power system housed in a first pressure vessel and a second power system housed in a second pressure vessel. The first pressure vessel is isolated from the second pressure vessel.

19 Claims, 45 Drawing Sheets

Related U.S. Application Data a continuation-in-part of application No. 16/675,446, filed on Nov. 6, 2019, now Pat. No. 11,091,227.

(60) Provisional application No. 62/957,478, filed on Jan. 6, 2020, provisional application No. 62/769,747, filed on Nov. 20, 2018.

(51) Int. Cl.
  *B29L 31/30* (2006.01)
  *B33Y 10/00* (2015.01)
  *B33Y 50/02* (2015.01)
  *B33Y 80/00* (2015.01)
  *B63G 8/00* (2006.01)
  *B63G 8/08* (2006.01)

(52) U.S. Cl.
  CPC ..... *B29C 64/393* (2017.08); *B29L 2031/3073* (2013.01); *B33Y 10/00* (2014.12); *B33Y 50/02* (2014.12); *B63G 2008/004* (2013.01)

(58) Field of Classification Search
  CPC ....... B33Y 80/00; B33Y 50/02; B29C 64/393; B29L 2031/3073; B63B 3/13; B63B 3/36; B63B 2003/145; B63B 2211/02
  USPC ................................ 114/312, 313, 337, 342
  See application file for complete search history.

(56) References Cited

U.S. PATENT DOCUMENTS

| | | | |
|---|---|---|---|
| 5,852,984 A | 12/1998 | Matsuyama et al. | |
| 6,581,537 B2* | 6/2003 | McBride | B63H 11/04 |
| | | | 114/337 |
| 10,184,762 B2* | 1/2019 | Summers | F42B 10/38 |
| 2006/0225810 A1 | 10/2006 | Baylot et al. | |
| 2014/0053768 A1 | 2/2014 | Brizard | |
| 2014/0152455 A1 | 6/2014 | Giori et al. | |
| 2018/0222560 A1 | 8/2018 | Postic et al. | |
| 2018/0327057 A1 | 11/2018 | Pastor et al. | |

OTHER PUBLICATIONS

International Search Report and Written Opinion of The International Searching Authority for International Application No. PCT/US2021/012223 dated Apr. 23, 2021 (11 pages).

Extended European Search Report for Application No. 19886967.9 dated Jul. 14, 2022 (8 pages).

* cited by examiner

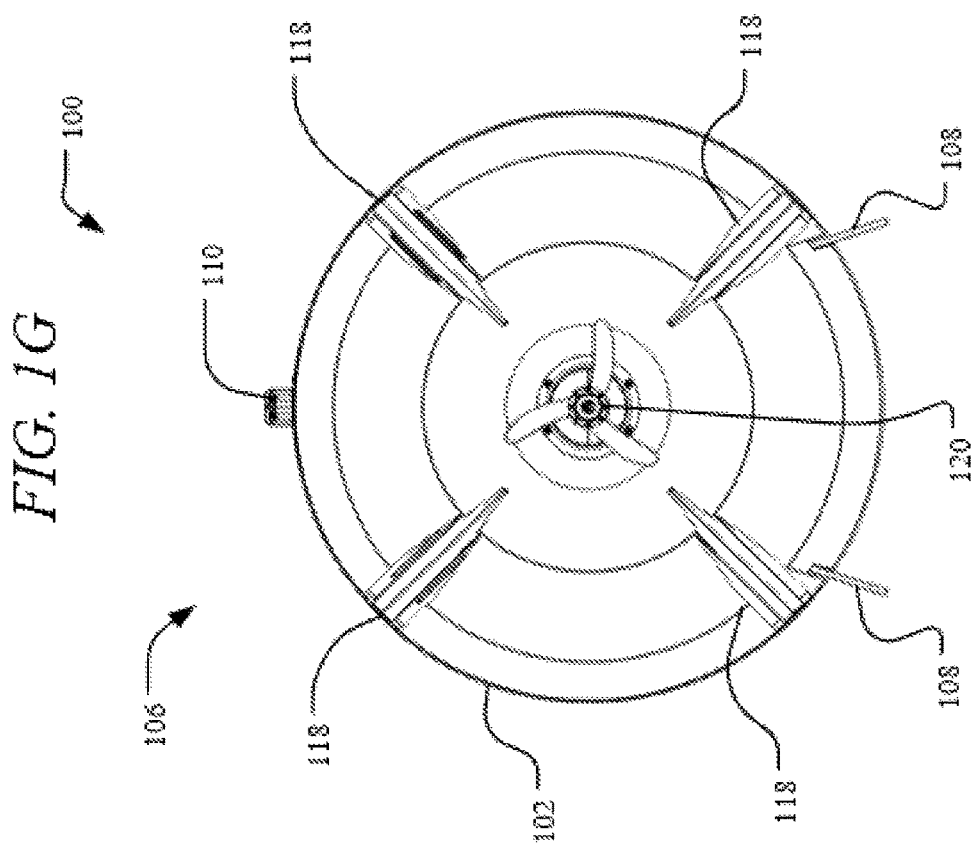
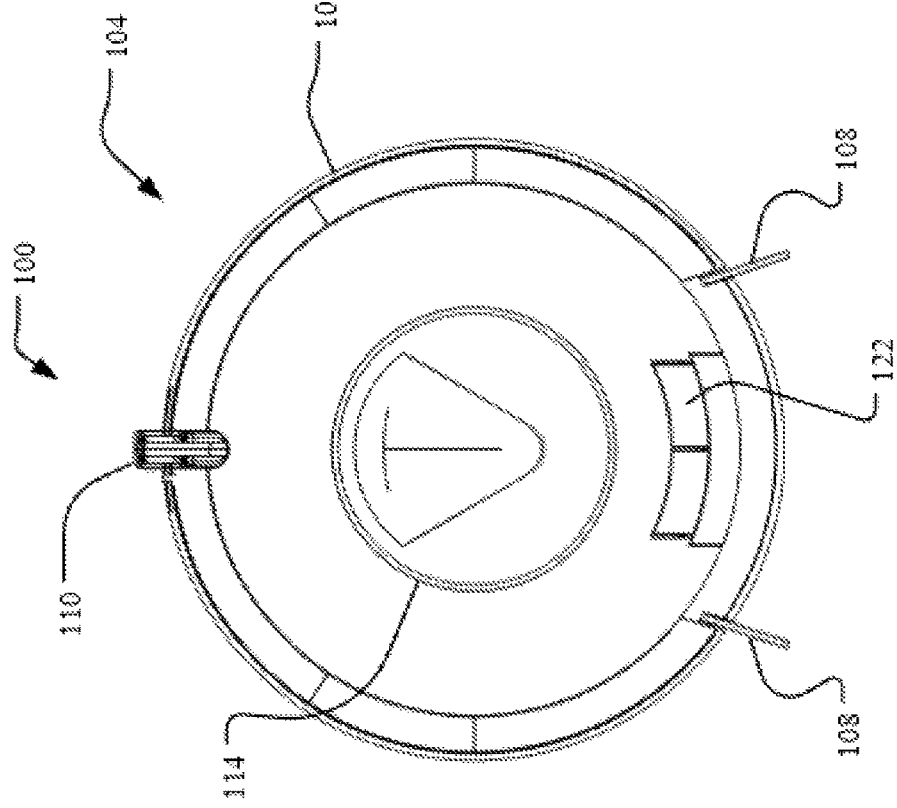

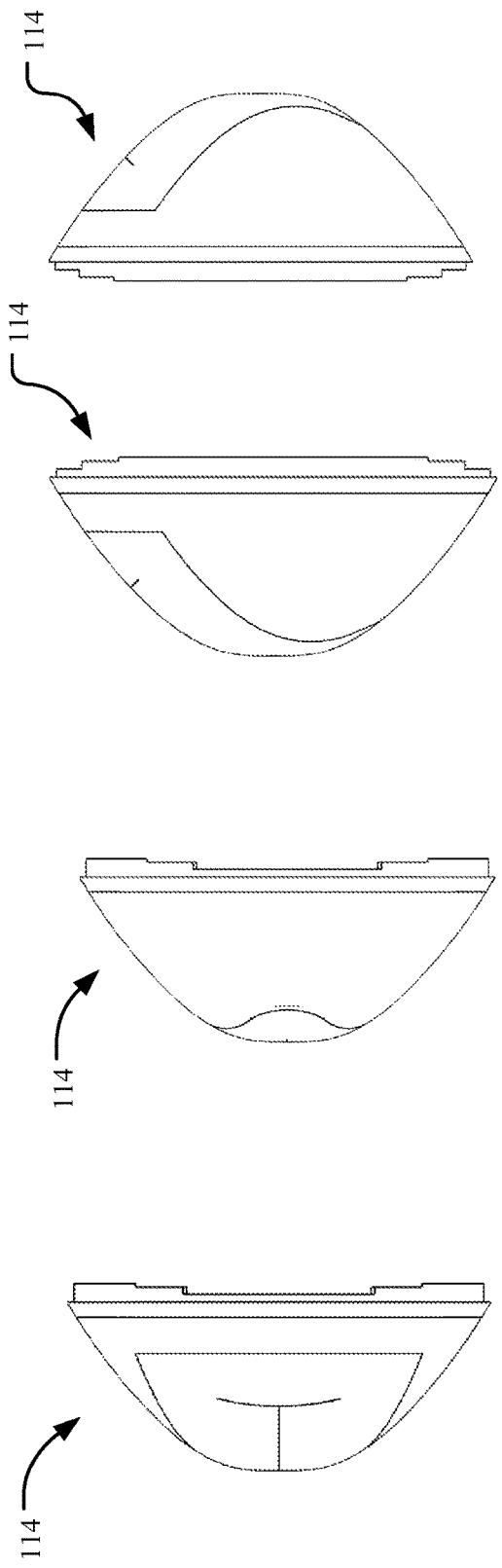
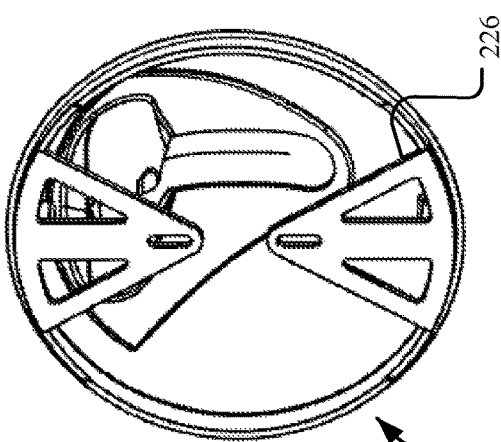
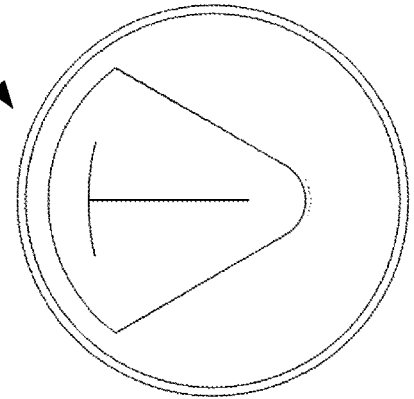
FIG. 3C   FIG. 3D   FIG. 3E   FIG. 3F
FIG. 3G   FIG. 3H   FIG. 3I

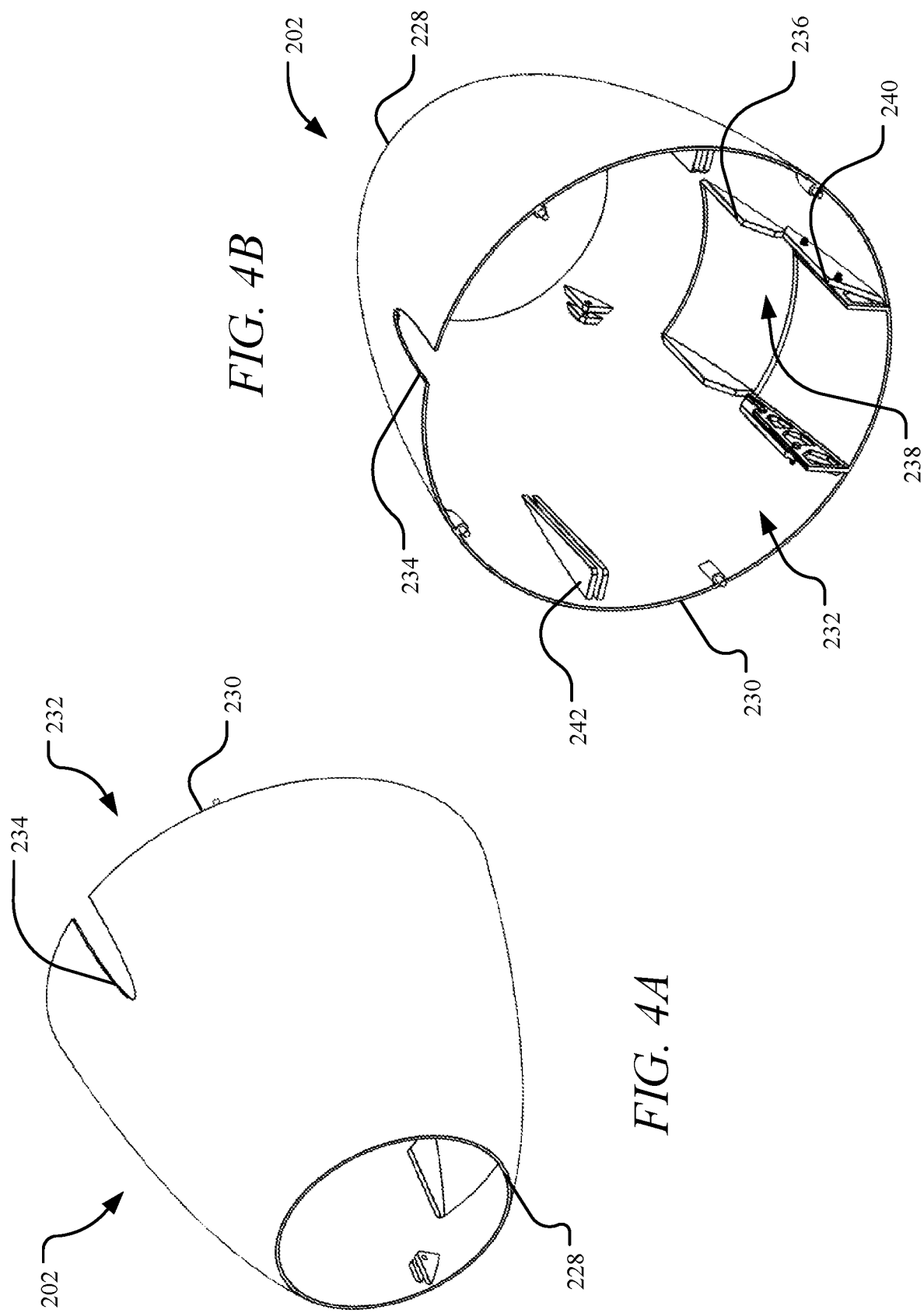

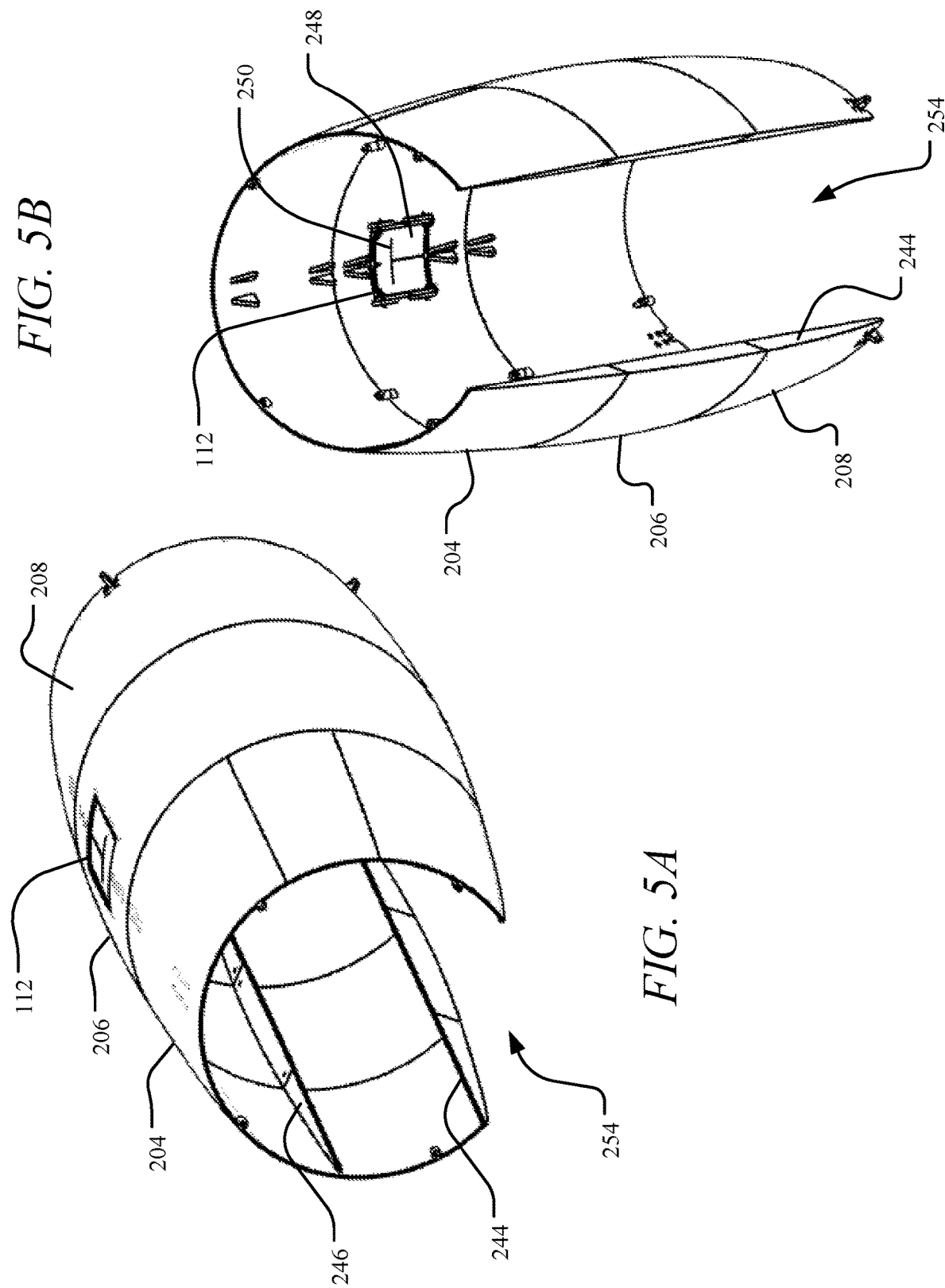

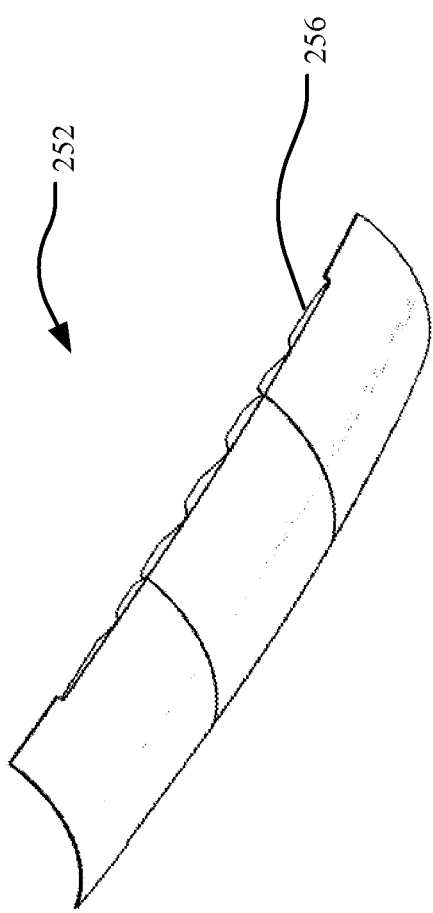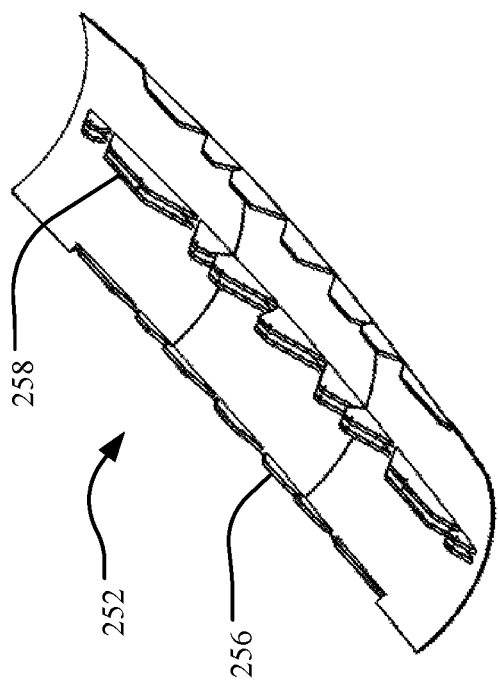
FIG. 6B
FIG. 6A

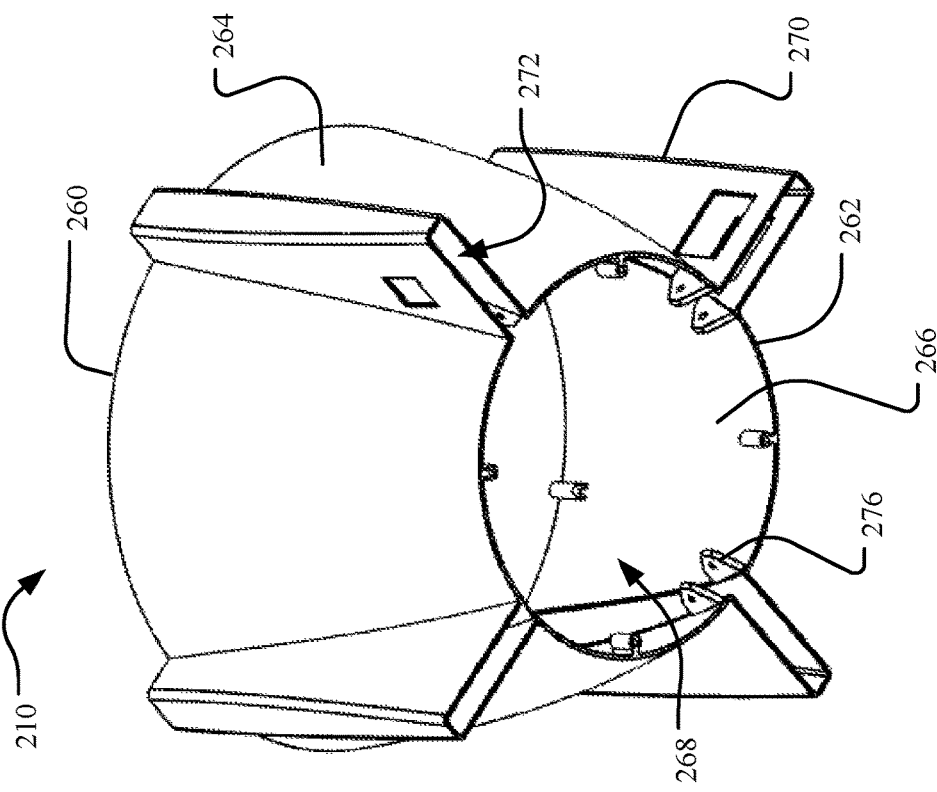
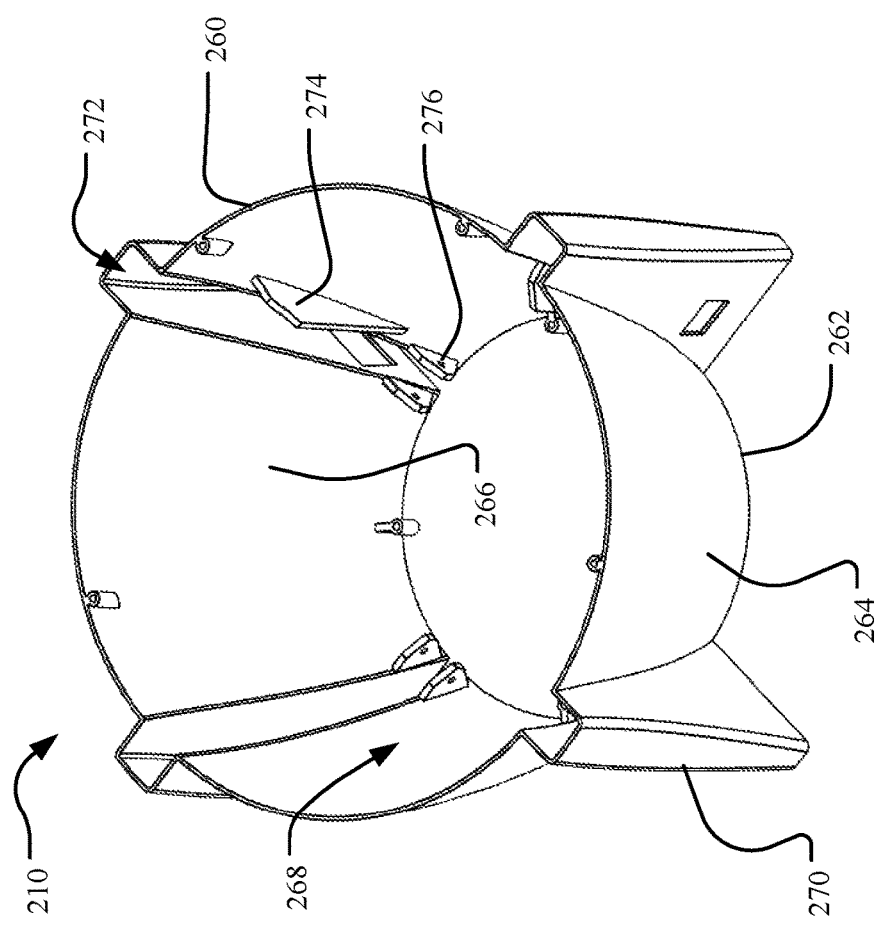

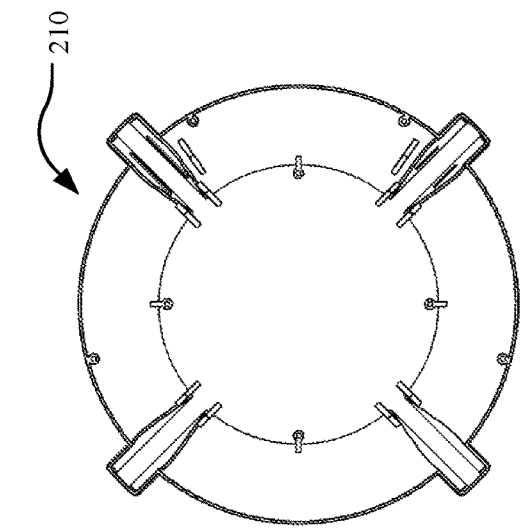
FIG. 7C
FIG. 7E
FIG. 7G
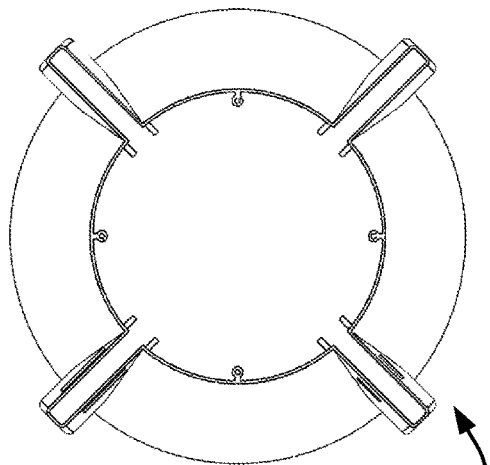
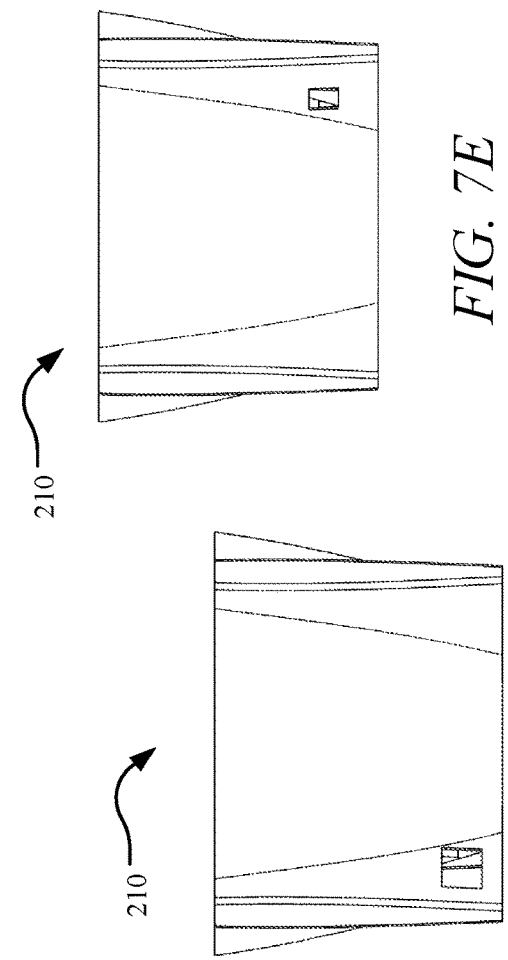
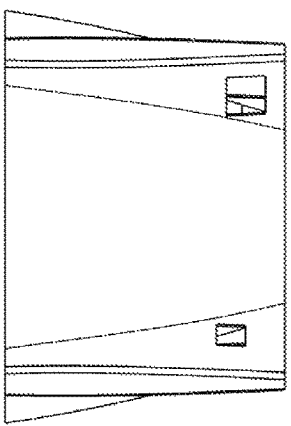
FIG. 7D
FIG. 7F
FIG. 7H
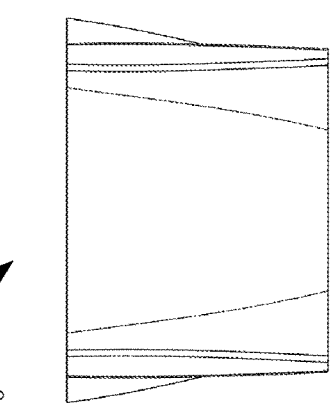

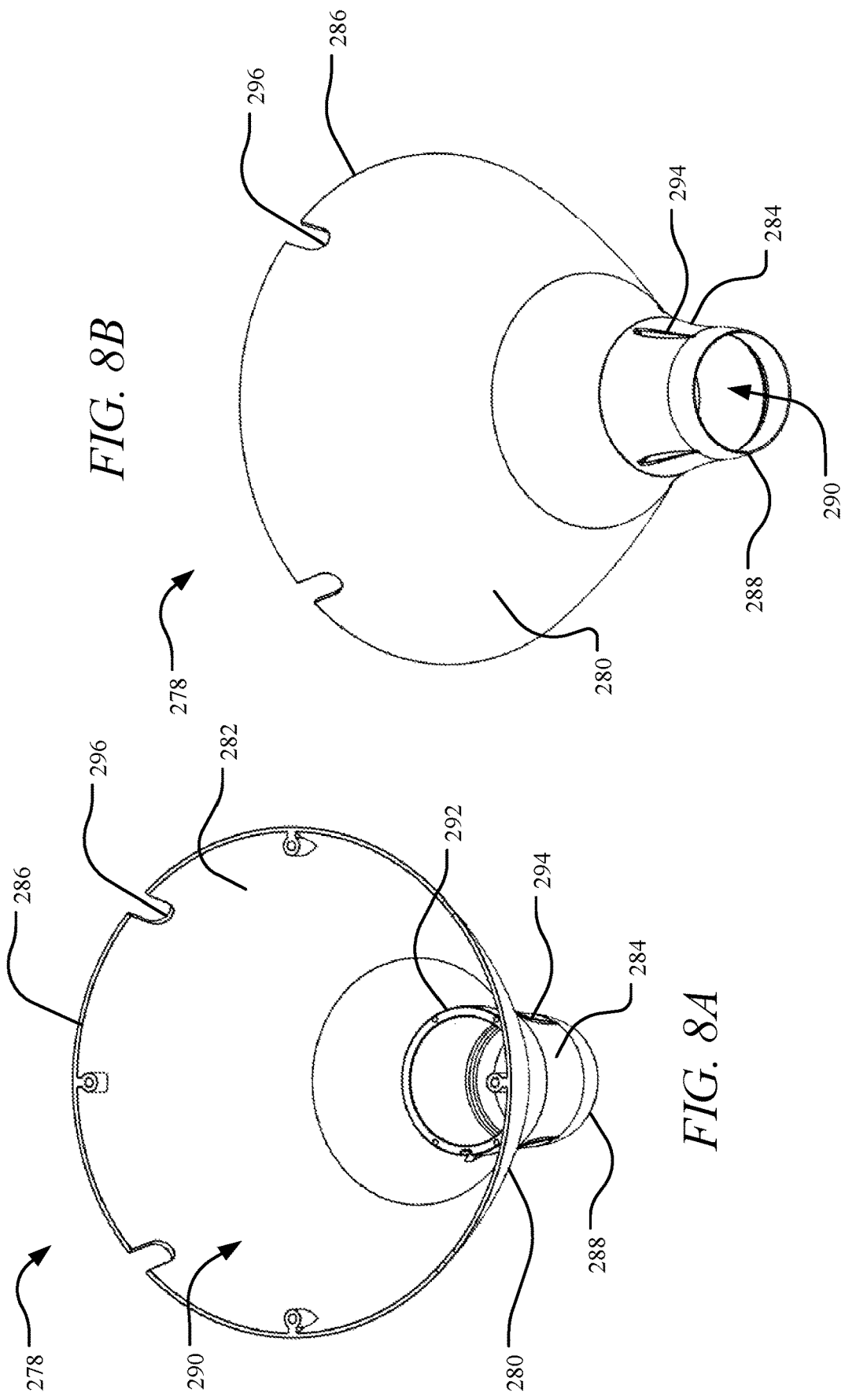

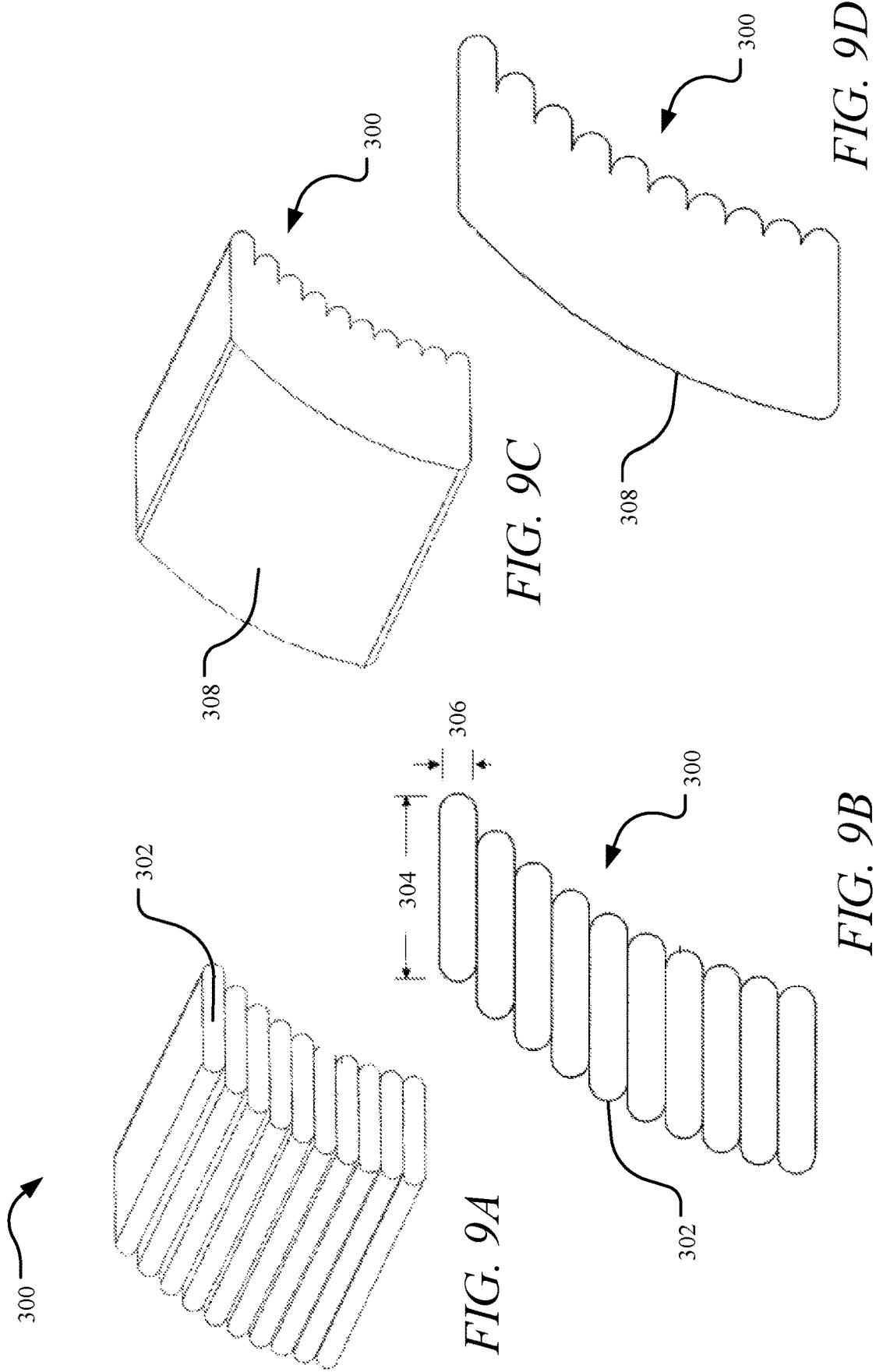

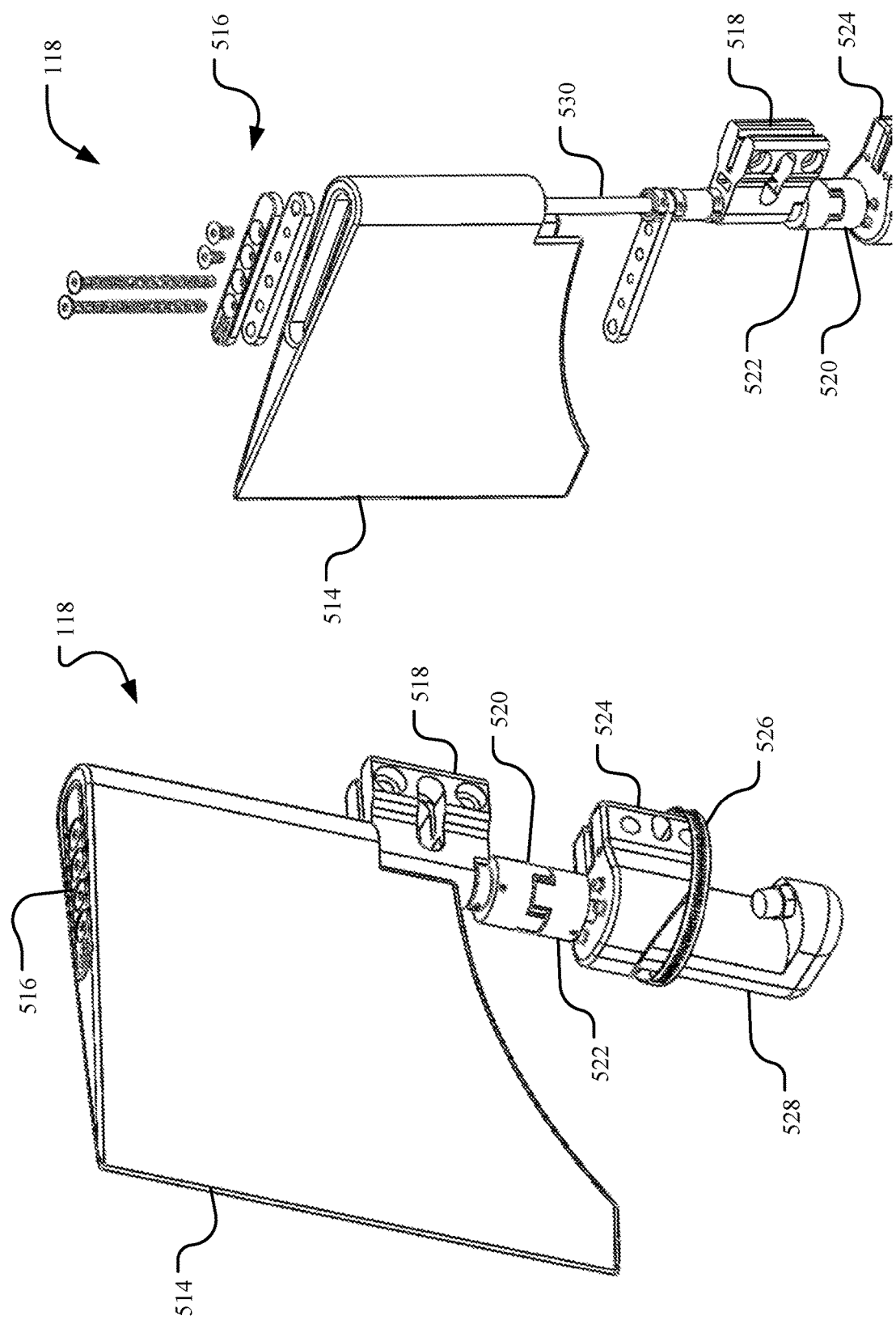

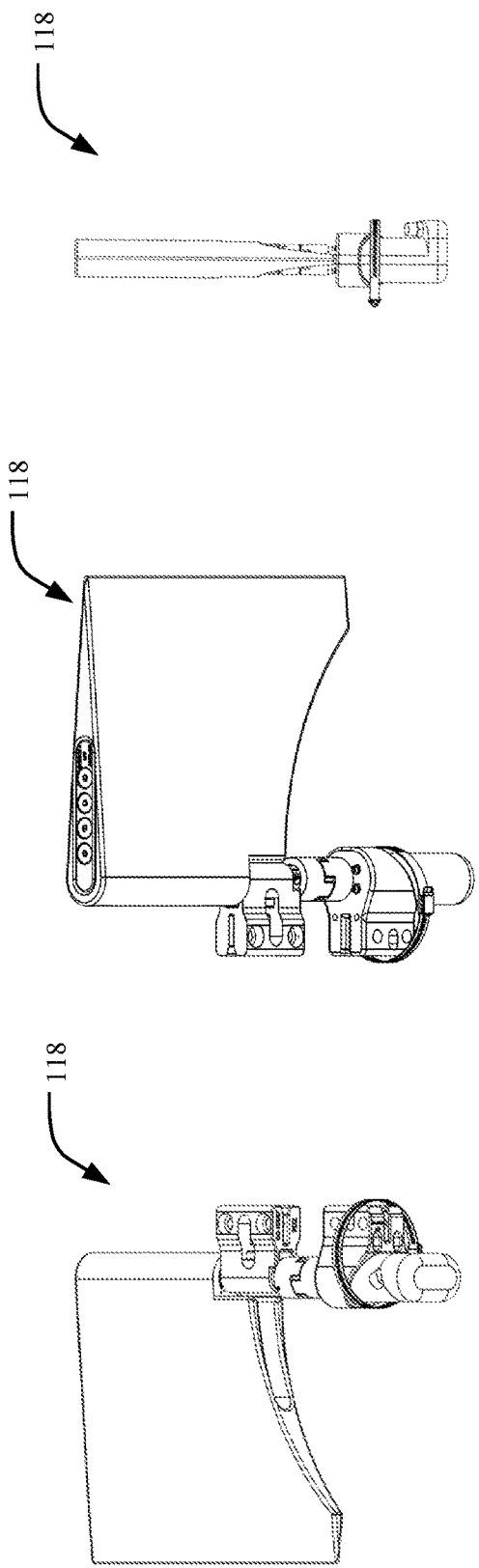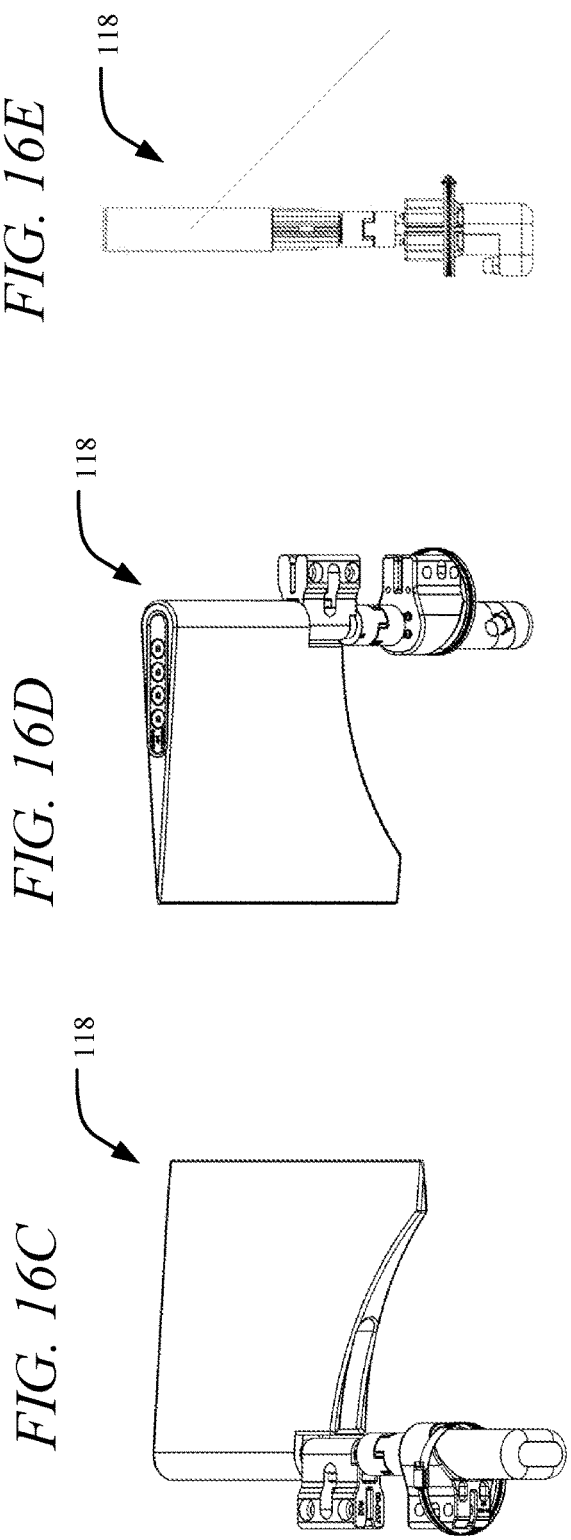

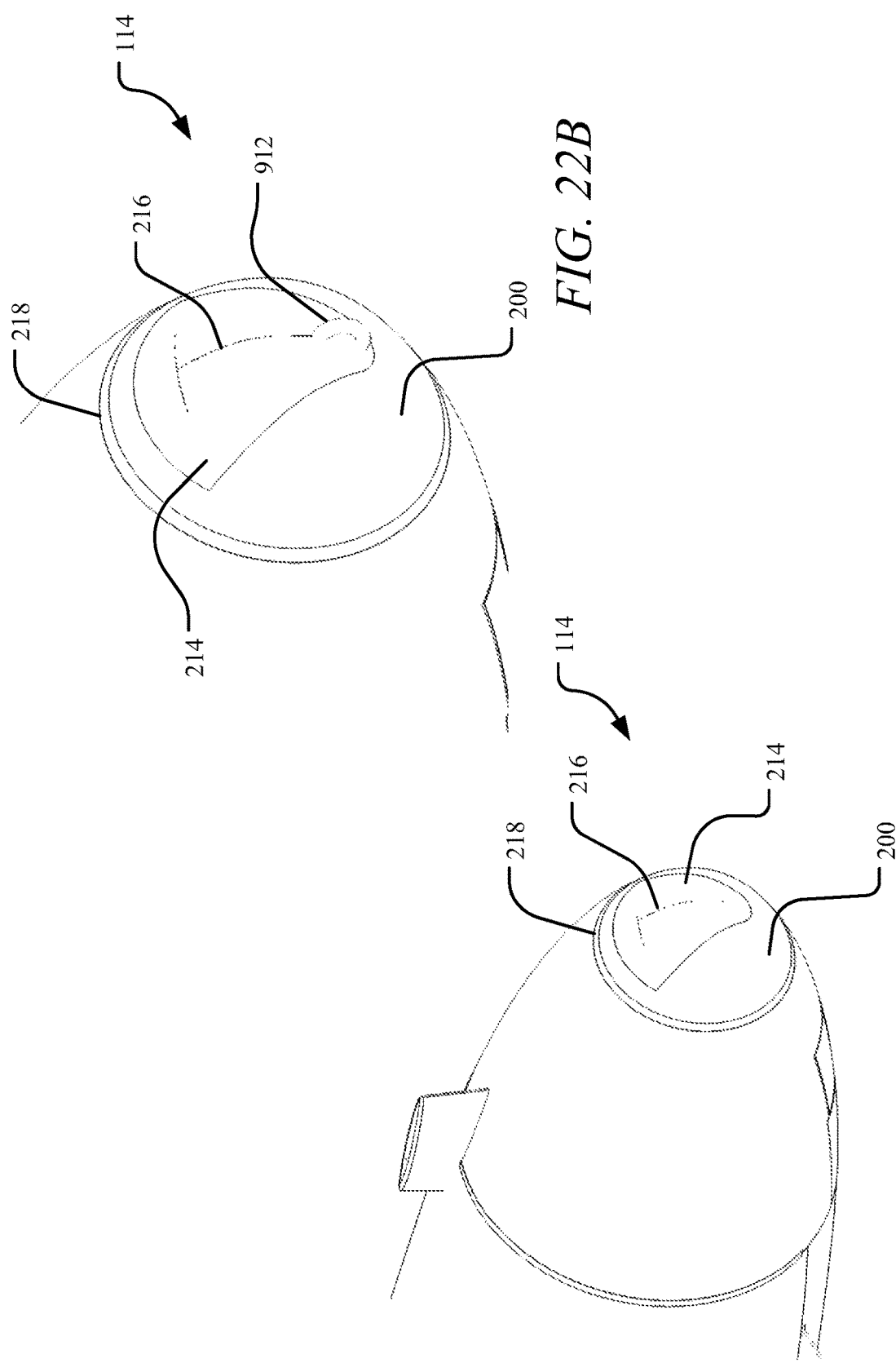

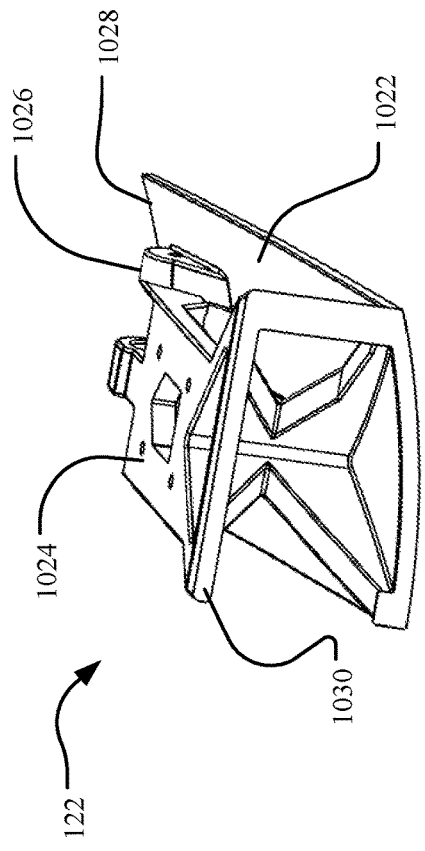
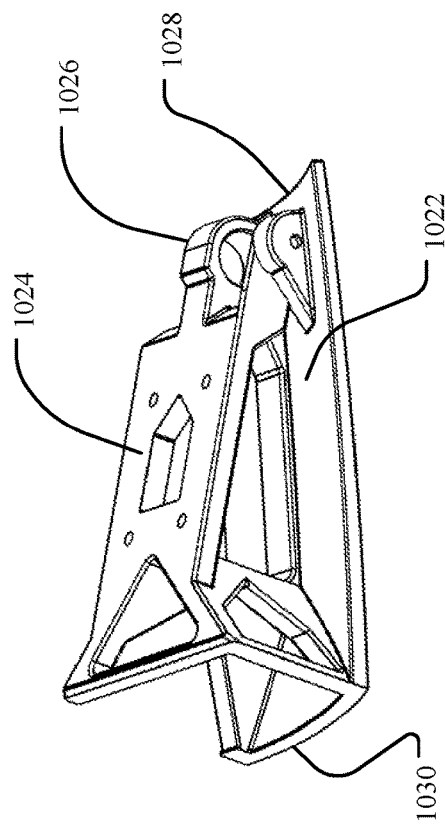
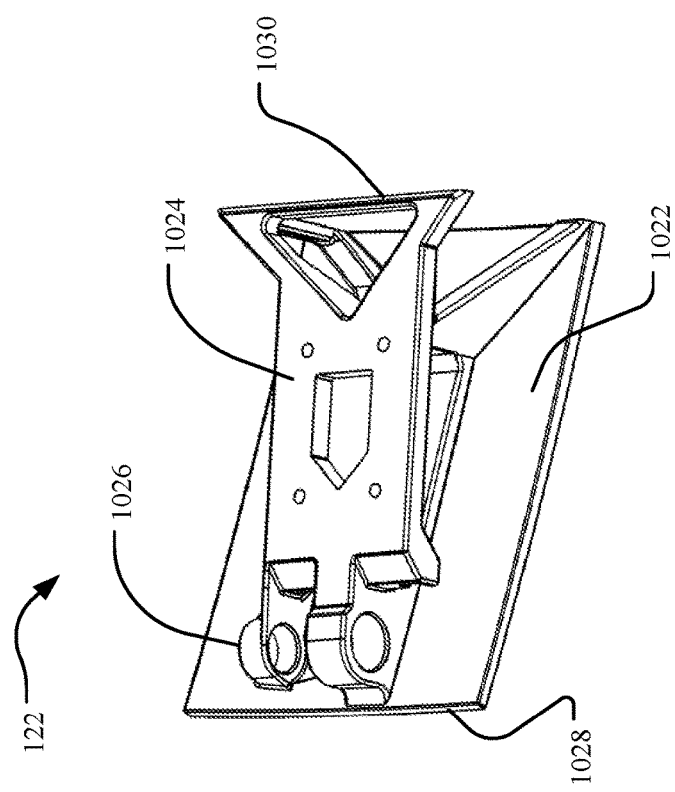
FIG. 23E
FIG. 23F
FIG. 23D

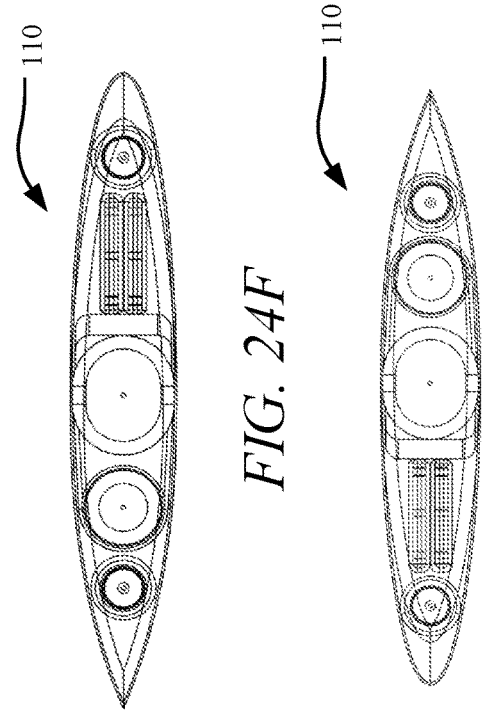
*FIG. 24F*
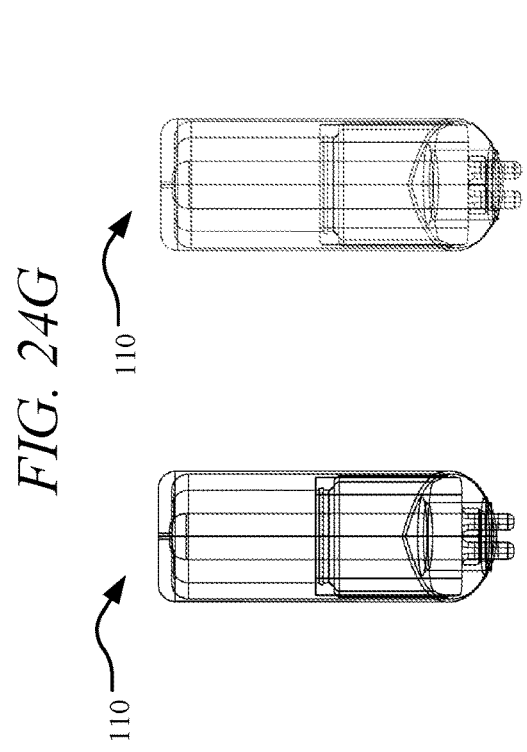
*FIG. 24G*
*FIG. 24I*
*FIG. 24H*
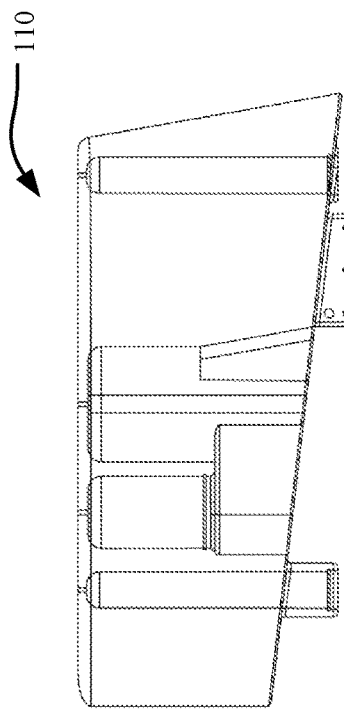
*FIG. 24D*
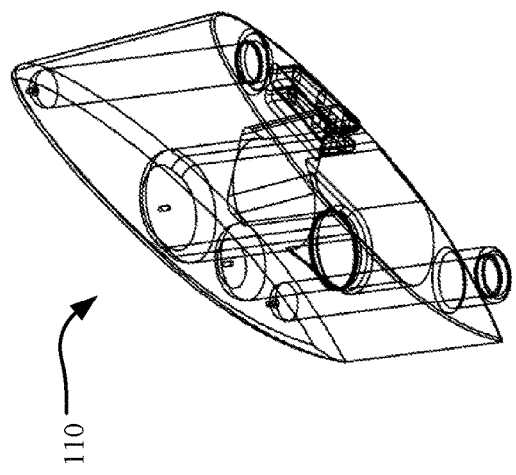
*FIG. 24E*

MARITIME VEHICLE SYSTEMS AND METHODS

CROSS-REFERENCE TO RELATED APPLICATIONS

The present application is a continuation of Patent Cooperation Treaty No. PCT/US2021/012223, entitled "Maritime Vehicle Systems and Methods" and filed on Jan. 5, 2021, which is a continuation-in-part of and claims priority to U.S. patent application Ser. No. 16/675,446, entitled Load-Bearing Frame Structure for Maritime Vehicles" and filed on Nov. 6, 2019, which claims priority under 35 U.S.C. § 119 to U.S. Provisional Application No. 62/769,747, entitled "Load-Bearing Frame Structure for Maritime Vehicles" and filed on Nov. 20, 2018. Patent Cooperation Treaty No. PCT/US2021/012223 further claims priority under 35 U.S.C. § 119 to U.S. Provisional Application No. 62/957,478, entitled "Maritime Vehicle Fairings and Methods of Manufacture" and filed on Jan. 6, 2020. Each of these applications is specifically incorporated by reference in its entirety herein.

FIELD

Aspects of the present disclosure relate generally to systems and methods for underwater exploration and more particularly to maritime vehicles, including autonomous underwater vehicles.

BACKGROUND

Underwater vehicles may be deployed in various underwater environments for exploration, research, investigation, commercial, law enforcement, military, and other purposes. These vehicles may include, without limitation, unmanned underwater vehicles, remotely operated underwater vehicles, autonomous underwater vehicles, and/or other maritime vehicles. Autonomous underwater vehicles navigate through underwater environments autonomously, such that the vehicle is capable of operating to move through the underwater environment without or with limited operator input. Rather than an operator having an operational engagement with the vehicle to control its actions, the vehicle autonomously executes one or more objectives through a series of autonomous actions. However, even with advancements in such technologies, underwater environments continue to pose challenges to the movement, integrity, navigation, communication, control, data capture, and operation of underwater vehicles. It is with these observations in mind, among others, that various aspects of the present disclosure were conceived and developed.

SUMMARY

Implementations described and claimed herein address the foregoing observations by providing systems and methods for underwater exploration using an underwater vehicle. In one implementation, an underwater vehicle includes a vehicle body having a frame enclosed by a fairing. The vehicle body extends between a proximal end and a distal end and defining an interior. A nose is disposed at the proximal end of the vehicle body. The nose has a tow system configured to move between a tow position and a stow position. A propulsion system is disposed at the distal end of the vehicle body. The propulsion system includes a plurality of control fins and a thruster. A power distribution system is housed in the interior of the vehicle body. The power distribution system includes a first power distribution system housed in a first pressure vessel and a second power distribution system housed in a second pressure vessel. The first pressure vessel is isolated from the second pressure vessel.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIGS. 1F and 1G are a front view and a back view, respectively, of the underwater vehicle.

FIGS. 3C and 3D are a top view and a bottom view, respectively, of the nose of the underwater vehicle.

FIGS. 3E and 3F are a right side view and a left side view, respectively, of the nose of the underwater vehicle.

FIGS. 3G and 3H are a front view and a back view, respectively, of the nose of the underwater vehicle.

FIG. 3I shows the nose of the underwater vehicle with an example nose bracket.

FIGS. 4A and 4B illustrate a front perspective view and a back perspective view, respectively, of an example head fairing.

FIGS. 5A and 5B illustrate a front perspective view and a bottom perspective view, respectively, of an example body fairing.

FIGS. 6A and 6B illustrate a bottom perspective view and a top perspective view, respectively, of an example tray fairing.

FIGS. 7A and 7B illustrate a front perspective view and a back perspective view, respectively, of an example tail fairing.

FIGS. 7C, 7D, 7E, 7F, 7G, and 7H illustrate a left side view, bottom view, right side view, top view, front view, and back view, respectively, of the tail fairing.

FIGS. 8A and 8B show a front perspective view and a back perspective view, respectively, of an example thruster fairing.

FIGS. 9A and 9B depict a perspective view and a side view, respectively, of a portion of an example wall of the fairing formed using additive manufacturing.

FIGS. 9C and 9D show the portion of the wall of the fairing following smoothing of an exterior surface.

FIGS. 16A, 16B, 16C, 16D, 16E, 16F, 16G, and 16H show a side perspective view, exploded view, bottom side perspective view, top side perspective view, back view, another bottom side view, another top side perspective view, and a front view, respectively, of an example control fin of a propulsion system of the underwater vehicle.

FIGS. 22A and 22B show the nose of the underwater vehicle with a tow system in a stow configuration and a tow configuration, respectively.

FIGS. 23D-23F depict an example port of the emergency ascent control system.

FIGS. 24B, 24C, 24D, 24E, 24F, 24G, 24H, and 24I show a side perspective view, a bottom view, a side transparent view, a top perspective transparent view, a bottom transparent view, a top transparent view, a front transparent view, and a back transparent view, respectively, of the communication mast.

DETAILED DESCRIPTION

Figure 1A:
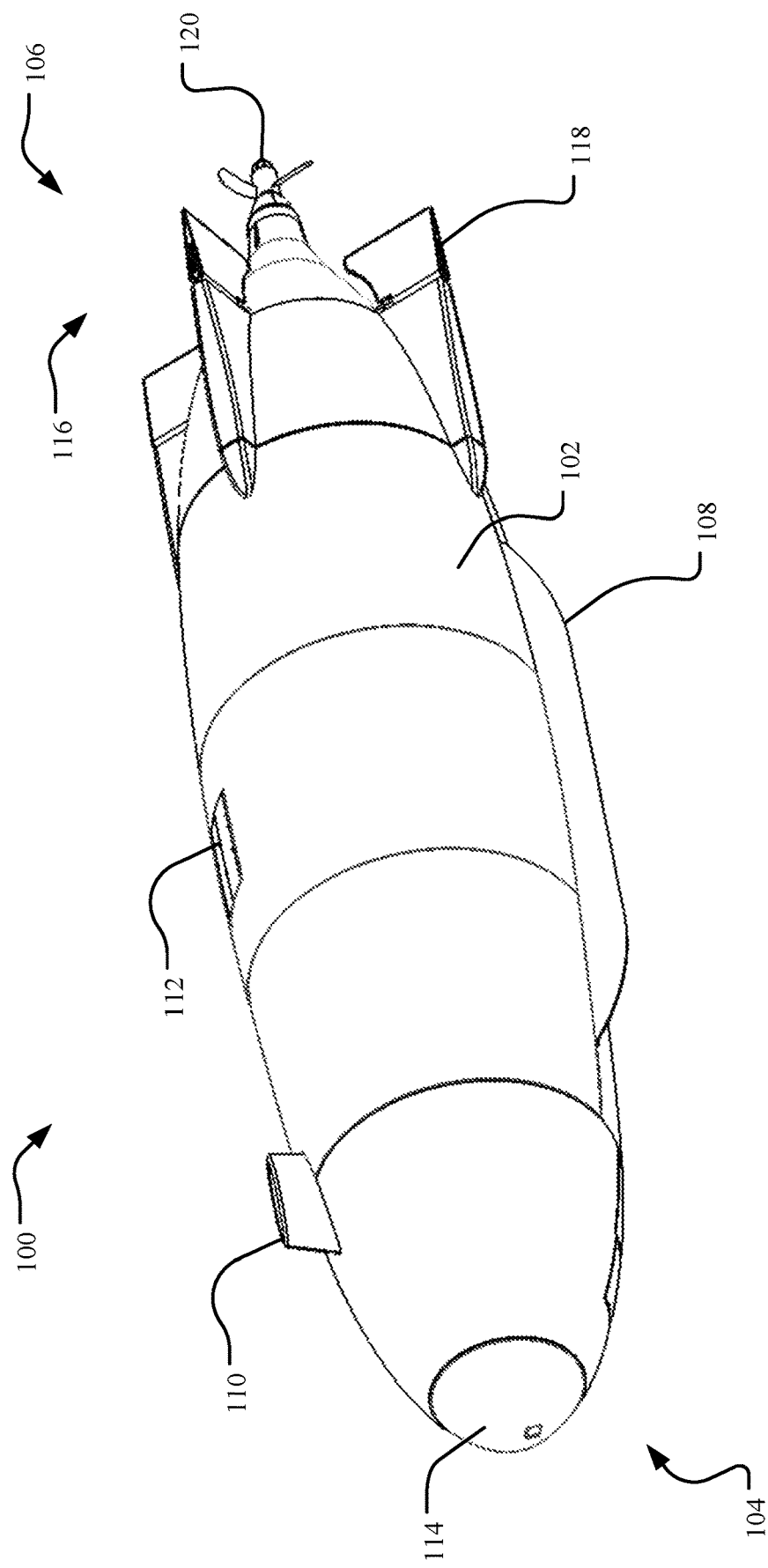
FIG. 1A illustrates a perspective view of an example underwater vehicle.
Figure 1B:
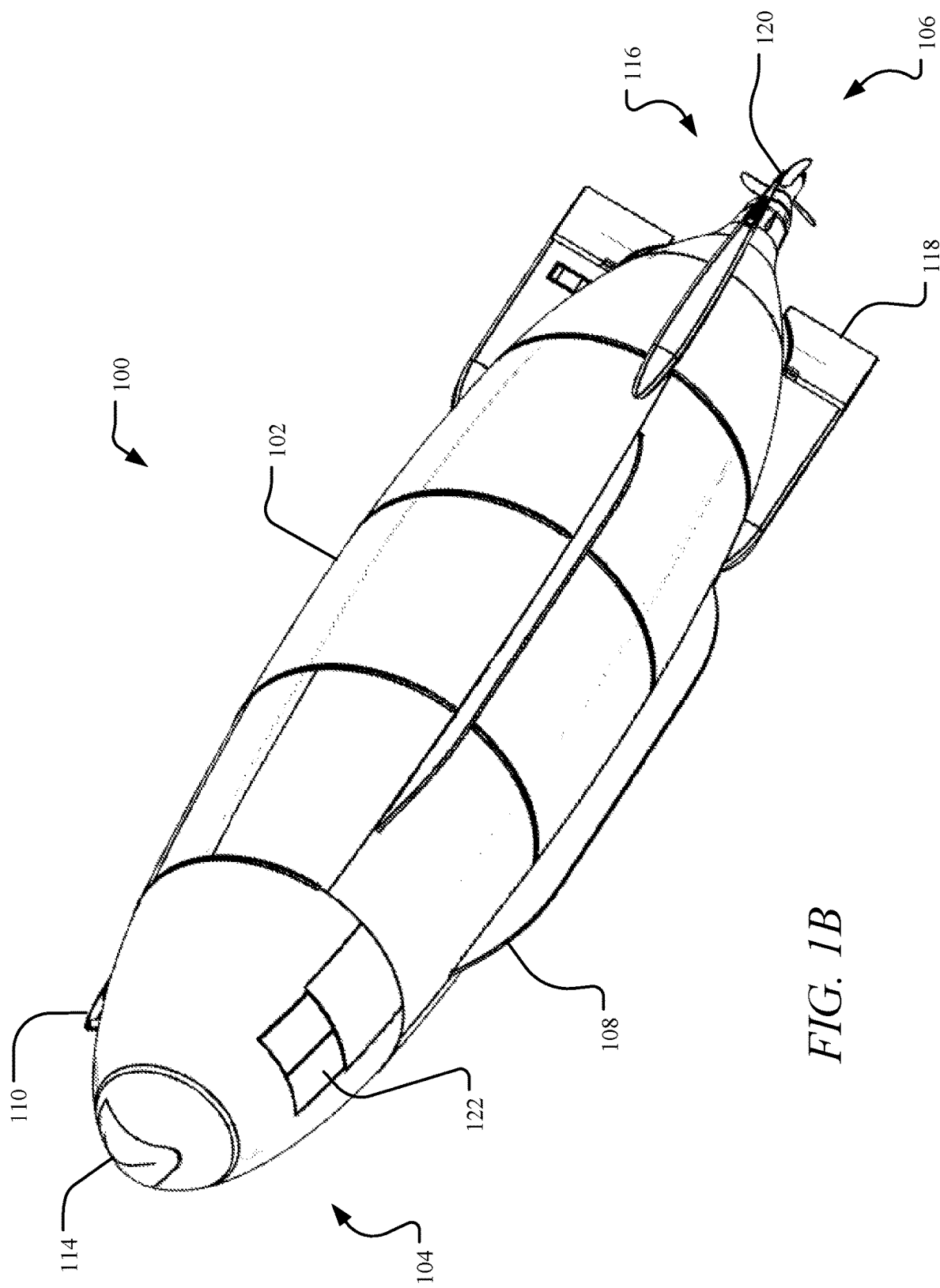
FIG. 1B is a bottom perspective view of the underwater vehicle.
Figure 1C:
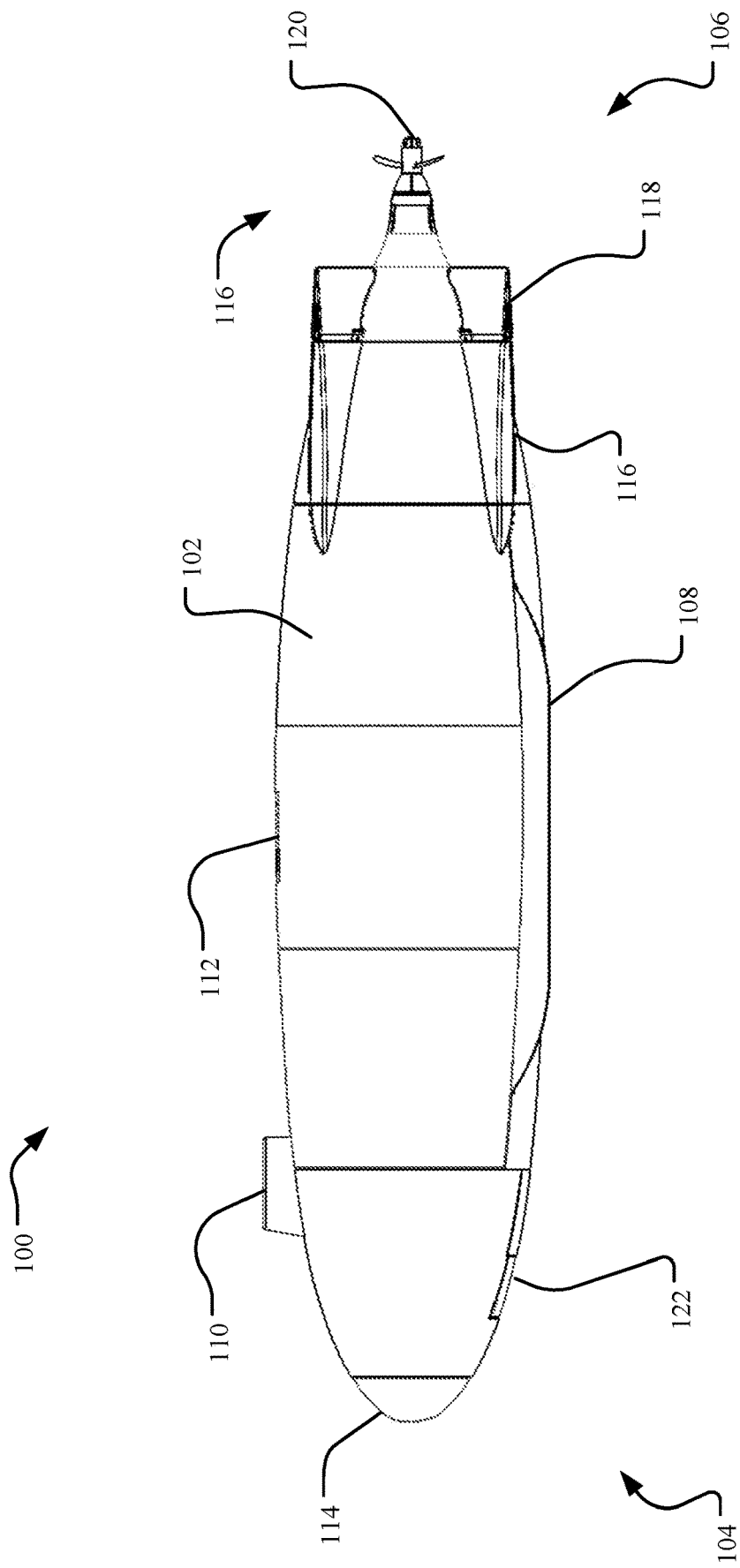
FIG. 1C is a side view of the underwater vehicle.
Figure 1D:
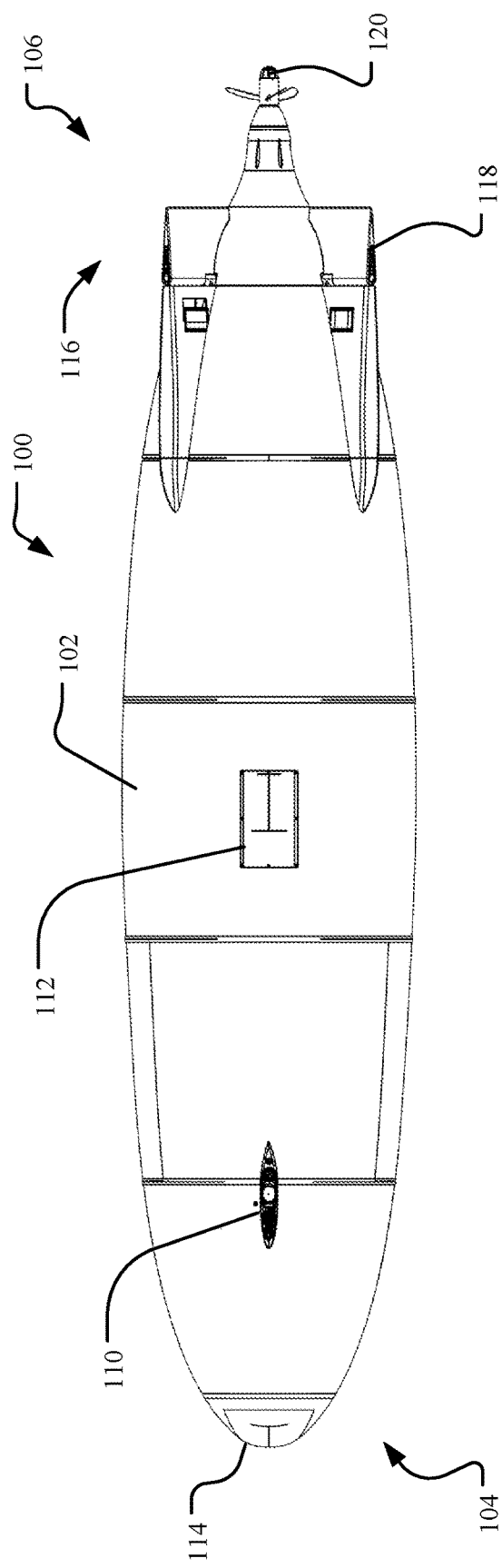
FIGS. 1D and 1E are a top view and a bottom view, respectively, of the underwater vehicle.
Figure 1E:
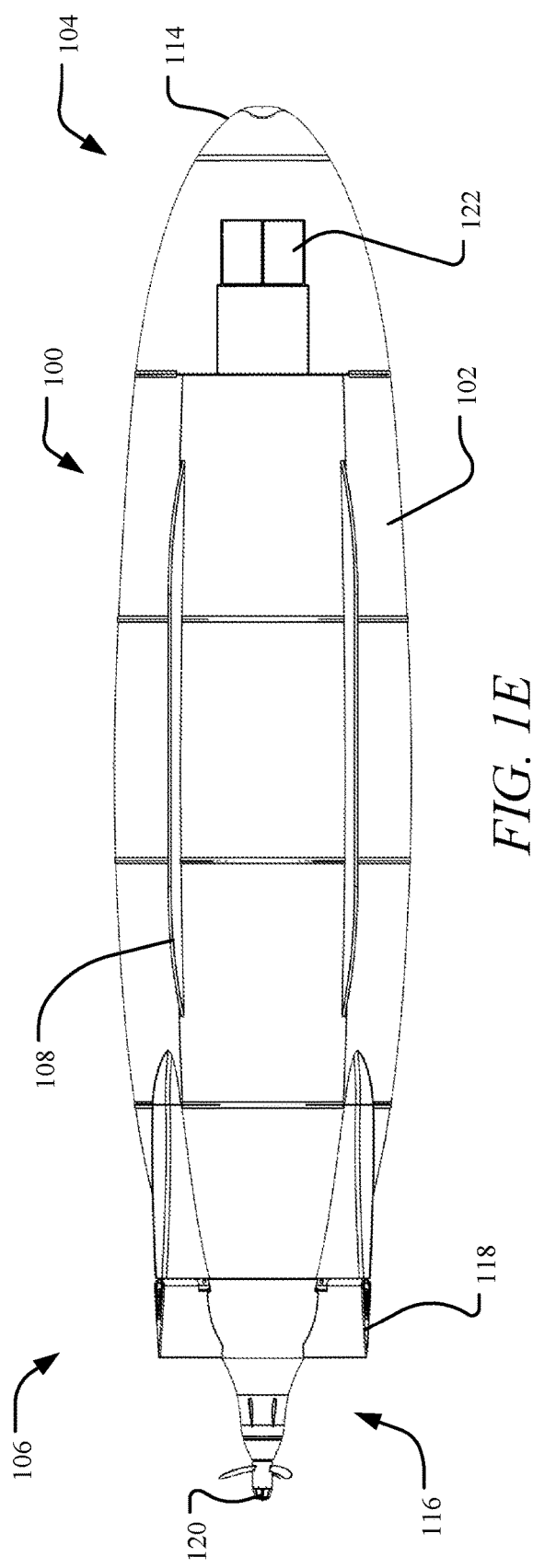

Aspects of the presently disclosed technology relate to underwater vehicles and systems and methods related thereto. In one aspect, the underwater vehicle configured for deployment in an underwater environment includes a vehicle body extending between a proximal end and a distal end. The vehicle body includes a tail and a head, which may be disposed at the distal end and the proximal end, respectively. The vehicle body includes a fairing enclosing a frame and defining an interior. A first portion of a power distribution system is disposed at in a separate pressure vessel from a second portion of the power distribution system. For example, a low power distribution system may be disposed in a first pressure vessel, and a high power distribution system may be disposed in a second pressure vessel. The first pressure vessel may be disposed at one end of the frame, and the second pressure vessel may be disposed at the other end of the frame. The head includes a nose having a tow system that provides a single point tow. The tail includes a propulsion system including a plurality of control funs and a thruster. An emergency ascent control system is disposed on an underside of the vehicle body to drop weight for a controlled ascent to the surface. An acoustic sensor for the navigating the underwater environment may be disposed on the underside of the vehicle body. A lift system and a communication mast may be disposed on a topside of the vehicle body. The lift system provides a single point lift for the underwater vehicle. The communication mast houses one or more communication systems and a location beacon. The underwater vehicle may include various navigation and control systems for autonomous operation.

To begin a detailed description of an example underwater vehicle 100, reference is made to FIGS. 1A-1G. The underwater vehicle 100 may be an autonomous underwater vehicle, an unmanned underwater vehicle, a remotely operated underwater vehicle, a maritime vehicle, and/or the like. The underwater vehicle 100 may be deployed in various underwater or water environments, such as oceans, lakes, and other bodies of water for missions, which may include capturing data associated with the underwater environment. It will be appreciated that the underwater vehicle 100 may reside on the surface or underwater during operation.

In one implementation, the underwater vehicle 100 includes a vehicle body extending between a proximal end 104 and a distal end 106. The vehicle body includes a head and a tail, which may be disposed at the proximal end 104 and the distal end 106, respectively. The vehicle body further includes a fairing 102 enclosing the vehicle body. The fairing 102 may be a single integrated structure or comprise a plurality of separate structures interconnected to each other. The fairing 102 streamlines the underwater vehicle 100 to reduce drag and optimize hydrodynamics. The fairing 102 may be structural, non-structural, or a combination of both.

The underwater vehicle 100 includes one or more skates 108 extending along a length of the vehicle body. In one implementation, the underwater vehicle 100 includes a pair of skates 108 disposed on an underside of the vehicle body. The skates 108 may be used to support the underwater vehicle 100 on a surface without additional support equipment. A port 122 may be disposed on the underside of the underwater vehicle 100 to release ascent weight in connection with an emergency ascent. The underwater vehicle 100 further includes a communication mast 110 and a lift system 112. The communication mast 110 and the lift system 112 may be disposed on a topside of the underwater vehicle 100, opposite the skates 108. The communication mast 110 may house one or more communications systems, such as a Global Positioning System, a radio frequency system, a satellite communication system, and/or the like. The communications systems may be used to communicate with or otherwise transmit data to and receive data from a remote location, such as the surface. The communications mast 110 may further include a location beacon, such as a strobe light or similar beacon to visually locate the underwater vehicle 100.

The lift system 112 provides a single point lift for the underwater vehicle 100, while optimizing hydrodynamics. The single point lift may be used to launch and recover the underwater vehicle 100 from and deploy the underwater vehicle 100 into the underwater environment. A nose 114 of the vehicle body may provide a single point tow in the underwater environment, either at the surface or underwater. The nose 114 minimizes drag in the stowed position, while facilitating access for tow and release in the tow state. The nose 114 may be disposed at the proximal end 104 of the vehicle body.

A propulsion system 116 may be disposed at the distal end 106 of the vehicle body, opposite the nose 114. The propulsion system 116 includes a plurality of control fins 118 and a thruster assembly 120. The control fins 118 may be disposed at equidistant locations about the thruster assembly 120. The thruster assembly 120 propels the underwater vehicle 100 through the underwater environment along a trajectory controlled by the control fins 118. The control fins 118 include a direct torque transfer mechanism between corresponding drive motors and fins and reduce drag. In one example, the thruster assembly 120 is direct drive, with the underwater vehicle 100 having an endurance of over a week and a range of approximately 850 km at 1 m/s and 600 km at 2 m/s. The underwater vehicle 100 may be a large displacement vehicle and have a length of approximately 5.8 m, a diameter of approximately 1.2 m, and a dry weight of approximately 2720 kg.

Turning to FIGS. 2A-8B, various aspects of the fairing 102 are illustrated. The fairing 102 may be a non-structural, non-sealing external surface that encloses and protects an interior of the underwater vehicle 100, while minimizing hydrodynamic drag. The fairing 102 is pressure tolerant for deployment at various depths (e.g., 300 m, 3000 m, 6000 m, etc.) in underwater environments.

Figures 2A, 2B:
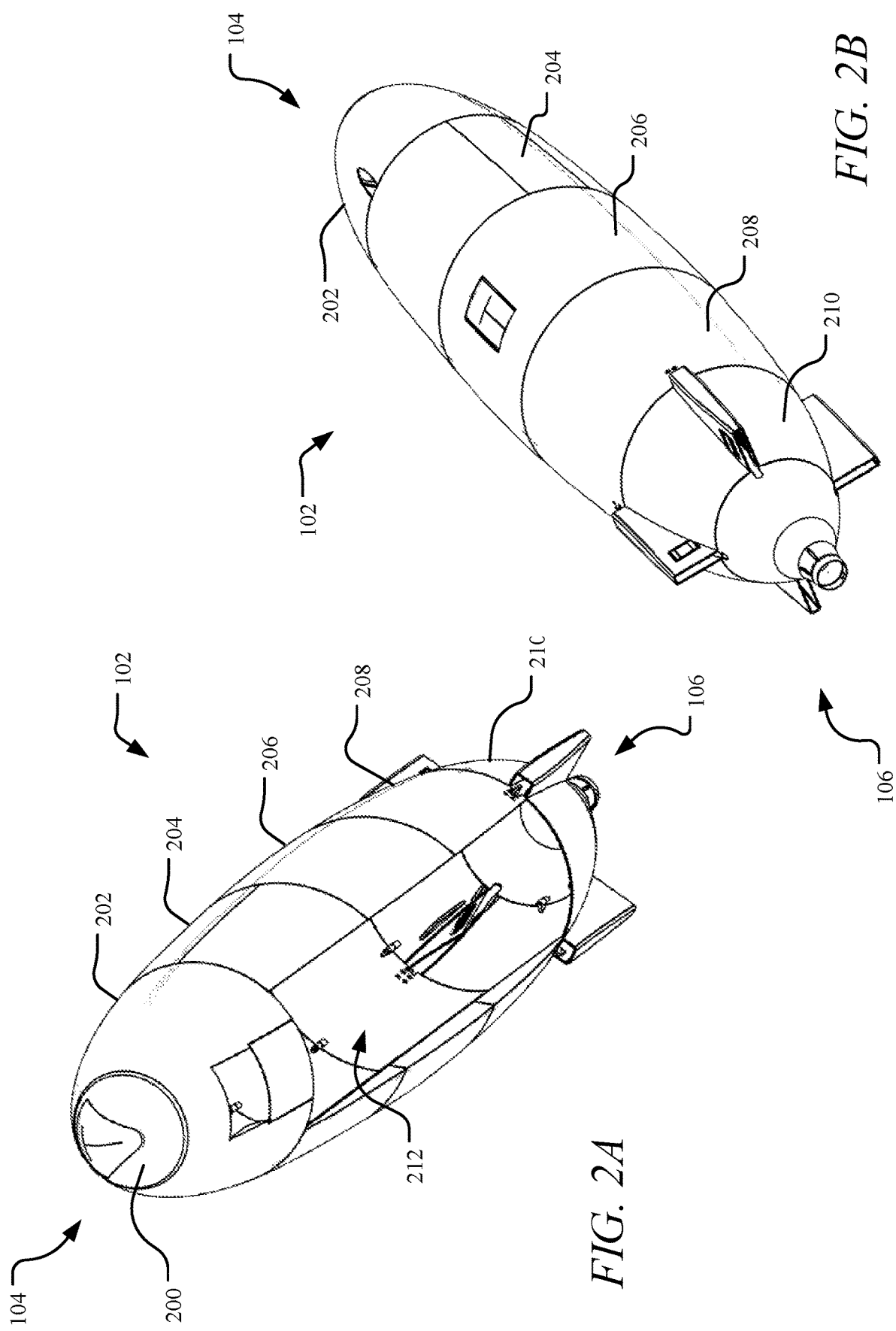
FIGS. 2A and 2B are a bottom perspective view and a top perspective view, respectively, of an example fairing of the underwater vehicle.
Figure 3B:
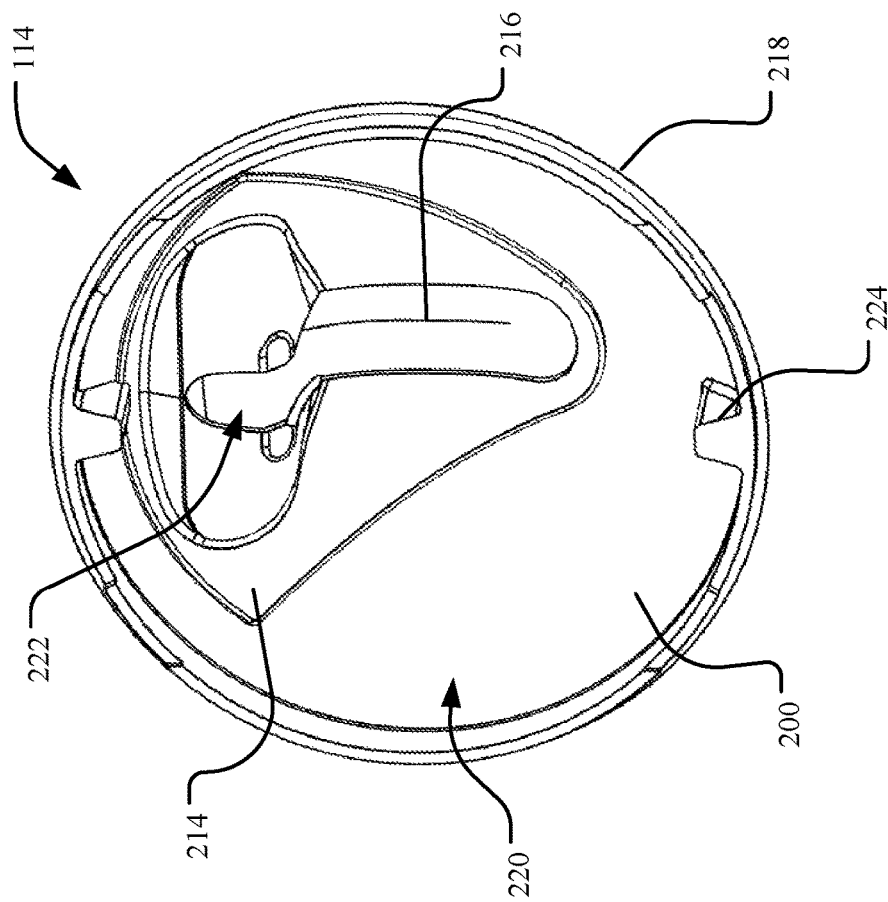
FIGS. 3A and 3B are a front perspective view and a back perspective view, respectively, of an example nose of the underwater vehicle.
Figure 3A:
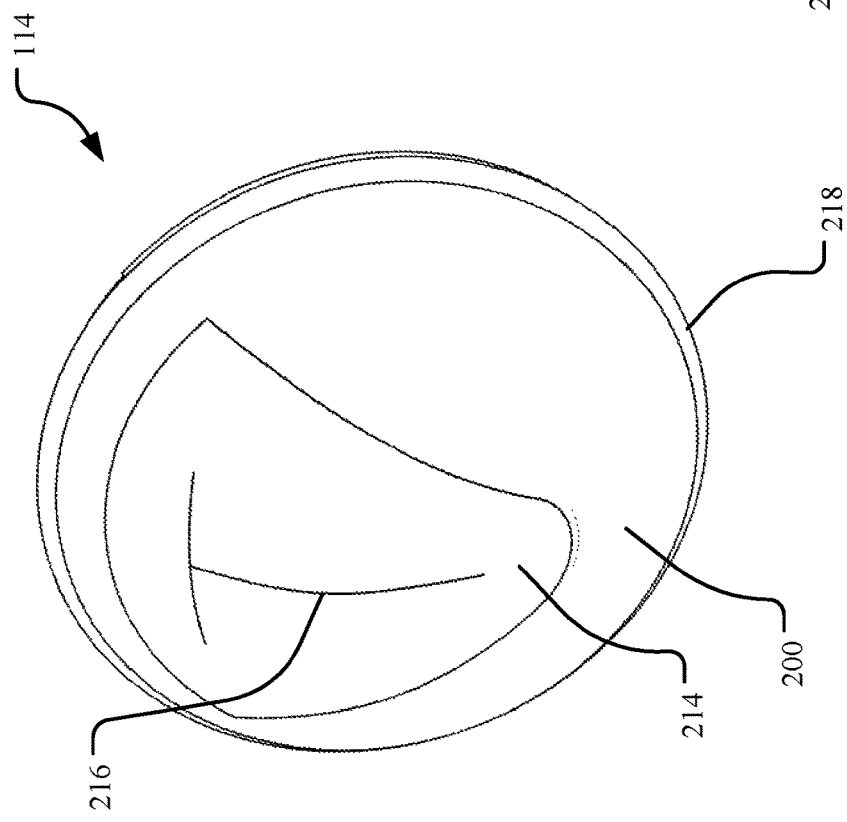
Figure 10:
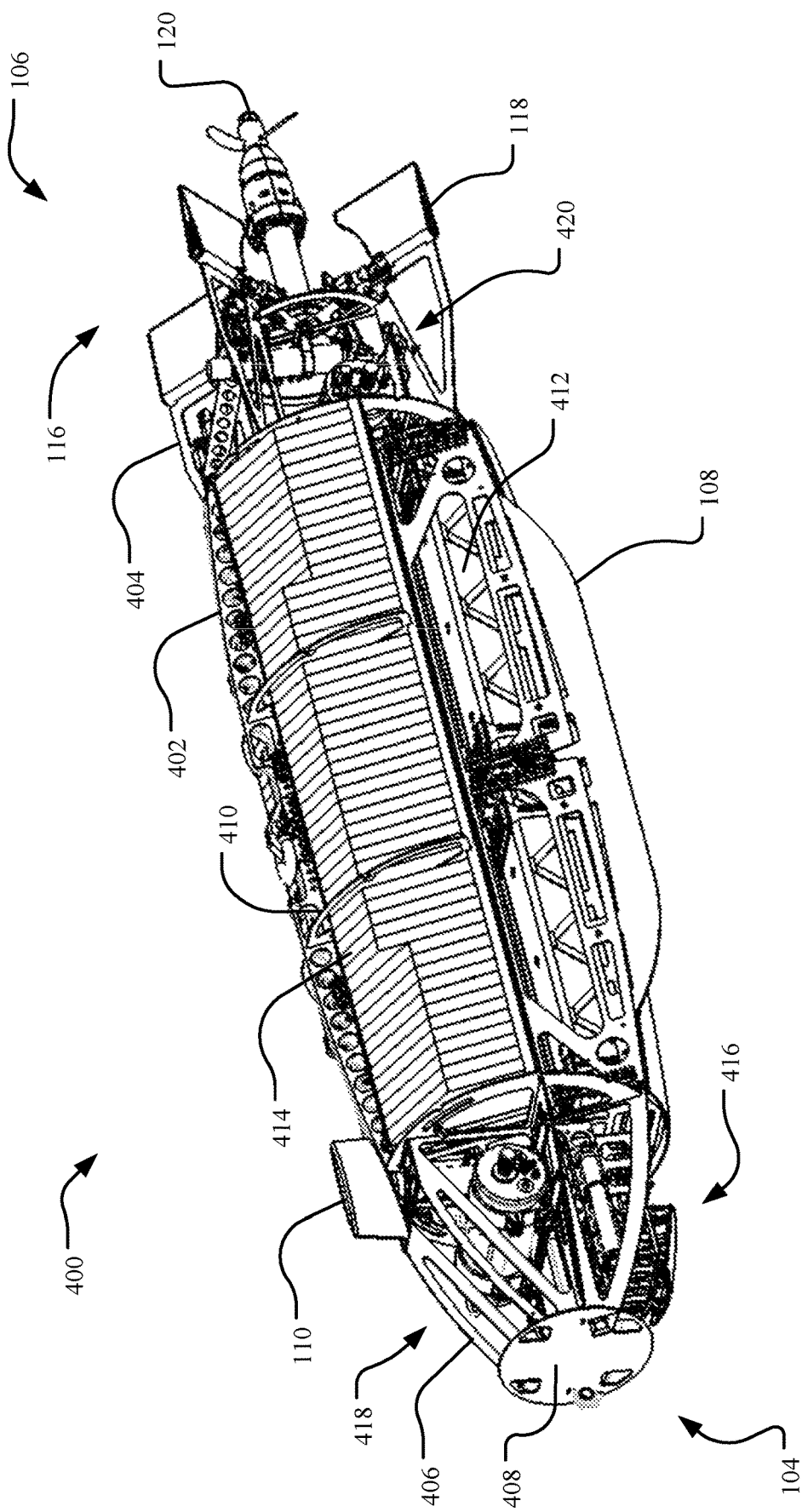
FIG. 10 shows a front perspective view of an interior of the underwater vehicle.
Figure 11:
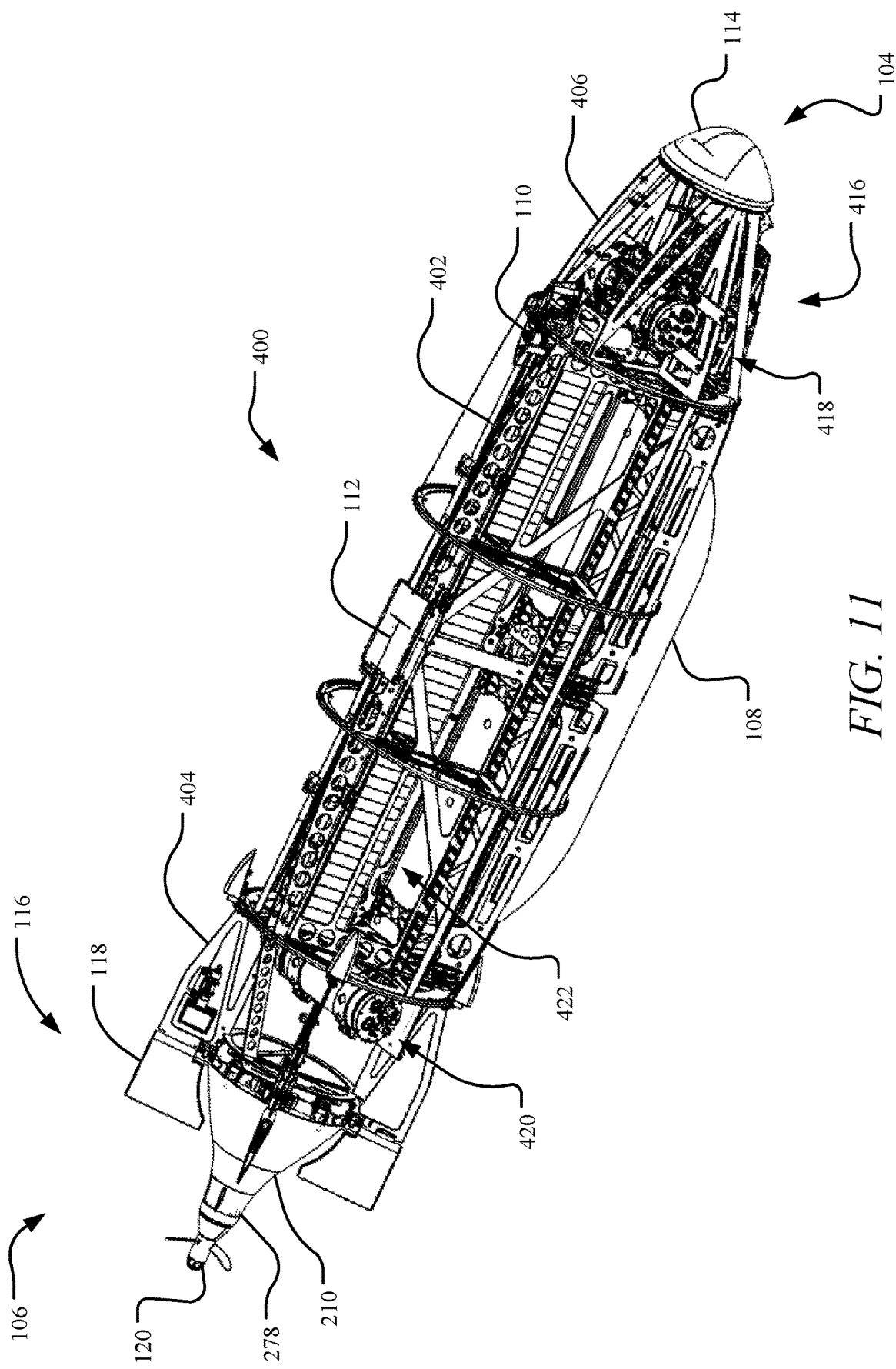
FIG. 11 illustrates a top perspective view of the interior of the underwater vehicle with the nose fairing and the thruster fairing shown and portions of the floatation system removed.

As shown in FIGS. 2A-2B, in one implementation, the fairing 102 includes a nose fairing 200, a head fairing 202, a proximal body fairing 204, a middle body fairing 206, a distal body fairing 208, and a tail fairing 210. The fairing portions 200-210 may be a single integrated body forming the fairing 102 or comprise one or more separate sections that are interconnected to form the fairing 102. In one implementation, the nose fairing 200 is connected to the head fairing 202, and the head fairing 202 is connected to a body fairing. The body fairing may include the proximal body fairing 204 connected to the head fairing 202 and a middle body fairing 206, and the distal body fairing 208 connected to the middle body fairing 206 and the tail fairing 210. The fairing 102 may form an interior 212.

As shown in FIGS. 3A-3I, in one implementation, the nose 114 includes the nose fairing 200 extending between a drag skin 214 and a nose mount 218. The nose 114 may include a compliant hard-durometer cast material providing impact damping. The nose 114 may be shaped for hydrodynamic efficiency with minimized drag.

The drag skin 214 includes a tow access 216 facilitating access for tow and release. In one implementation, the tow access 216 includes a first slit extending in a first direction and a second slit extending from the first slit in a second direction. For example, the first slit may extend horizontally at a top portion of the drag skin 214, and the second slit may extend vertically from a center of the first slit downwards.

The tow access 216 provides access to a nose interior 220. In one implementation, the nose interior 220 includes a pocket 222. The pocket 222 may be disposed relative to the first slit of the tow access 216.

The nose 114 may be removable from the underwater vehicle 100. For example, the nose mount 218 may removably engage the head fairing 202, directly or indirectly. The nose 114 may include bracket mounts 224 extending from the nose mount 218. The bracket mounts 224 may be mounted to corresponding nose brackets 226. The nose 114 may be installed from outside the underwater vehicle 100. Stated differently, to reduce external fasteners and surface interruptions, the nose 114 is externally accessible, with the nose 114 being mounted to the underwater vehicle 100 last. Nose mount points may be accessed through the compliant region of the tow access 116. With the absence of external features, the nose 114 reduces drag of the underwater vehicle 100, while improving range.

FIGS. 4A-4B illustrate the head fairing 202. In one implementation, the head fairing 202 extends between a proximal end 228 and a distal end 230 defining a head interior 232. The proximal end 228 may directly or indirectly connect to the nose 114, and the distal end 230 may be directly or indirectly connected to the proximal body 204.

The head fairing 202 may include a mast opening 234 defined therein. The communication mast 110 may extend through the mast opening 234. In one implementation, the mast opening 234 is disposed on the topside of the head fairing 202. On the underside of the head fairing 202, a port opening 238 may be defined. A set of port walls 236 of the port 122 may be disposed adjacent the port opening 238 and extending inwardly into the head interior 232. The set of port walls 236 may be used for mounting an emergency ascent control system. Additional features, such as a set of sensor walls 240 and a set of head shelves 242, may be disposed within the head interior 232 for mounting various internal components. The set of sensor walls 240 may be disposed adjacent the set of port walls 236. The set of shelves 242 may be disposed opposite each other within the head interior 232.

Referring to FIGS. 5A to 5B, the body fairing includes the proximal body fairing 204, the middle body fairing 206, and the distal body fairing 208. The body fairings 204-208 may be separate or integral components.

On the topside of the underwater vehicle 100, the lift system 112 may be disposed. In one implementation, the lift system 112 includes drag skin 248 with a lift access 250 facilitating access for lift. The lift system 112 provides a single point lift for the underwater vehicle 100, while optimizing hydrodynamics using the drag skin 248. In one implementation, the lift access 250 includes a first slit extending in a first direction and a second slit extending from the first slit in a second direction. For example, the first slit may extend transversely to a length of the underwater vehicle 100 at a proximal portion of the drag skin 248, and the second slit may extend from a center of the first slit distally along the length of the underwater vehicle 100.

The body fairing may include a set of body shelves 246 and a set of lips 244, each extending along a length of the underwater vehicle 100 within the interior 212. The set of body shelves 246 may extend inwardly traverse to the topside of the underwater vehicle 100, while the set of lips 244 may extend upwardly towards the topside. The set of lips 244 may be disposed at the underside of the underwater vehicle 100. The set of lips 244 may define a body opening 254 on the underside along a length of the body fairing.

Turning to FIGS. 6A-6B, in one implementation, a tray fairing 252 engages the body fairing within the body opening 254 defined by the set of lips 244. The tray fairing may include one or more tray mounts. In one implementation, a set of side tray mounts 256 extend along a length of the tray fairing 252 on opposing sides, while a center tray mount 258 extends along the length of the tray fairing 252 between the set of side tray mounts 256. The tray fairing 252 may be an integral piece or comprise a plurality of interconnected portions. In one implementation, the tray fairing 252 is removably engaged to the body fairing to provide access to the interior 212.

As can be understood from FIGS. 7A-7H, the tail fairing 210 extends between a proximal end 260 and a distal end 262 and includes an exterior surface 264 opposite an interior surface 266. The proximal end 260 may directly or indirectly connect to the distal body fairing 208. The tail fairing 210 defines a tail interior 268 extending between the proximal end 260 and the distal end 262.

In one implementation, the tail fairing 210 includes a plurality of strakes 270, which may be static on the underwater vehicle 100. Each of the strakes 270 extends outwardly from the exterior surface 264 of the tail fairing 210 and defines a strake channel 272. In one implementation, the strake channels 272 extend from an interior end to an exterior end. The interior end of each of the strake channels 272 may be coextensive with the interior surface 266 of the tail fairing 210, such that the strakes 270 are disposed at an outward position relative to the exterior surface 264 of the tail fairing 210. The control fins 218 may be positioned relative to the strakes 270, with a profile of the control fins 218 following a profile of the strakes 270 to form a low drag profile. Strake mounts 276 may be positioned adjacent each of the strake channels 272 and a shelf 274 may be positioned within the tail interior 268 for mounting additional interior components.

The distal end 262 of the tail fairing 210 may be directly or indirectly connected with a thruster fairing 278. Referring to FIGS. 8A-8B, in one implementation, the thruster fairing 278 includes an exterior surface 280 opposite an interior surface 282. The thruster fairing 278 may include a thruster extension fairing 284, which may be mounted to or integral with the thruster fairing 278 to extend from a proximal end 286 to a distal end 288 to define a thruster interior 290. The thruster extension fairing 284 may include a mount 292 to engage the thruster fairing 278. In one implementation, the mount 292 connects to the thruster fairing 278 using a plurality of fasteners, such as screws. The thruster extension fairing 284 may include indents 294 corresponding to the fasteners. The thruster assembly 120 may be disposed at least partially within the thruster interior 290. In one implementation, a portion of the thruster assembly 120 extends distally from the distal end 288. The proximal end 286 is configured to directly or indirectly connect with the tail fairing 210. The proximal end 286 may further include fin openings 296 defined therein and through which a portion of the control fins 118 extend.

As described herein, the fairing 102 creates an interior 212 to house and protect interior components of the underwater vehicle 100 from impact or foreign objects. The fairing 102 may be a single integral piece or made from a plurality of portions, including, but not limited to, the fairing portions 200-210, 278 and 284. The fairing 102 may be manufactured in a variety of manners. For example, as can be understood from FIGS. 9A-9D, the fairing 102 may be manufactured through additive manufacturing using an additive manufacturing system, such as a Large Format Additive Manufacturing (LFAM) machine or other three-dimensional (3D) printer.

In one implementation, the fairing 102 is manufactured based on a fairing model that may be generated using a computer system. The computer system may be part of or in communication with a controller of the additive manufacturing system. The computer system may include a personal computer, terminal, workstation, mobile device, smartphone, tablet, and/or the like. The computer system may be in communication with the additive manufacturing system via a wired (e.g., Universal Serial Bus, Ethernet, etc.) or wireless connection (e.g., WiFi, Bluetooth, etc.). For example, the additive manufacturing system may include a network interface for facilitating communication with the computer system via a network. The fairing model may be obtained at the additive manufacturing system via the wired or wireless connection. In another example, the fairing model is received at the additive manufacturing system from the computer system via removable memory, such as a flash drive. It will be appreciated that the fairing model may be obtained by the additive manufacturing system in various manners including directly where the computing system is part of the controller of the additive manufacturing system.

The fairing model includes one or more profiles, shapes, thicknesses, sizes, hardness, and/or other features of the fairing 102. The fairing model may include separate models for one or more of the fairing portions 200-210, 278 and/or 284, which may be separately manufactured using the additive manufacturing system. The fairing model may further include or otherwise be associated with a print profile. In one implementation, the print profile includes, but is not limited to, a filament diameter, a temperature, a printing speed, a layer height, a coasting distance, and/or other printing parameters selected for the fairing 102. It will be appreciated that the print profile may be selected or modified based on a material selection and a printing environment. For example, the additive manufacturing system may print the fairing 102 through melt extrusion, photopolymerization, sintering, fused filament fabrication, and/or the like. The print profile thus includes printing parameters selected for printing the fairing 102 in a particular printing environment. It will be appreciated that the additive manufacturing system may involve extruding, fusing, sintering, laser sintering, laser melting, light polymerizing, wire additive, powder bed, laminated object, molding, scaffolding, subtractive manufacturing, and/or the like.

The fairing model is a representation of the fairing 102, including small details and features. As stated above, the fairing model may include separate models for one or more of the fairing portions 200-210, 278 and/or 284, each specifying the details and features of the corresponding portion of the fairing 102. The fairing model is sliced into a plurality of outlines, such as a series of sequential cross-sections of the fairing model. The plurality of outlines and the print profile are used to produce print instructions for the fairing 102. The print instructions may be in a format ingestible by the additive manufacturing system. The print instructions define the actions of one or more components of the additive manufacturing system during manufacturing of the fairing 102.

The controller of the additive manufacturing system is configured to direct the actions of the one or more components of a print assembly according to the print instructions. In one implementation, the print assembly manufactures one or more portions of the fairing 102 using an additive process in which the material is deposited layer by layer. For example, the print assembly may perform filament fabrication using a controlled extrusion of molten thermoplastic feedstock. The print assembly may alternatively use light to cure a photopolymer and/or a selective laser sintering process to fuse powdered metal together.

In one implementation, the print assembly includes a frame, a support, a reservoir, a feeder, an applicator, one or more motors, and a fan, each controlled by the controller. It will be appreciated that the additive manufacturing system may include additional, fewer, or different components. The frame supports the various components of the print assembly. The support may be positioned relative to the applicator, and may include a bed, scaffolding, or other surface. The support and/or the applicator may be stationary or movable using the one or more motors. For example, the support may be positioned at a distance from and position relative to the applicator that is adjusted as the portion of the fairing 102 is manufactured.

The reservoir contains manufacturing material, which may include, without limitation, a glass fiber or carbon fiber reinforced acrylonitrile butadiene styrene (ABS) material, a carbon fiber reinforced polycarbonate (PC) material, a fiberglass/carbon fiber and epoxy composite, and/or similar material. The feeder directs the manufacturing material to the applicator via, spool feeding, gravity feeding, pumping, or other feeding techniques. The applicator receives and deposits the manufacturing material into the support or previously constructed layers according to the print instructions.

In one implementation, a stream of the manufacturing material is heated using an extruder head, which directs the heated (e.g., semi-molten) material through the applicator. The process involves continuous extrusion of the manufacturing material, which bonds to previous layers as each layer is built up and hardens as it cools. As can be understood from FIGS. 9A-9B, which illustrate a portion of a wall 300 of the fairing 102, the portions of the fairing 102 are each created by laying down successive layers 302 of material until the portion of the fairing 102 is completed.

The applicator deposits a first layer of the heated material at a first location on the support. After the first layer is deposited and thermally fused, the applicator moves relative to the support to deposit a second layer on top of or otherwise relative to the first layer or to change direction for depositing the second layer. Subsequent layers are deposited and thermally fused until the portion of the fairing 102 is fabricated. The applicator may move in various directions (e.g., along an x, y, and/or z axis) relative to the support to fabricate the fairing 102 according to the print instructions. In some cases, the support may move relative the applicator. The controller of the additive manufacturing system causes the applicator to selectively deposit the heated material onto the support at coordinate positions specified by the print instructions. The fan and the support may be used to control a temperature of the deposited layers during thermal fusing. For the layers, the printing profile sets a bead thickness 304 and a bead height 306 for the layers 302, which may be for example approximately 0.250 inches and 0.050 inches, respectively. However, other dimensions and ranges are contemplated (e.g., the bead thickness 304 may range from about 0.188 inches to 0.500 inches and the height 306 may range from about 0.025 inches to 0.250 inches).

As can be understood from FIGS. 9A-9B, the wall 300 of the fairing 102 may be 3D printed as a single-bead-thick wall formed from the plurality of layers 302. In one implementation, each of the layers 302 has a wide aspect ratio resulting in the wall 300 having a layer thickness that is greater than a layer height. The aspect ratio of the thickness 304 to the height 306 can range from 3:1 to 8:1. In one particular example, the aspect ratio is 5:1, and in another example, the aspect ratio is 7:1. The aspect ratio may be at least 3:1. As a result, the wall 300 is easier to manufacture as a smooth surface for optimizing hydrodynamics, while providing a strong bond between the layers 302 for structural integrity of the fairing 102. Further, the wall 300 being a single-bead-thick eliminates potential gaps between adjacent beads of the same layer that would otherwise result in trapped air. The presence of trapped air in the wall 300 may cause the fairing 102 to fail or otherwise adversely impact the structural integrity of the fairing 102 when exposed to hydrostatic pressure. Conversely, the single-bead-thickness of the wall 300 is free from air voids and pressure tolerant, such that the fairing 102 withstands approximately 9,000 psi hydrostatic pressure or greater, thereby ensuring that the underwater vehicle 100 can operate at a range of depths in the underwater environment.

To optimize hydrodynamic efficiency and reduce drag, an exterior surface 308 of the wall 300 may be smoothed, as shown in FIGS. 9C-9D. The exterior surface 308 may be smoothed during deposit of the layers 302 or otherwise prior to the layers 302 hardening (e.g., through cooling, curing, etc.), for example using a blade or similar smoothing tool. The exterior surface 308 may be smoothed by other smoothing techniques, including, without limitation, application of an additive polymer coating (e.g., Epoxy, urethane, high-build primer); chemical smoothing using a solvent (e.g., Acetone); sanding or machining; and/or the like. The additive coating may be brushed, rolled, sprayed, or similarly applied to the exterior surface 308. The exterior surface 308 may be smoothed without the use of coatings or chemicals.

While FIGS. 9C-9D illustrate just the exterior surface 308 of the wall 300 being smoothed, it will be appreciated that an interior surface and other surfaces may be smoothed using similar techniques as well. Accordingly, smooth surfaces of the fairing 102, including the exterior surface 308 of the wall 300, may be produced with minimal touch labor and post processing. Additionally, by manufacturing the fairing 102 through additive manufacturing, the fairing 102 may be produced quickly and simply at low cost. The various aspects of the fairing 102 may be customized or adjusted as needed without tooling. As described herein various mounts and other features may be incorporated into the fairing 102 during manufacturing, thereby reducing part count and complexity. The fairing 102 may be printed as separate portions, including the fairing portions 200-210, 278 and/or 284, and assembled after printing.

Using the additive printing process and other manufacturing techniques, the underwater vehicle 100 may be customized. In one implementation, the underwater vehicle 100 is manufactured as a kit that may be adapted to a target architecture involving a specific payload, mission, underwater environment, and/or the like. The underwater vehicle kit may include a base kit with a baseline architecture and common subsystems that may be customized according to the target architecture through scaling, shape change, customization of various internal components, and/or other changes to the underwater vehicle 100. In one implementation, the base kit includes a power distribution system, a power source, a navigation system, the propulsion system 116, a communication system, a controller, an emergency system, one or more payload interfaces, a load bearing frame, and/or the like within the fairing 102. Such base kit contents may be customized and/or removed, as well as additional contents added, according to the target architecture. Additionally, through the additive manufacturing process, the fairing 102 and various internal components, including the vehicle structure, may be manufactured according to customized fairing models and customized print instructions that may be easily modified according to the target architecture.

Turning to FIGS. 10-14F, various internal components 400 housed in the interior 212 of the fairing 102 are illustrated. The internal components 400 may include a frame 402, a tail brace 404, and a head brace 406. In one implementation, the head brace 406 extends proximally to a nose brace 408 to which the nose 114 may be mounted. The tail brace 404 may be disposed in the tail interior 268, the head brace 406 may be disposed in the head interior 232, and the frame 402 may be disposed in an interior of the body fairing. One or more ribs 410 may be mounted to the frame 410 and oriented transversely relative to a length of the frame 102. The fairing 102 may be attached to or otherwise cover the frame 402, the tail brace 404, the head brace 406, and the ribs 410, as well as other portions of the internal components 400. All or some of the frame 402, the tail brace 404, the head brace 406, the nose brace 408, and the ribs 410 may be load-bearing structures and define one or more internal compartments within the interior 212.

The internal components 400 may further include a power source 412, a floatation system 414, an emergency ascent control system 416, a first pressure vessel 418, a second pressure vessel 420, a tow system 424, and a navigation system 426. Additionally, the internal components 400 may include one or more computing systems for controlling various operations of the underwater vehicle 100, including movement, navigation, communication, emergency response, autonomous decisions, and/or other operations.

For example, a vehicle controller may direct operations, including autonomous operations, and the various systems of the underwater vehicle 100. The vehicle controller may be used to execute mission planning, mission control, mission diagnostics, post-mission analysis, vehicle autonomy, mission autonomy, load autonomy, vehicle system health monitoring, and/or the like. The vehicle controller may provide autonomous controlling and monitoring of the underwater vehicle 100, including navigation, vehicle health monitoring, communication, emergency system triggers, and mission execution. The autonomous operation of the vehicle controller may be based on control setpoints, including speed, orientation, power, depth, weight and balance, and/or the like. Additionally or alternatively, the autonomous operation may involve following a waypoint and/or executing one or more autonomous decisions according to a specific mission plan that is obtained prior to launch or during underwater operation on the fly. The autonomous decisions may include dive, line, loiter, spiral, forward thrust, reverse thrust, pitch, yaw, roll, and/or the like.

The power source 412 may include one or more power sources, such as batteries (e.g., lithium polymer batteries), of a power distribution system. In one example, the energy capacity of the power distribution system may be approximately 93 kWh with a charge time of approximately eight hours and providing approximately 300 DC bus voltage. The power source 412 may include a plurality of modules, such as six 15.5 kWh modules to provide an energy storage of 93 kWh. The plurality of modules of the power source 412 may be used to provide an energy storage that is scalable up to a desired energy capacity. The power source 412 may be swappable using the tray fairing 252.

In one implementation, the power distribution system further includes a first power system and a second power system. The first power system may be physically separated from the second power system. For example, the first power system may be disposed at the proximal end 104, and the second power system may be disposed at the distal end 106. The first power system may be housed in the first pressure vessel 418 positioned in the head interior 232, and the second power system may be housed in the second pressure vessel 420 positioned in the tail interior 268.

The first power system of the first pressure vessel 418 may have a lower power relative to the second power system of the second pressure vessel 420. The power distribution system, including the first power system and the second power system, is agnostic to energy source of the power source 412, while providing flexible options for voltages and power to the vehicle systems and payloads. The second power system may provide power to the propulsion system 116, while the first power system provides power to other components of the underwater vehicle 100. The high power of the second power system and the low power system of the first power system are separated into two separate pressure vessels (e.g., the first pressure vessel 418 and the second pressure vessel 418), which protects the electronics of the power distribution system from the harsh conditions of the underwater environment. The pressure vessels 418-420 are connected to each other and to each of the systems of the underwater vehicle 100 using subsea cables and bulkhead connectors on the pressure vessel end caps. Both the high power system of the second pressure vessel 420 and the low power system of the first pressure vessel 418 contain the ability to switch system circuits on and off as well as the ability to measure and report voltage and current measurement on each circuit.

In one implementation, a floatation compartment 422 is defined in the interior 212 and configured to house the floatation system 414. The floatation system 414 may include a plurality of trim and ballast, including, but not limited to buoyancy foam in modular blocks and trim weights, such as disks or rods made lead, brass, and/or the like. Aft ballast may be located at the distal end 106 of the underwater vehicle 100, and forward ballast may be located at the proximal end 104. To optimize buoyancy and trim of the underwater vehicle 100 during movement in the underwater environment, the trim and ballast of the floatation system 414 may be added, shifted, or removed based on the operational environment, payload sensor configuration, and the weight of the underwater vehicle 100, including any payloads included in the interior 212. Static ballast change can alter the buoyancy of the underwater vehicle 100.

The emergency ascent control system 416 includes emergency ballast and a controller, such as an Emergency Logic Board. In one implementation, the emergency ascent control system 416 includes redundant emergency ascent weights that may be released as needed for the underwater vehicle 100 to ascend to the surface of the underwater environment upon detection of an emergency condition. Each emergency ascent weight may provide enough positive buoyancy to overcome a pressure vessel seal failure and/or flood event. For example, the emergency ascent weight may provide sufficient weight to overcome 125% of ballast lost (e.g., approximately 75 pounds of buoyancy per weight). A firing mechanism releases the ascent weights, which may be triggered according to emergency protocols, in response to commands from the vehicle controller, upon the use of a backup power source, upon expiration of a timer corresponding to a maximum mission length, in response to a command received over the communication system from a remote computing system (e.g., an operator system), and/or the like. Each of the ascent weights has a redundant firing mechanism. More particularly, the subsea cable and bulkhead connector of each firing mechanism contains redundant electrical signals. The emergency ascent control system 416 may be powered by a backup battery if the power source 412 is offline.

The underwater vehicle 100 may include one or more backup batteries for various critical components of the internal components 400. There may be one or more backup batteries for providing emergency power to navigation, communication, emergency, location, and other critical operations and systems. For example, there may be a 24V battery providing backup power to navigation, communication, emergency, and autonomous systems. The location beacon and Global Positioning System (GPS) may include a backup battery for use when the power source 412 and the 24V backup battery experience power loss. There may further be an integrated backup battery to enable navigation information to be maintained for an elapsed time (e.g., 5 minutes) after a power loss. Additionally, an acoustic modem may carry a backup battery (e.g., 30 day) to facilitate localization and communication of the underwater vehicle 100 in the event of a power loss. There may be additional emergency systems and operations to ensure successful recovery of the underwater vehicle 100, as well as data captured during or otherwise associated with a mission of the underwater vehicle 100 in the underwater environment.

In connection with launch and recovery of the underwater vehicle 100, the lift system 112 and the tow system 424 may be used. The underwater vehicle 100 may be launched via a pier-launch and towed to a mission deployment site using the tow system 424, or the underwater vehicle 100 may be transported to the mission deployment site using a vessel and launched. Similarly, the underwater vehicle 100 may be recovered at a mission recovery site and lifted onto the vessel using the lift system 112 or towed to a pier or similar structure using the tow system 424, where it is lifted from the water. Out of the water, the underwater vehicle 100 may be supported on a deck of the vessel or the pier using the skates 108.

The lift system 112 is used as a single point lift to deploy the underwater vehicle 100 into the water from a pier or vessel. The lift system 112 may include a shackle mounted to the frame 402 as the singe point lift. In one example, the shackle is approximately 1.25 inches thick and has a 14,000 pound capacity. However, other shackle characteristics or lift mechanisms are contemplated. A docking head, for example, of a crane or A-frame may be used to lift and lower the underwater vehicle 100 using the shackle. The shackle of the lift system 112 may be disposed entirely within the drag skin 248 and easily accessible through the slits in the drag skin 248, thereby facilitating access for launch and recovery while reducing drag during operation in the underwater environment.

The tow system 424 is similarly disposed entirely within the drag skin 214 when in a stow position, thereby reducing drag during operation. The tow system 424 is biased into the stow position, ensuring that the tow system 424 remains entirely within the drag skin 214 when not in use. The tow system 424 is accessible through the slits in the drag skin 248 to move the tow system 424 into the tow position for towing the underwater vehicle 100. In recovering the underwater vehicle 100, a pop off float may be attached to the single point lift or the tow system 424. In one example, a line is fed through or attached to the shackle of the lift system 112 during recovery.

Between launch and recovery, the underwater vehicle 100 navigates autonomously, semi-autonomously, and/or through remote operation using the navigation system 426. The vehicle controller may autonomously navigate the underwater vehicle 100 according to a mission plan using the navigation system 426. Mission planning may be conducted using a remote computing system in communication with the underwater vehicle 100 before, during, and/or after a mission.

Navigation of the underwater vehicle 100 may utilize one or more navigation sensors, including, without limitation, inertial sensors (including attitude and heading reference system (AHRS), inertial navigation system (INS), etc.), Doppler Velocity Loggers (DVL), acoustic sensors, imagers, Ring Laser Gyroscopes (RLG), accelerometers, pressure sensors, GPS, sound velocity sensor (SVS), Conductivity and Temperature Sensor (CT), Forward Looking Sonar (FLS), and/or the like. In one implementation, the navigation system 426 includes an INS, DVL, and pressure sensor housed in an integrated sensor module that is swappable with an adapter plate. The navigation system 426 may be disposed in the head interior 232 on the underside of the underwater vehicle 100. Other navigation sensors may be disposed in other locations of the underwater vehicle 100 and/or in the integrated sensor module.

In addition to these sensors, the underwater vehicle 100 has a payload including, a survey payload, alternate payloads, and/or mission specific payloads, as well as payload interfaces. In one implementation, the survey payload is configured to obtain a survey of the underwater environment. The survey payload captures data over one or more frequencies. For example, the survey payload may scan at side scan frequencies ranging from approximately 75 kHz to 1600 kHz. Multiple frequencies may be scanned simultaneously in some implementations. The alternate payloads may include, without limitation, a multibeam echosounder, an interferometric synthetic aperture sonar to replace side scanning, a low frequency ultra-wideband synthetic aperture sonar, a subsea camera, a magnetometer, and/or the like.

The payload interfaces may control and facilitate connection and communication with other vehicle systems, such as power, navigation, communications, and/or the like. As described herein, the power distribution system may include isolation of different vehicle subsystems as a protection against failure. The payload power inputs may be isolated, such that raw battery power is 300V nominal up to 3000 W, as well as 48V regulated up to 500 W and 24V regulated up to 500 W. With respect to navigation, low latency navigational data may be available through a direct feed from the vehicle controller to the payload. Differential and single-ended pulse-per-second may be available through a payload communications cable for timekeeping. Various wired or wireless connections may be used for communication between the payload and the vehicle systems.

Figure 15:
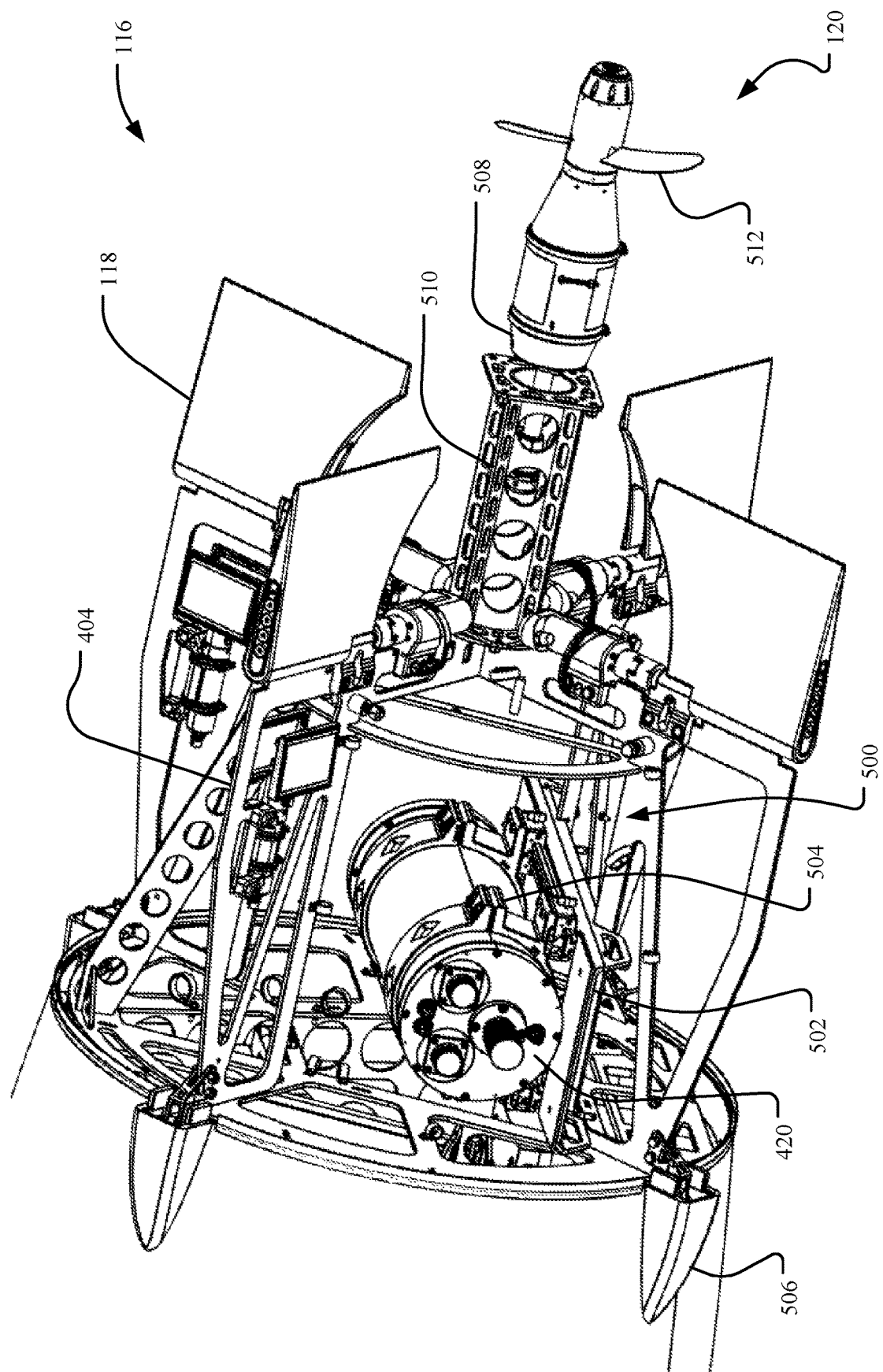
FIG. 15 illustrates a detailed view of an example interior of a tail of the underwater vehicle.

For a detailed description of the vehicle systems associated with the propulsion system 116, reference is made to FIGS. 15-16H. In one implementation, the distal end 106 of the underwater vehicle 100 includes the propulsion system 116 at least partially disposed in the tail interior 268.

In one implementation, the tail interior 268 includes a tail power bay 500 housing the second pressure vessel 420. The tail brace 404 may form the tail power bay 500 at least in part. A power mount 502 connects to the tail brace 404, and the second pressure vessel 420 is secured to the power mount 502 using one or more mounting brackets 504.

The tail brace 404 may include a plurality of brace arms corresponding to the plurality of control fins 118. In one implementation, a first portion of the tail brace 404 includes a first brace arm and a second brace arm connected to each other with a first arm mount, and a second portion of the tail brace 404 includes a third brace arm and a fourth brace arm connected to each other with a second arm mount. The first portion and the second portion of the tail brace 404 may be mounted within the tail interior 268 in an intersecting configuration, such that the first arm mount and the second arm mount extend at an angle (e.g., perpendicularly) relative to each other from a tail brace center. Each of the brace arms extends proximally from a corresponding arm mount at equidistant locations about the tail brace center.

The plurality of control fins 118 and a plurality of strake caps 506 may be mounted to the tail brace 404 relative to each other. In one implementation, each strake cap 506 is mounted near a proximal end of a corresponding brace arm, and a corresponding control fin 118 is mounted near a distal end of the corresponding brace arm. Each of the brace arms of the tail brace 404 may extend through and/or be mounted within one of the strake channels 272 of the tail fairing 210. In this arrangement, the strake caps 506 cover the strake channels 272 of the strakes 270 at the proximal end 260 of the tail fairing 210, and the control fins 118 extend from the strake channels 272 at the distal end 262 of the tail fairing 210.

In one implementation, the thruster assembly 120 is mounted to the tail brace 404 at the tail brace center, such that the control fins 118 and associated strake caps 506 and brace arms are positioned at equidistant locations about the thruster assembly 120. The thruster assembly 120 includes a thruster 508 connected or otherwise supported in the propulsion system 116 using a thruster mount 510. The thruster 508 may be connected to permit rotation of one or more propellers 512. The thruster 508 may be direct drive to eliminate gear drag and reduce noise to optimize operation of the underwater vehicle 100 during missions.

The thruster mount 510 may further be supported by one or more thruster stiffeners extending along the thruster mount 510. The thruster 508 may be mounted to the thruster mount 510 using one or more clamps. The thruster assembly 120 is housed at least partially within the thruster interior 290 of the thruster fairing 278. For example, the thruster assembly 120 may be mounted, such that only a distal end of the thruster 508 containing the propellers 512 extends distally from the thruster fairing 278. The control fins 118 may be connected to the thruster mount 510.

Turning to FIGS. 16A-16H, in one implementation, each of the control fins 118 are disposed near an aft-end of the underwater vehicle and includes a fin body 514 extending between a proximal end and a distal end and an inner end and an outer end. The control fin 118 may be oriented such that the fin body 514 extends from the proximal end to the distal end in a direction away from the distal end 262 the tail fairing 210. In this orientation, the inner end of the fin body 514 is positioned proximate to the thruster fairing 278. The inner end of the fin body 514 may have a shape mirroring a shape of the exterior surface 280 of the thruster fairing 278. The fin body 514 may taper distally in thickness from the proximal end to the distal end to maximize hydrodynamic efficiency. Thus, in one implementation, the shape of the control fins 118 follows the profile of the static strakes 270 and strake caps 506, thereby forming a low-drag profile.

In one implementation, a cap assembly 516 includes a first plate disposed at the outer end of the fin body 514 and a second plate disposed within an opening on the inner end of the fin body 514 to connect the fin body 514 to a fin mount assembly. The fin mount assembly includes a mounting bracket 518 of a control fin axel, a shaft coupling having a first shaft coupling portion 520 flexibly connected with a second shaft coupling portion 522, a mounting bracket 524, a drive clamp 526, a rotary actuator 528, and a drive shaft 530. In one implementation, the drive shaft 530 is operationally connected with the rotary actuator 528 within the shaft coupling and extends through a channel defined in the mounting bracket 518 into a fin channel defined in the fin body 514 at the proximal end. The drive shaft 530 is mounted to the fin body 514 using the cap assembly 516. The mounting brackets 518 and 524 mount the control fin 118 to the tail brace 404, and the rotary actuator 528 is further secured to the mounting bracket 524 using the drive clamp 526.

The control fins 118 provide control of the underwater vehicle 100 during movement generated using the thruster assembly 120. The control fins 118 may be moved to control a heading of the underwater vehicle 100. Movement of the control fins 118 may be controlled using the vehicle controller according to autonomous decisions of the vehicle controller and/or remote input from an operator. The rotary actuator 528 produces a rotary motion or torque that is transferred to the fin body 514 using the drive shaft 530. The cap assembly 516 mounted to the drive shaft 530 provides a torque transfer mechanism between the rotary actuator 528 and the fin body 514. In one example, the control fins 118 provide 50 ft-lbs maximum torque per control fin 118, with a 9 RPM maximum speed, and an absolute angular feedback to 0.1 degrees.

Additionally, the control fins 118 are configured for optimized manufacturability and maintenance. The fin body 514 may be a cast molded polyurethane part. Accordingly, the fin body 514 may be manufactured rapidly using additive manufacturing, as described herein. From an initial blank part, a soft silicone mold may be created, enabling rapid reproduction. Various aspects of the control fins 118 may be easily accessed for maintenance with minimal parts removed. For example, the cap assembly 516 may include a set of low-cost waterjet or laser cut stainless steel plates mounting to the drive shaft 530 using a torque transfer key. As described above, the cap assembly 516 assembles into the core of the fin body 514, providing the torque transfer for the size of the underwater vehicle 100 while reducing the number of fasteners to two plates that are each accessible from the outside of the underwater vehicle 100. Additionally, the low-cost additive manufacturing method for the fin body 514 allows for the torque transfer mechanism the cap assembly 516 to be easily integrated.

As described herein, the propulsion system 116, including the control fins 118 and the thruster assembly 120 are powered using the second power system. As can be understood from FIGS. 17A-17F, the first power system is separated from the second power system in isolated pressure vessels (e.g., 418-420) to increase protection from the harshness of the underwater environment 100.

In one implementation, the frame 402 includes a set of support plates attached to each other to form a top support 600. The lift system 112 may be connected to the top support 600. Each of the support plates includes a center support 602, a distal support 604, and a proximal support 606, each extending from the top support 600 to a bottom support 608. The support plates may further include other supports, such as angled supports extending from the top support 600 at the center support 602 along an angle to the bottom support 608 near one of the proximal support 606 or the distal support 604.

The support plates are oriented at an angle relative to each other, such that the support plates are connected to each other at a top end to form the top support 600 and the bottom supports 608 are separated from each other by a distance. The angle may range, for example, between approximately 10 degrees and 60 degrees and in one particular example may be approximately 36 degrees. A distal support brace 610 may extend distally from the support plates into the tail interior 268, and a proximal support brace 628 may extend proximally from the support plates into the head interior 232. The head brace 406 may further include a set of system support braces 612 in the head interior 232, and a power brace 622 may be disposed in the head interior 232.

In one implementation, the proximal support brace 628, the power brace 622, and the head brace 406, including the system support braces 612, extend from a nose frame 614 distally to a proximal bulkhead 616. The proximal supports 606 of the support plates may be connected to the proximal bulkhead 616, such that the top support 600 and the bottom supports 608 each extend distally from the proximal bulkhead 616 to a distal bulkhead 618. The distal supports 604 of the support plates may be connected to the distal bulkhead 618. The distal support brace 610 extends distally from the distal bulkhead 618 to a tail frame 620. A floatation system plate 626 may extend from the proximal bulkhead 616 to the distal bulkhead 618 forming a payload bay 624 separate from the floatation department 422. The ribs 410 may secure the floatation system plate 626 to the top support 600.

Figure 17A:
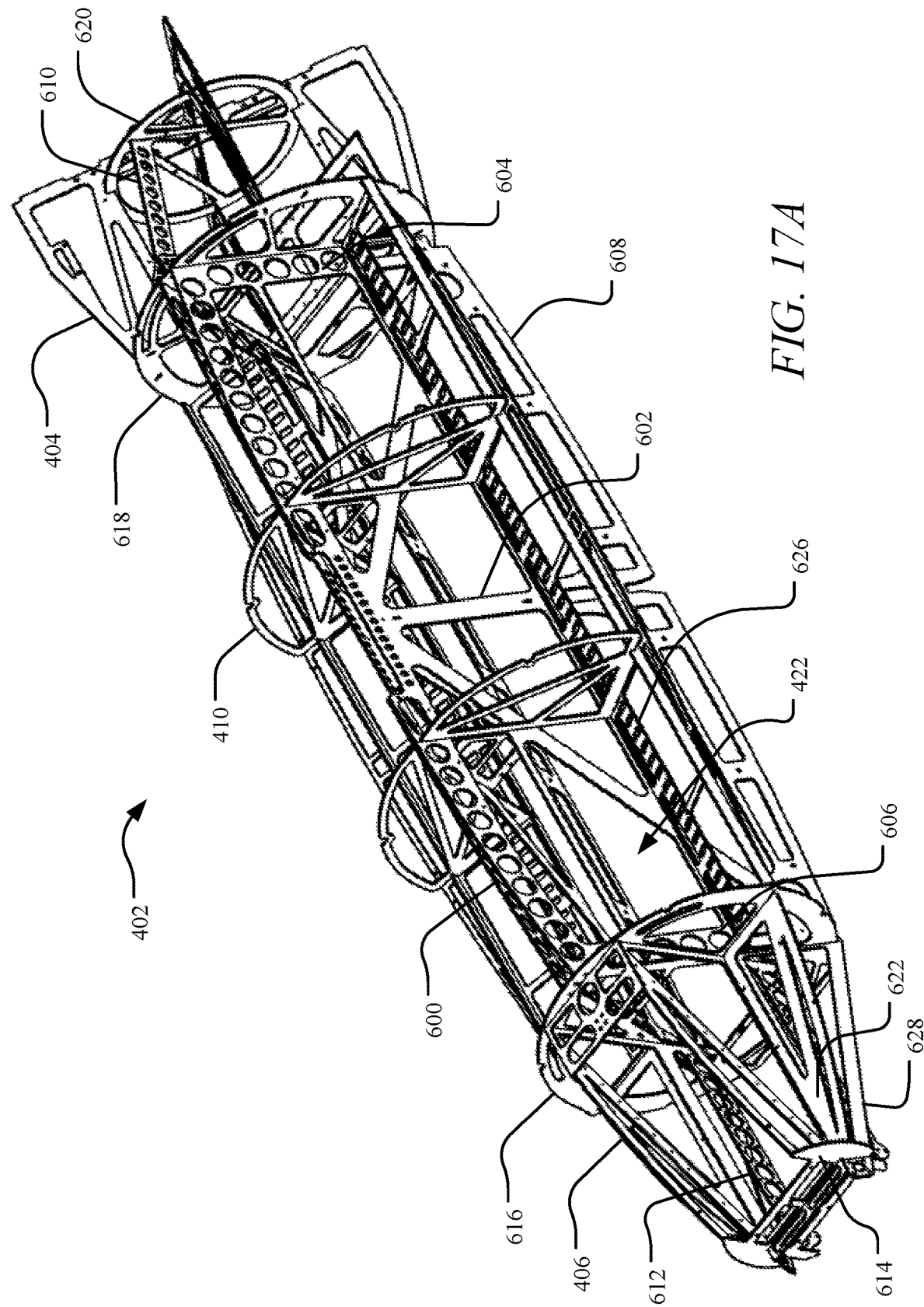
FIGS. 17A and 17B a top perspective view and a bottom perspective view, respectively, of an example frame of the underwater vehicle.
Figure 17B:
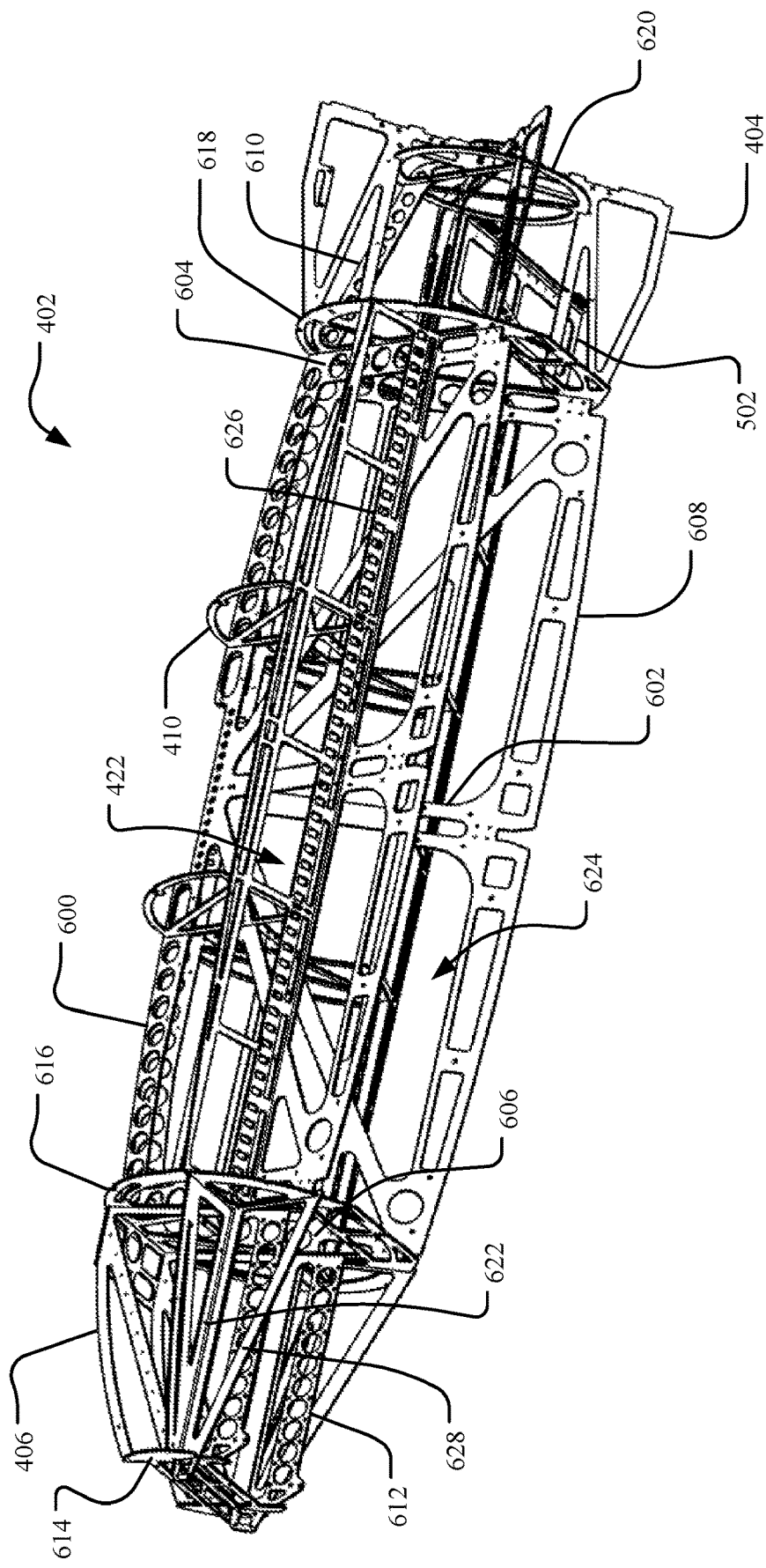
Figure 17C:
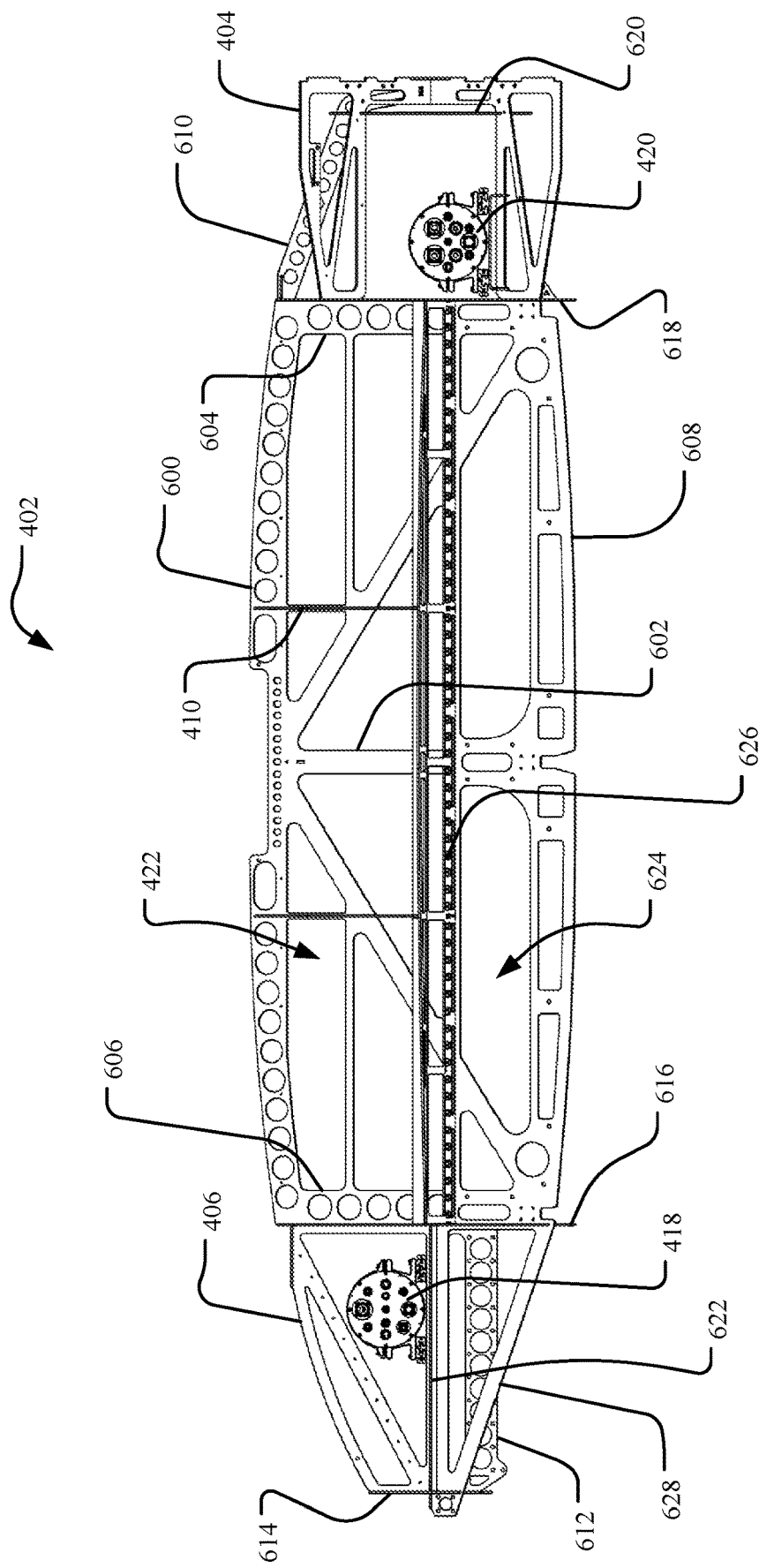
FIGS. 17C, 17D, 17E, and 17F illustrate a side view, a side perspective view, a top view, and a bottom view of example pressure vessels of a power distribution system deployed in the frame of the underwater vehicle.
Figure 17D:
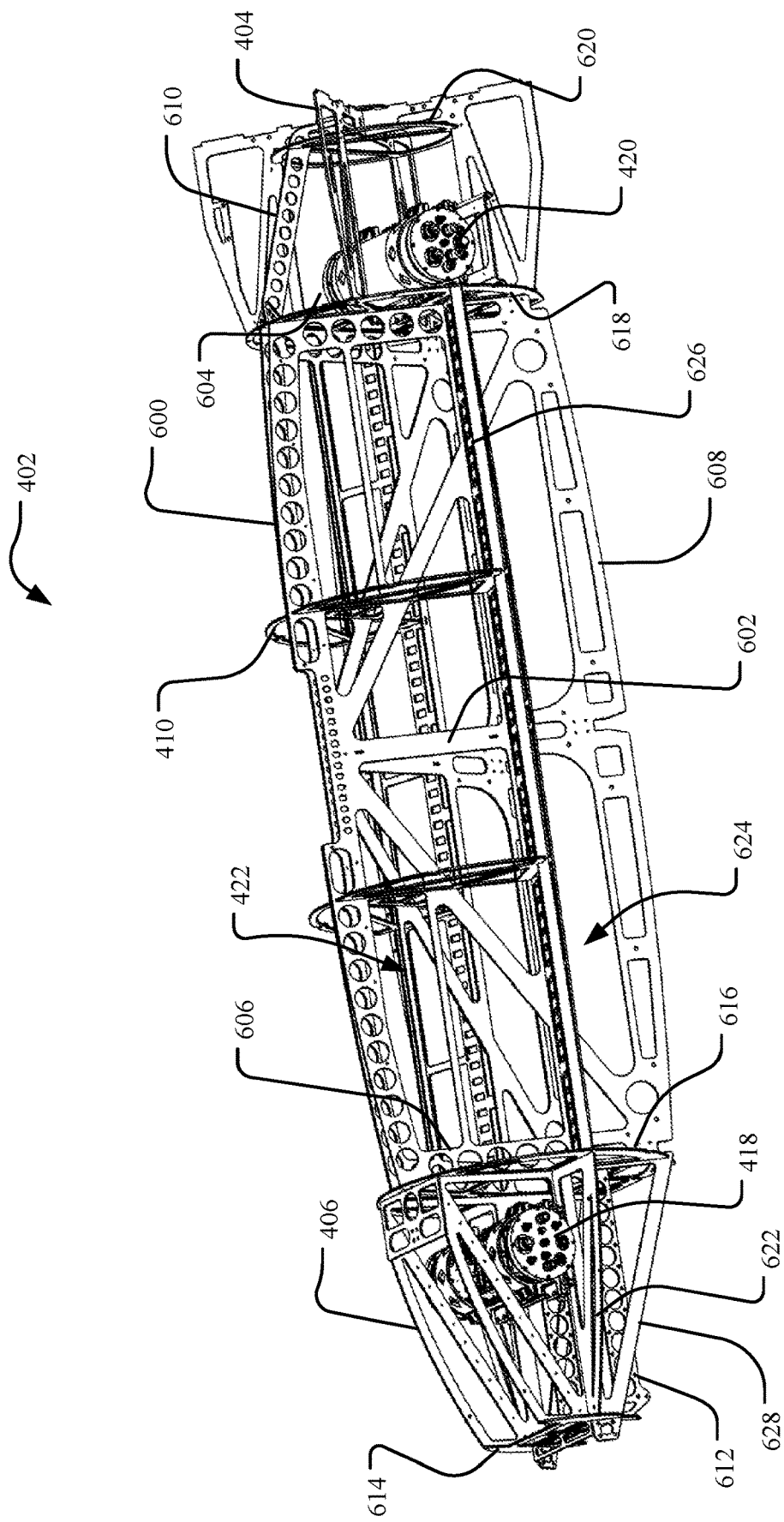
Figure 17E:
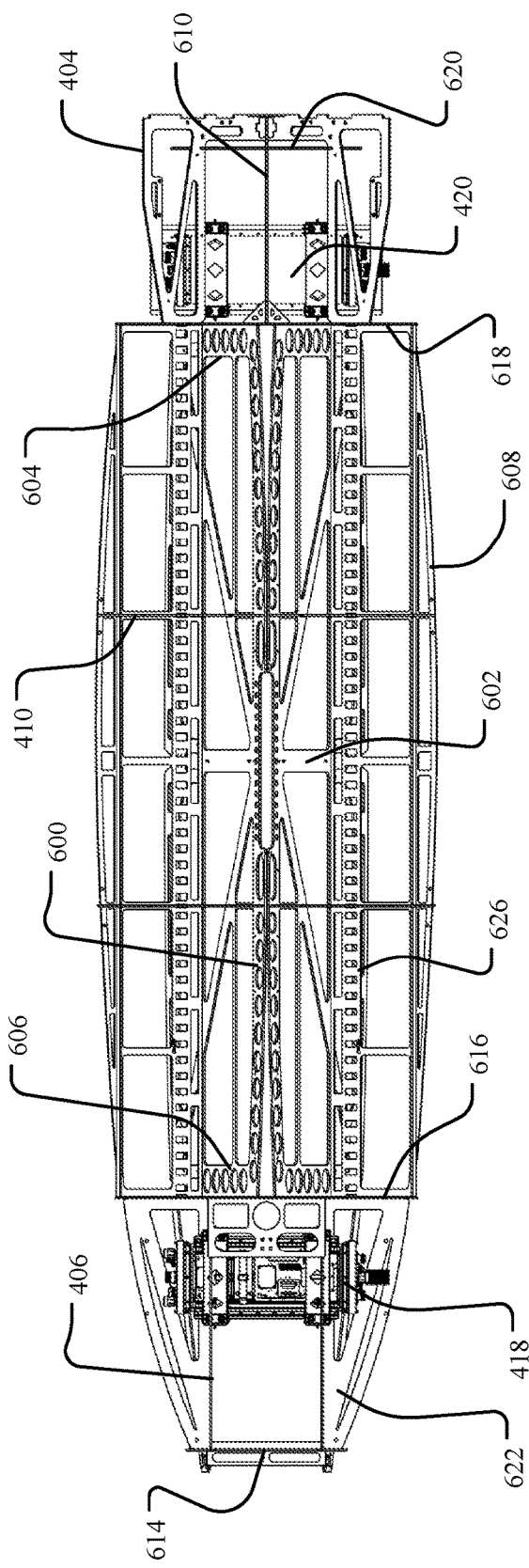
Figure 17F:
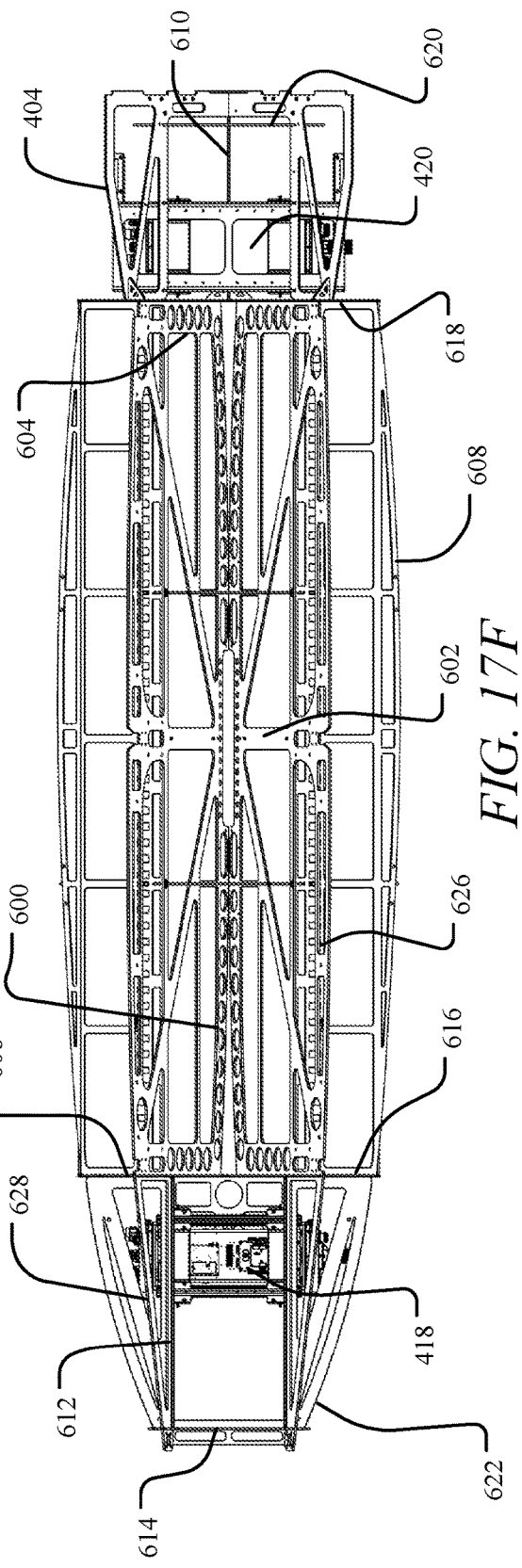

The various components of the frame 402 shown in FIGS. 17A-17B may form a primary frame structure. The components of the primary frame structure may include a plurality of cutouts, reducing an overall weight of the frame 402 while providing load-bearing support. The cutouts may be created, for example, via waterjet cutting, laser cutting, and/or the like. Accordingly, in one example, the primary frame structure weighs approximately 190 pounds. The components of the primary frame structure may be attached using a tab slot connection and welded together. However, other connection mechanisms, including fasteners (e.g., bolts, screws, etc.) may be utilized. Various portions of the components of the primary frame structure may be made from sheets that are approximately 0.25 and/or 0.5 inches thick and made from a variety of materials, including, without limitation, aluminum or aluminum alloys, stainless steel, titanium, plastic, and/or the like. It will be appreciated that all or some of the components of the primary frame structure may be manufactured using additive manufacturing, as detailed herein.

The proximal bulkhead 616 separates the head interior 232 from an interior of the body fairing, including the floatation compartment 422 and the payload bay 624. Similarly, the distal bulkhead 618 separates the tail interior 268 from the interior of the body fairing, as well as the head interior 232. Accordingly, separate pressure vessels are created to isolate subsets of the internal components 400 from each other. As shown in FIG. 17C-17F, the first power system may be isolated from the second power system, as well as the floatation compartment 422 and the payload bay 624 in this manner.

Figure 18:
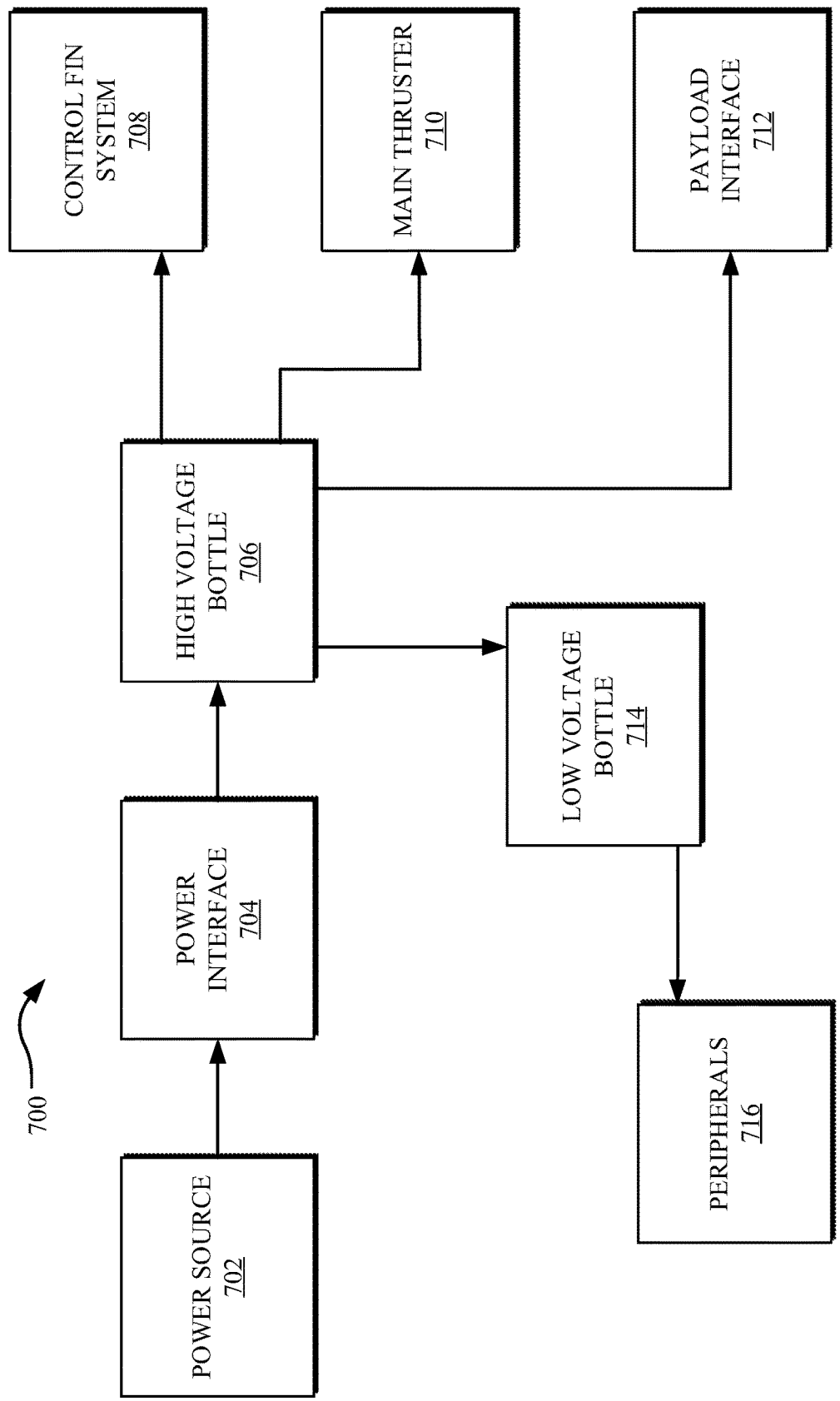
FIG. 18 illustrates a block diagram of an example power distribution system of the underwater vehicle.
Figure 19:
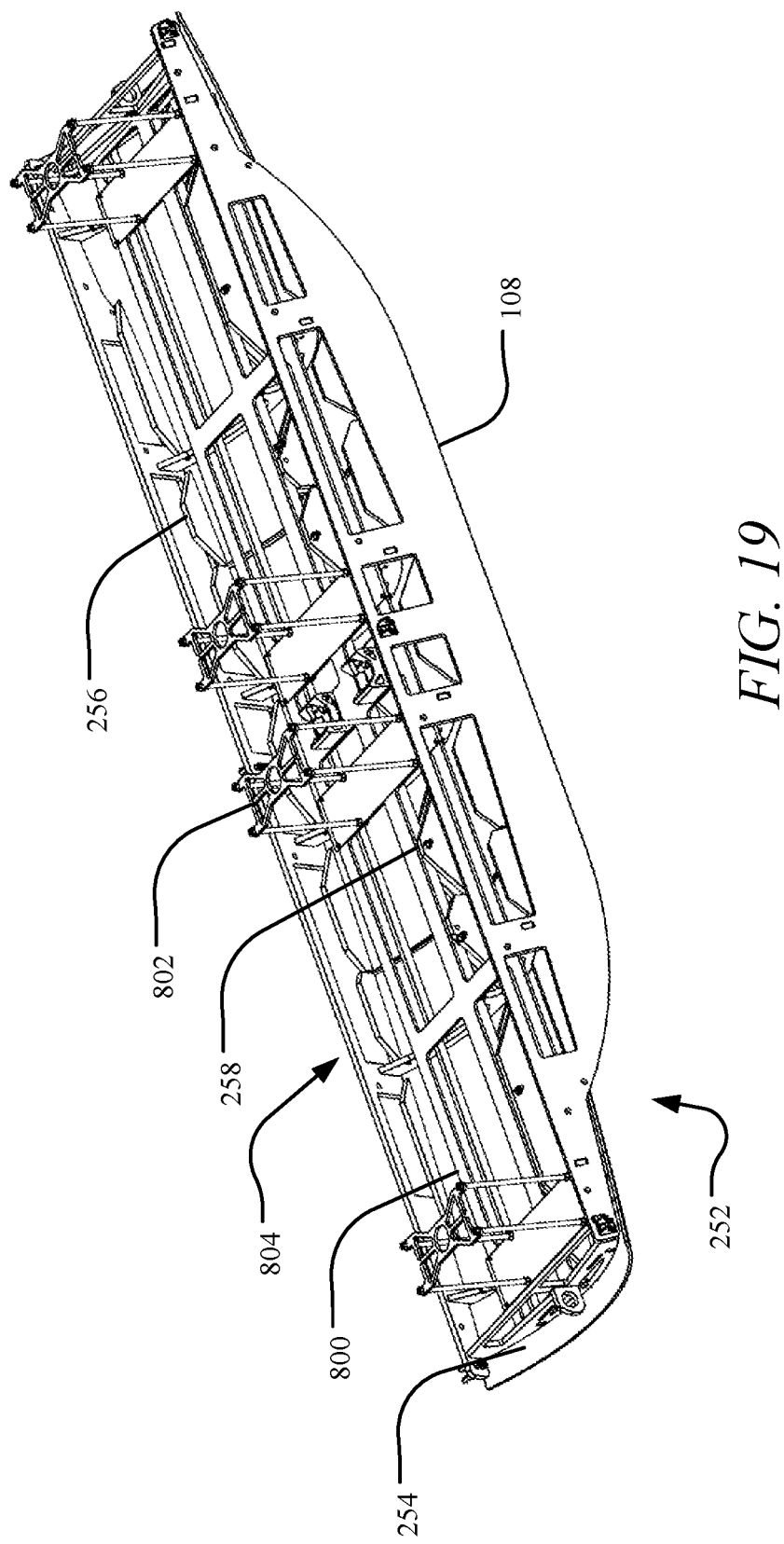
FIG. 19 shows an example bottom tray for the underwater vehicle.

More particularly, turning to FIG. 18, in some instances, the underwater vehicle 100 may transit at high speeds involving the propulsion system 116 utilizing power loads significantly exceeding a sum (e.g., by 50 times) of other systems of the underwater vehicle 100. Due to these high loads, a power source 702 of a power distribution system 700, such as the power source 412, may be configured to minimize the amperage transmitted through subsea connectors between the power source 700, a high voltage bottle 706 (e.g., the second power system), and a main thruster 710, including the thruster assembly 120. For example, the power source 702 may include a 300 VDC battery or utilize a power interface 704 between the power source 702 and the high voltage bottle 706 if the energy source cannot be supplied at 300 VDC. The high voltage bottle 706 is responsible for accepting a 300 VDC nominal input and distributing the bus voltage to the main thruster 710, as well as other components, including but not limited to, a control fin system 708 the vehicle payload, hovering thrusters, and/or other systems and components. The high voltage bottle 706 may also convert the 300 VDC to both 48 VDC and 24 VDC busses for the remainder of the vehicle systems and payload connections of the underwater vehicle 100 via a payload interface 712. The 24 VDC bus may be transmitted to a low voltage bottle 714 (e.g., the first power system) through subsea connectors and cables. The low voltage bottle 714 accepts the 24 VDC bus from the high voltage bottle 706. Before distributing this voltage, the power path travels through a back-up battery system with an auto change-over system. The back-up battery system resides in the low voltage bottle 714, such that if main power is disrupted from the high voltage bottle 706, the auto change-over system will instantly move the power source of the low voltage bottle 714 to the back-up battery, thereby ensuring the vehicle computer, including autonomous systems, and emergency response systems, including the emergency ascent control system 416, as well as other peripherals 716, do not experience an interruption to power input.

Generally, the power distribution system 700 forms a high power pressure vessel and a low power pressure vessel connected with a bus (e.g., a 24V bus). The high power pressure vessel includes a high power distribution board with a thruster motor controller and an environmental monitoring board. The high power distribution board receives power from the power source 702 and provides power to vehicle payloads (e.g., at 24V, 48V, and 300V) via the payload interface 712, the control fin system 708, the main thruster 710, a hovering system, a variable buoyancy system, and/or the like. The low power pressure vessel includes a backup battery system, a low power distribution board and an environmental monitoring board. The low pressure vessel receives power from the high power pressure vessel and provides power to the peripherals 716, including navigation sensors, communication systems (e.g., acomms, radio, WiFi, etc.), emergency systems, location beacon, floatation release systems, forward looking sonar, and/or the like.

The power source 702, such as the power source 412, may be disposed in the payload bay 624 formed by the floatation system plate 626 and a tray, including the tray fairing 252. The tray is removably connected with the primary frame structure, to replace, swap, or otherwise customize the power source 412 and the payload. The tray may be configured to minimize weight. In one example, the tray weighs approximately 125 pounds. In one implementation, the tray includes a tray brace 800 attached to the tray fairing 252, for example using the side tray mounts 256 and the center tray mount 258. The tray brace 800 support the power source 412. For example, one or more clamping plates 802 may connect to the tray brace 800 to form battery compartments 804 for housing and supporting the batteries of the power source 412. The tray may further house and support the payload.

Figure 20:
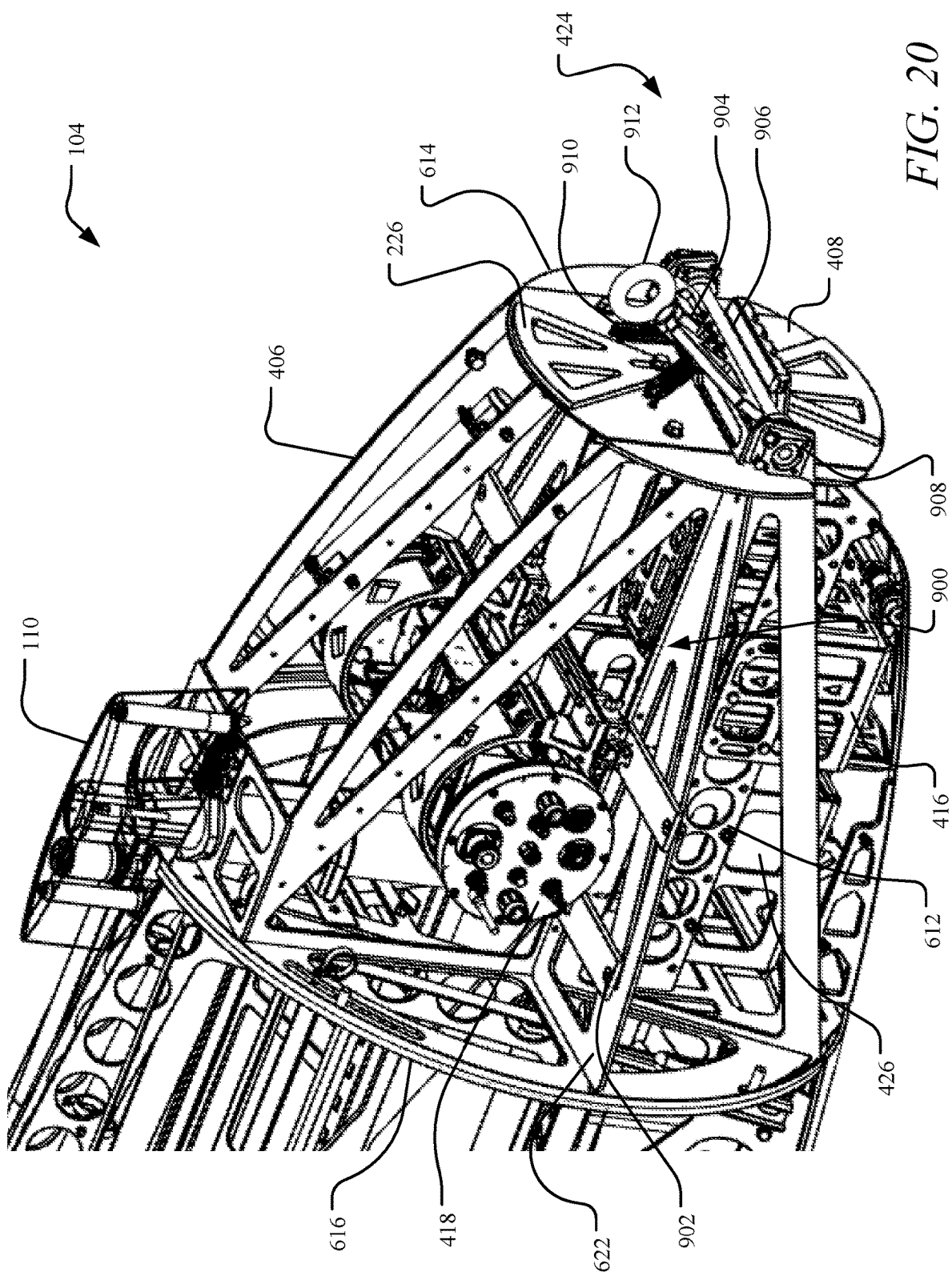
FIG. 20 illustrates a detailed top side view of an example interior of a head of the underwater vehicle.
Figure 21:
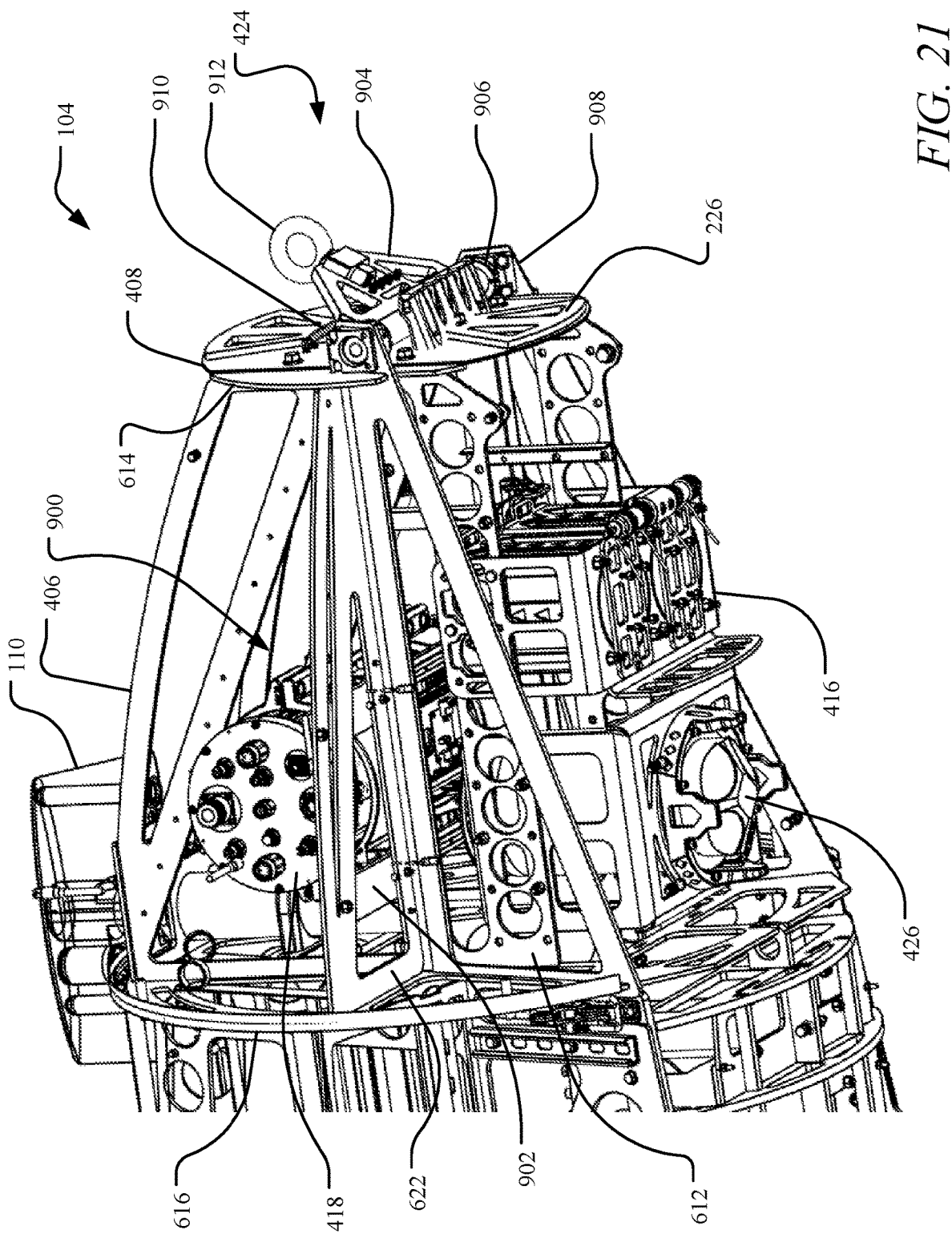
FIG. 21 shows a detailed bottom side view of an example interior of a head of the underwater vehicle.
Figure 22D:
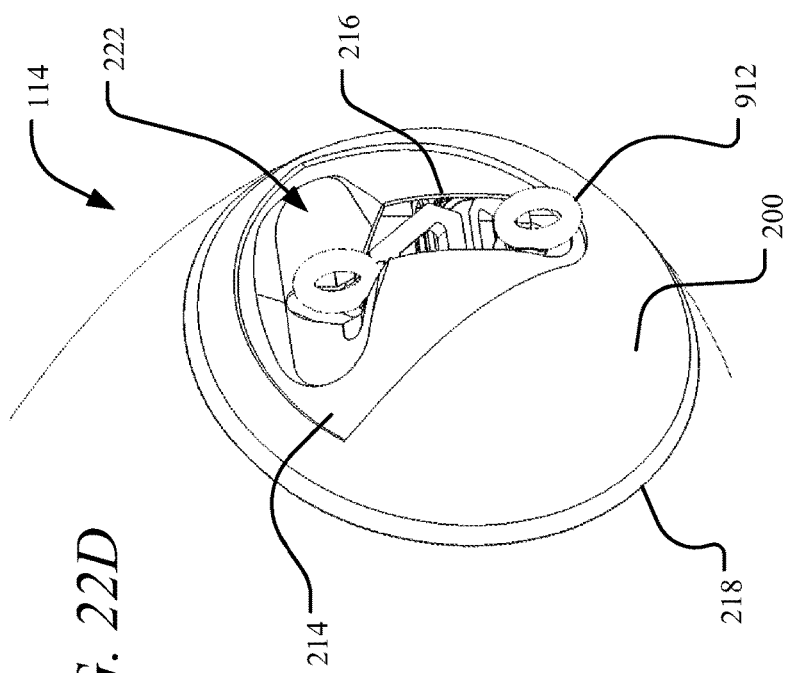
FIGS. 22C and 22D are a cutaway side view and a cutaway front perspective view, respectively, illustrating movement of the tow system between the stow configuration and the tow configuration.
Figure 22C:
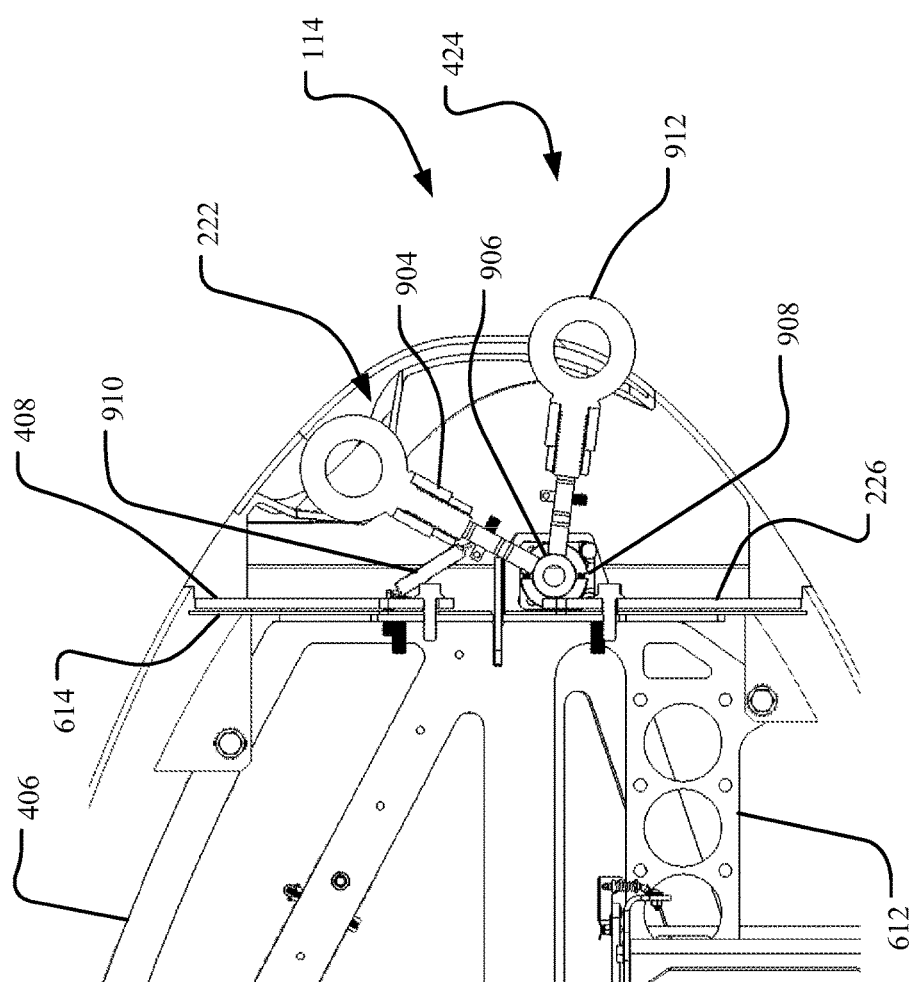
Figure 23A:
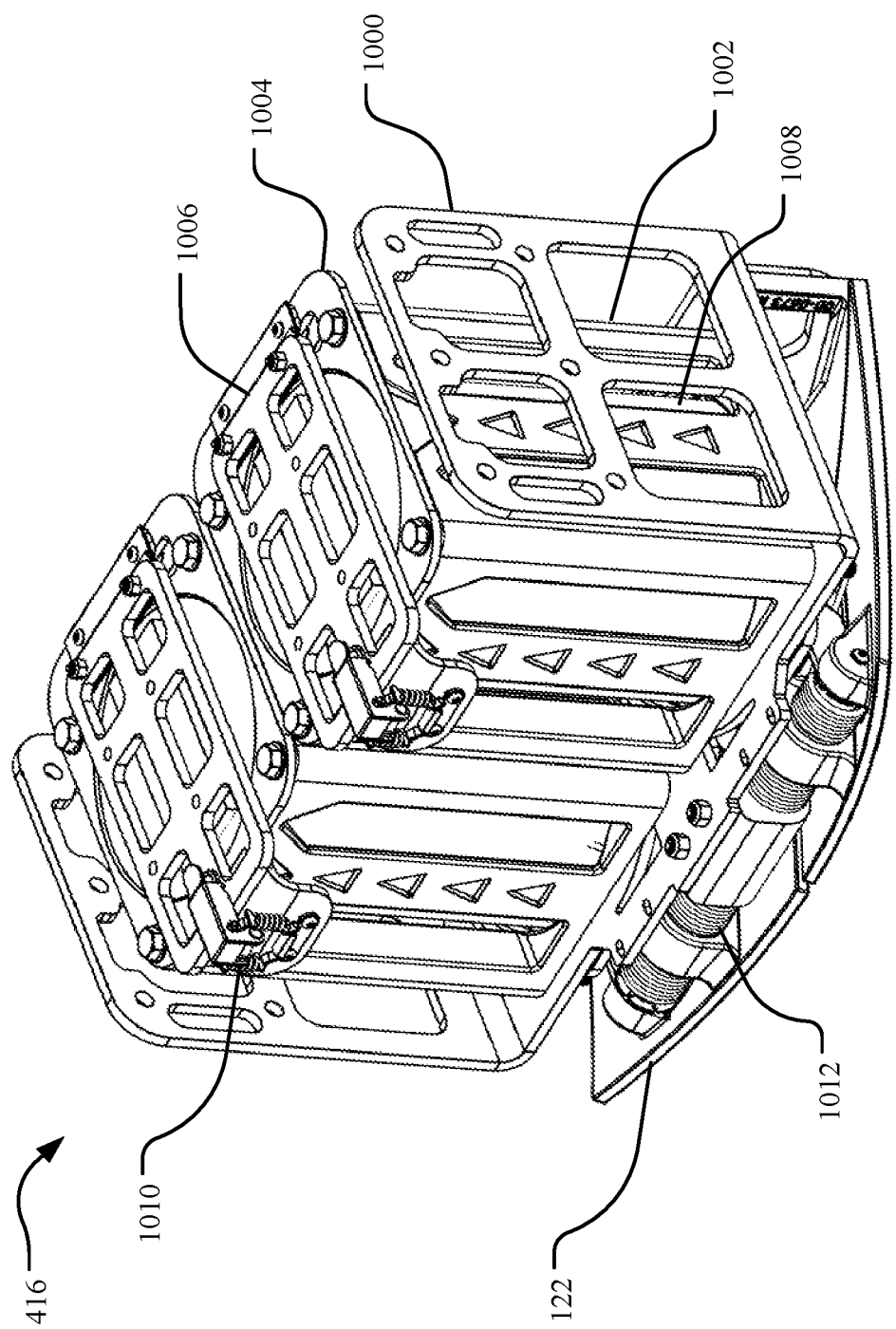
FIG. 23A-23C illustrates an example emergency ascent control system.
Figure 23B:
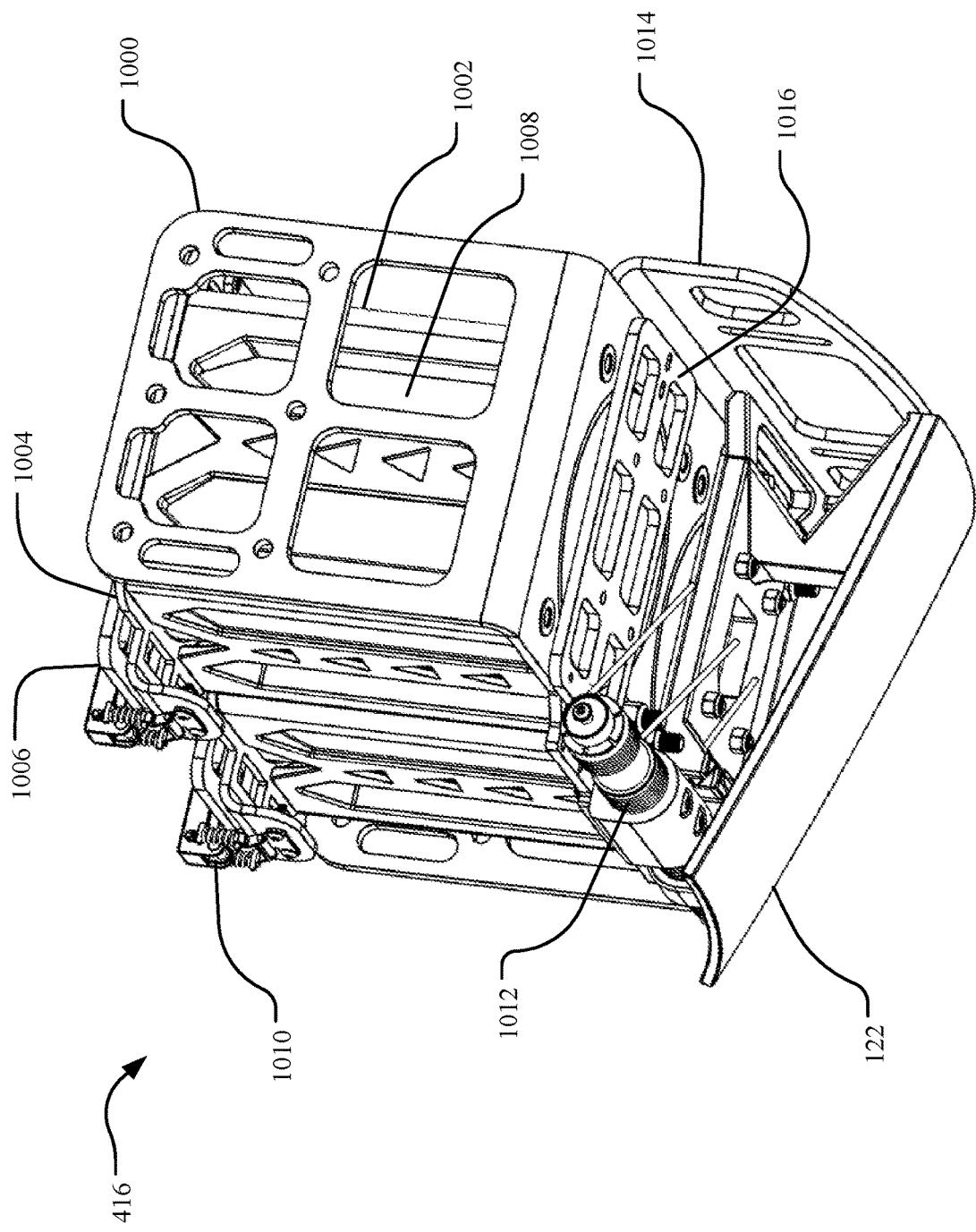
Figure 23C:
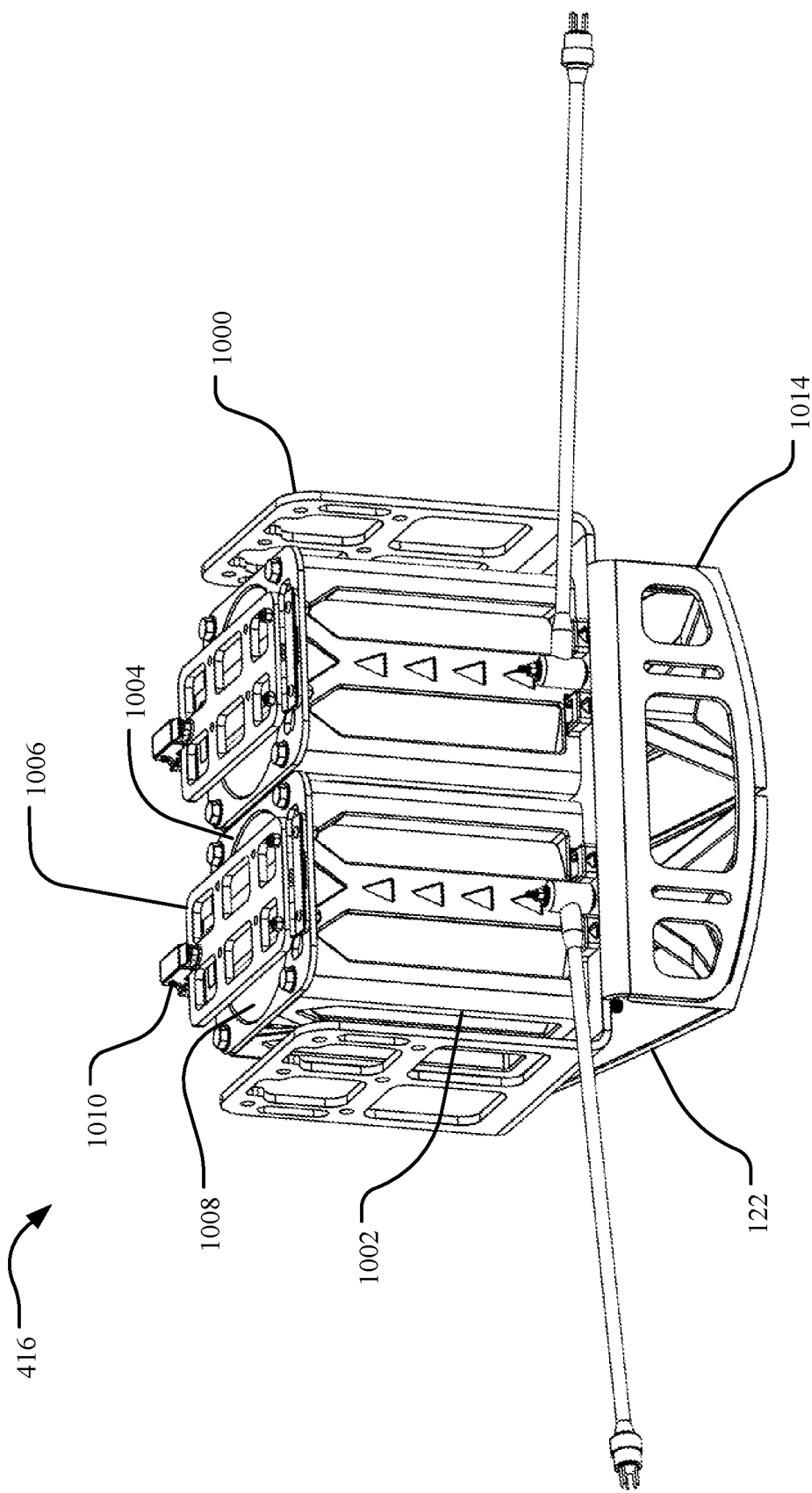
Figure 23G:
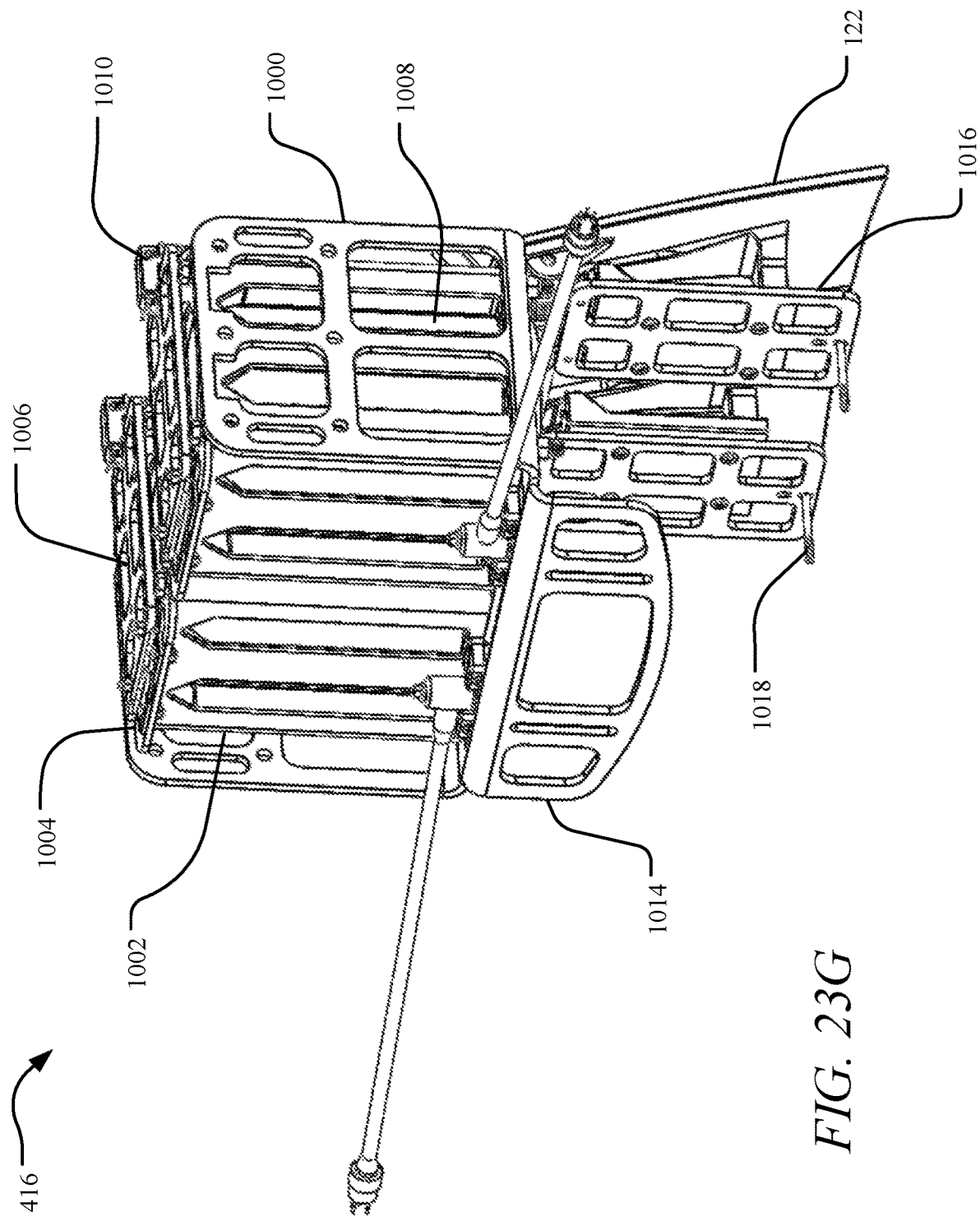
FIG. 23G shows the emergency ascent control system in an emergency ascent state dropping emergency ascent weights.
Figure 24A:
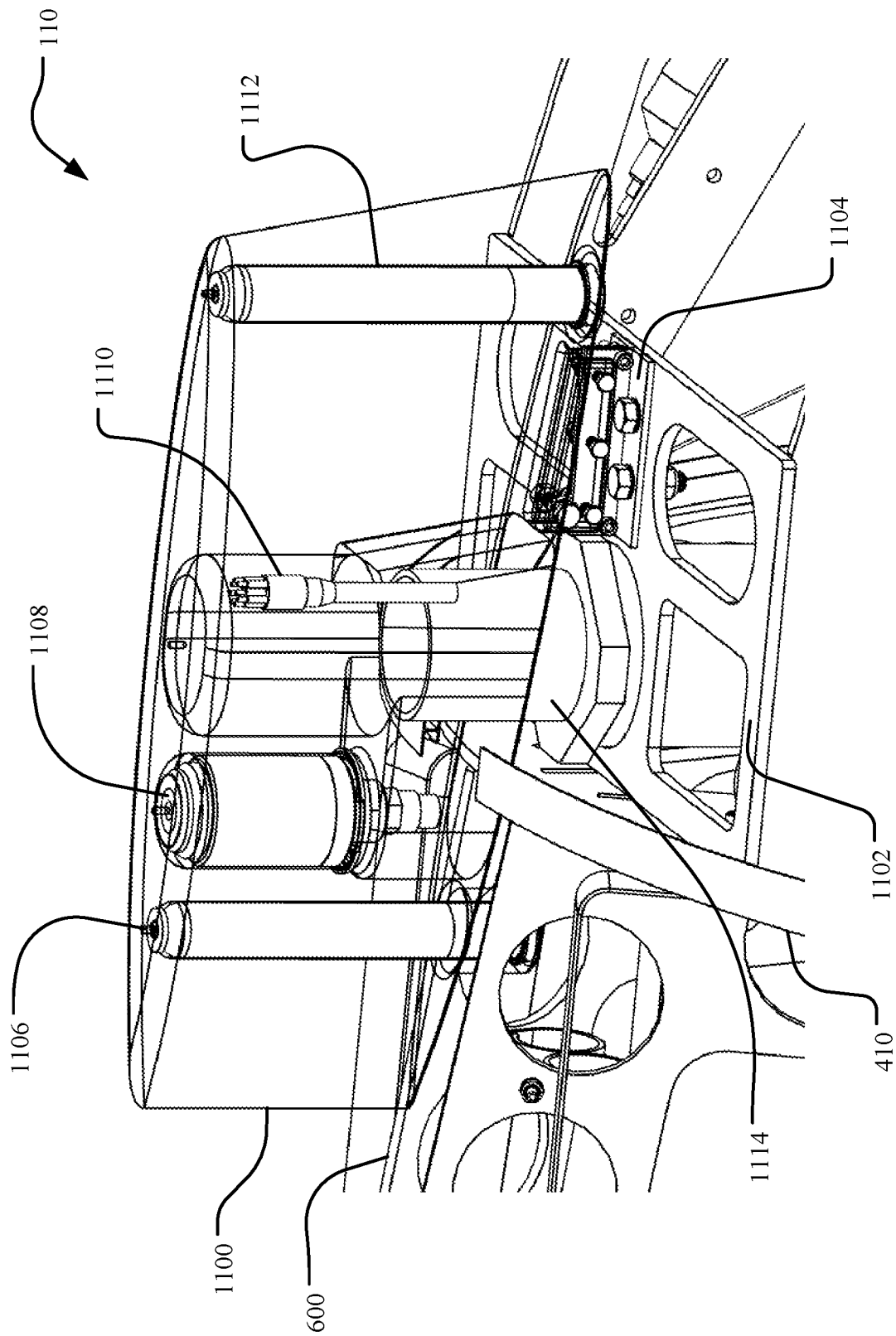
FIG. 24A illustrates an example communication mast.
Figure 24C:
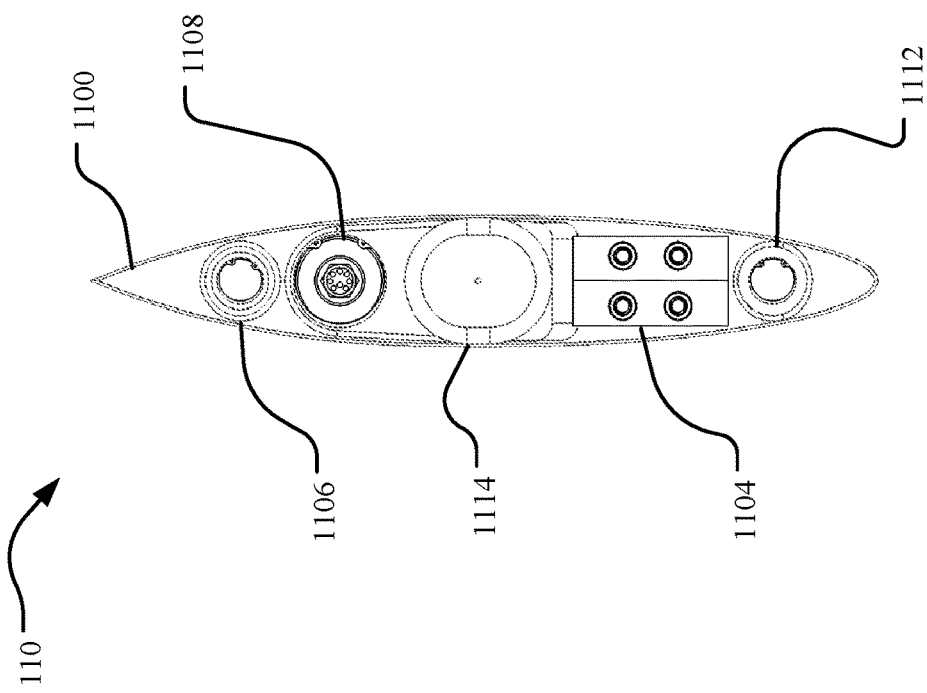
Figure 24B:
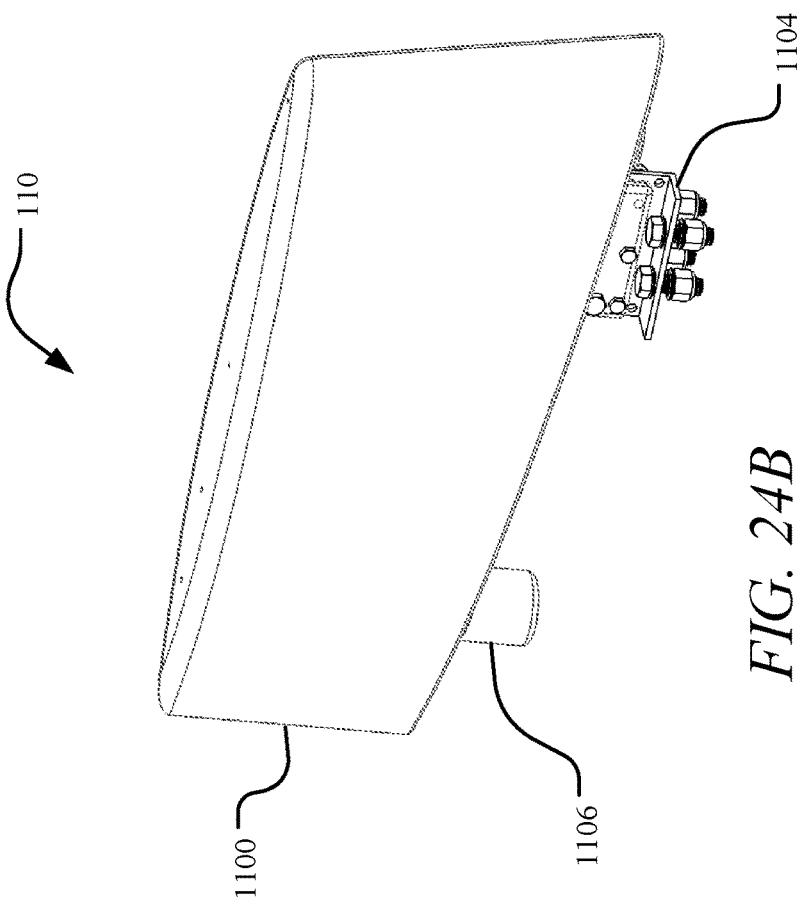
Figure 25:
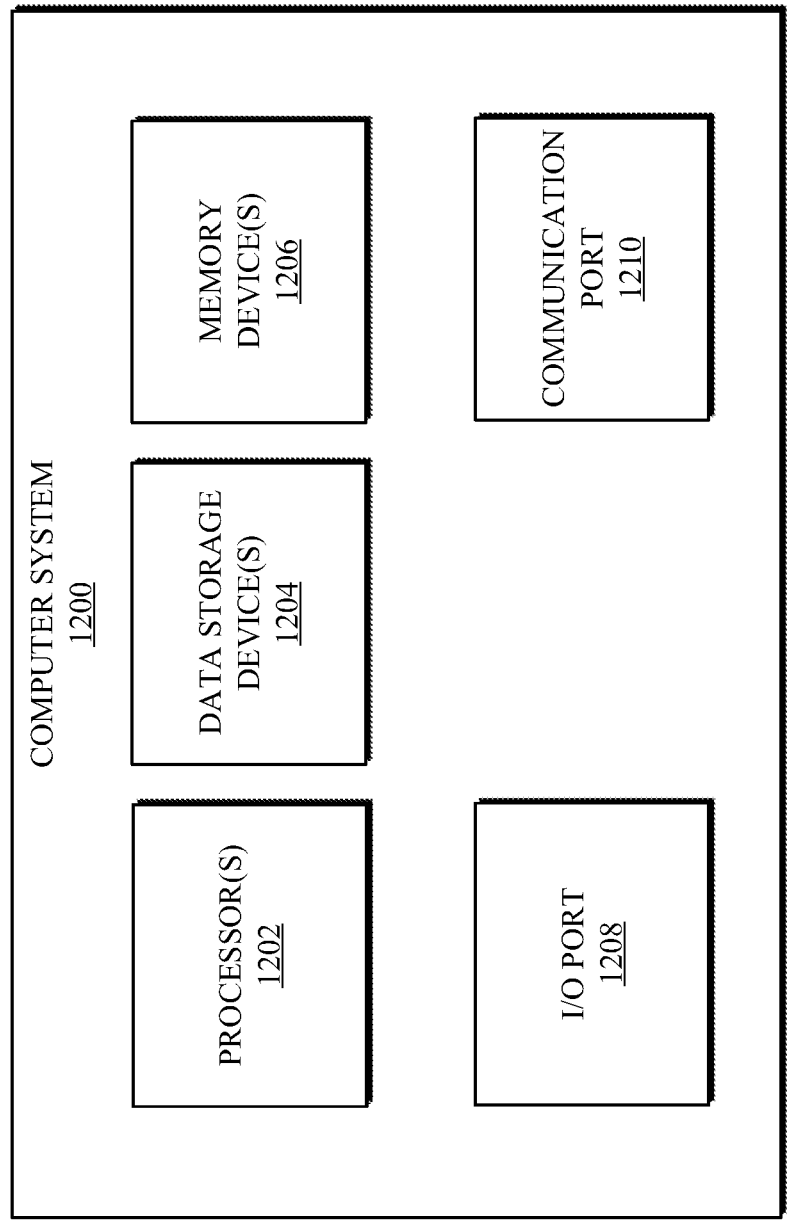
FIG. 25 is an example computing system that may implement various systems and methods of the presently disclosed technology.

Referring to FIGS. 20-21, an example of the architecture housing the low power pressure vessel is shown. In one implementation, the low power pressure vessel is disposed within the head interior 232. A head power bay 900 houses the first pressure vessel 418. The first pressure vessel 418 may be secured within the head power bay 900 using a clamp mounted to a power support 902. The power support 902 may be mounted to the power brace 622. The head interior 232 may further house the navigation system 426 and the emergency ascent control system 416, as well as other components.

As can be understood from FIGS. 20-22D, the nose 112 includes the tow system 424. In one implementation, the tow system 424 includes a tow plate 904, a tow point swivel 906, a tow mount 908, one or more extension springs 910, and a tow point 912. The tow point 912 is mounted to the tow plate 904, which moves between an extended and retracted position by pivoting about an axis formed by the tow point swivel 906. The tow mount 908 connects the tow point swivel 906 to the nose brace 408.

The extension springs 910 bias the tow point 912 into the retracted position, and the tow point 912 may move to the retracted position upon application of a force that overcomes the spring bias of the extension springs 910. As shown in FIGS. 22A-22D, when the tow point 912 is in the retracted position, the tow system 424 is entirely within the compliant surface of the drag skin 214 in the stow position. When the tow point 912 is in the extended position, the tow point 912 extends through the slits in the drag skin 214 and the tow system 424 is in the tow position.

The nose 114 thus minimizes drag while the tow system 424 is not in use, while facilitating access for tow and release. The nose 114 and the tow system 424: provide a swiveling tow point 912 for repeatable tow cycles in the underwater environment; utilize an entirely passive mechanism for extending and stowing the tow point 912; allow for access to install and remove the nose 114 from outside of the underwater vehicle 100; and reduces drag with minimized surface interruptions/features, among other benefits.

In one implementation, the tow point 912 moves between the retracted configuration and the extended configuration, providing tow angles from approximately 60 degrees above the horizontal to approximately 10 degrees below the horizontal. Accordingly, operators may attach and release tow lines to the tow system 424 without any reset action, thereby allows the underwater vehicle 100 to be towed between multiple sites without a need for recovery. The nose 114 has funnel feature to help bring a tow hook to the tow point 912 when attaching tow line. Thus, the underwater vehicle 100 may be easily towed when at the surface of the underwater environment and the tow point 912 is below the waterline.

Additionally, the tow system 424 resides entirely within the drag skin 214 while not in use and extends outside the drag skin 214 when the underwater vehicle 100 is under tow, thereby the nose 114 is low-drag when the underwater vehicle 100 is in operation and off-axis towing is provided when the tow point 912 is extended. The tow system 424 is passive and requires no actuation and will fail open (tow point accessible). Because the tow system 424 is spring-loaded and the tow point 912 will begin to swivel before the underwater vehicle 100 is under tow, the tow system 424 serves as a mechanical soft-start, reducing snap loads on the underwater vehicle 100.

The tow system 424 is externally accessible. To reduce external fasteners and surface interruptions, the nose 114 may be mounted to the underwater vehicle 100 last using the nose mount 218, with the operator accessing nose mount points through the compliant region in the drag skin 214 for tow access. By designing the nose 114 to have no external features and have the tow point 914 stowed when the underwater vehicle 100 is operation, vehicle drag is reduced and range is improved. Accordingly, the nose 114 is low drag, includes a compliant had-durometer cast material for impact damping, permits repeatable at-sea line attachment and removal, permits off-axis towing, does not require reset after use, is a passive extend and retract mechanism, fails open, relies on a tow drag of the underwater vehicle to extend the tow point 912, and permits easy installation, among other benefits.

Referring to FIGS. 23A-23G, a detailed description of the emergency ascent control system 416 is provided. The emergency ascent control system 416 is disposed relative to the port walls 236 of the port 122 within the port opening 238. In one implementation, the emergency ascent control system 416 includes a mount 1000 connected to the system support brace 612. One or more guides 1002 are positioned on the mount 1000. The guide 1002 is secured using a top retaining plate 1006 and a latch 1010. An ascent weight 1008 (e.g., a carbon steel rod having a 6 inch diameter and 9 inch length) is contained within the guide 1002. The ascent weights 1008 may be handled and installed into the underwater vehicle 100 using a magnetic installation tool.

An emergency actuator may maintain the ascent weights 1008 within the guides 1002 until triggered for release. A bottom retaining plate 1016 for each of the ascent weights 1008 is connected to a torsion spring assembly 1012 that opens when a pin 1018 is released in response to an emergency trigger, releasing the ascent weights 1008 through the port opening 238. A separator 1014 protects other components of the underwater vehicle 100 and ensures no interference from the other components during release.

The port walls 236 of the port 122 may include a port body 1022 extending between a proximal end 1028 and a distal end 1030. A port support 1024 may protrude upwardly from the port body 1022 towards the bottom retaining plate 1016, providing additional support to retain the ascent weights 1008 within the guides 1002 until release. The port support 1024 may extend from a mount 1026 to the distal end 1030. The port 122 may be mounted to the underwater vehicle 100 at the mount 1026 using the torsion spring assembly 1012, permitting the port walls 236 of the port 122 to open during release.

As can be understood from FIGS. 23A-23G, the emergency ascent control system 416 includes a set of redundant emergency ascent weights 1008 each capable of providing enough positive buoyancy to the underwater vehicle 100 in the event of a pressure vessel seal failure. Each of the ascent weights 1008 is associated with a firing mechanism having a subsea cable and bulkhead connector. Each firing mechanism contains redundant electrical signals. The firing mechanism releases the ascent weight 1008. Each of the ascent weights 1008 is enclosed in a system which includes a hatch door in the form of the poor walls 236 that is conformed to the lower hull of the fairing 200. The port 122 may be produced using additive manufacturing as described herein and allows the underwater vehicle 100 to maintain a low drag profile. The emergency actuator releases the port walls 236 and the bottom retaining plate 1016, allowing one or both of the ascent weights 1008 to drop out of the underwater vehicle 100 uninhibited.

The emergency actuator associated with one of the ascent weights 1008 may be triggered using the firing mechanism in response to an emergency trigger. The emergency trigger may be controlled using an emergency controller that makes logic based decisions on when to release one or more of the ascent weights 1008. In one implementation, the emergency controller receives input from various vehicle devices and uses voting logic to determine when to release the ascent weights 1008. The emergency controller may generate an audible alert providing a notification of an intent to release the ascent weights 1008.

In one implementation, the emergency controller accepts and executes a command to release the ascent weights 1008 or receives one or more inputs from vehicle systems and determines whether to release the ascent weights 1008. Each input may include a plurality of individual sub-inputs. The emergency logic controller uses a set of logic gates to establish a voting logic for a set of sub-inputs. The logic gates may determine a condition to release is satisfied when a majority of the three sub-inputs corresponding to vehicle components, such as vehicle systems and sensors, is activated. If a majority is reached, the emergency logic controller initiates a release of the ascent weighs 1008 through both of the redundant emergency ascent weight systems.

The inputs may include inputs designated as always enabled and inputs designated as sometimes enabled, and/or the like. The inputs designated as always enabled may be always accepted and will trigger the release of the ascent weight 1008 in response to a remote command or based on an autonomous decision. The remote command may be an acoustic command involving an acoustic modem of the underwater vehicle 100 receiving a signal from a remote transponder. The inputs designated as sometimes enabled will only be accepted if the enable pin is set active on the emergency logic controller, thereby preventing an inadvertent releasing of the ascent weights 1008. These inputs may correspond, without limitation, to a changeover board, a presence of low power distribution, a command from the vehicle controller, and/or the like. If the underwater vehicle 100 is operating on back-up battery power, the battery changeover board will set the input to active. Similarly, the low power distribution system associated with the first pressure vessel 418 has an active input to the emergency logic controller. In the event that the input switches to between states (e.g., switches to inactive), the emergency logic controller will initiate a release. Additionally, the vehicle controller can command one or more of the ascent weights 1008 to be fired either directly or through a digital input/output on the low power distribution board.

Turning to FIGS. 24A-24I, in one implementation, the communications mast 110 houses a communications system. The communications mast 110 includes a mast body 1100 that may be transparent or otherwise permit light transmission. The mast body 1100 may be mounted to a mount plate 1102 of the underwater vehicle 100 using a mast mount 1104. The mast body 1110 may be configured for low cost rapid manufacturing and reducing drag with a low drag profile. The mast body 1100 may be a cast molded polyurethane part, which may be initially created using rapid additive manufacturing, as described herein. The part is then used to make a soft silicone mold, enabling rapid reproduction of the initial blank.

The mast body 1100 may include one or more cavities for housing components of the communications system, including a first WiFi communications link 1006, a location beacon 1108, a cable 1110, a second WiFI communications link 1112, and a radio communication sensor 1114, which may include an omnidirectional transceiver. The location beacon 1108 may provide Iridium satellite communication and GPS updates, as well as include a strobe light transmissible through the mast body 1100 for visually locating the underwater vehicle 100 in the underwater environment.

The communications system of the communications mast 110 may provide 900 MHz radio with the radio communication sensor 1114 and 2.4 GHz WiFi with the WiFi communications links 1006 and 1112 available at the surface of the underwater environment. The communication system may include 2-way iridium messaging, an acoustic communications and position updates system (e.g., sending both supervision messages and position updates during a mission) using the location beacon 1108. The cable 1110 may be an Ethernet available through a wet-mate connector that is accessible from an external vehicle interface.

Figure 12:
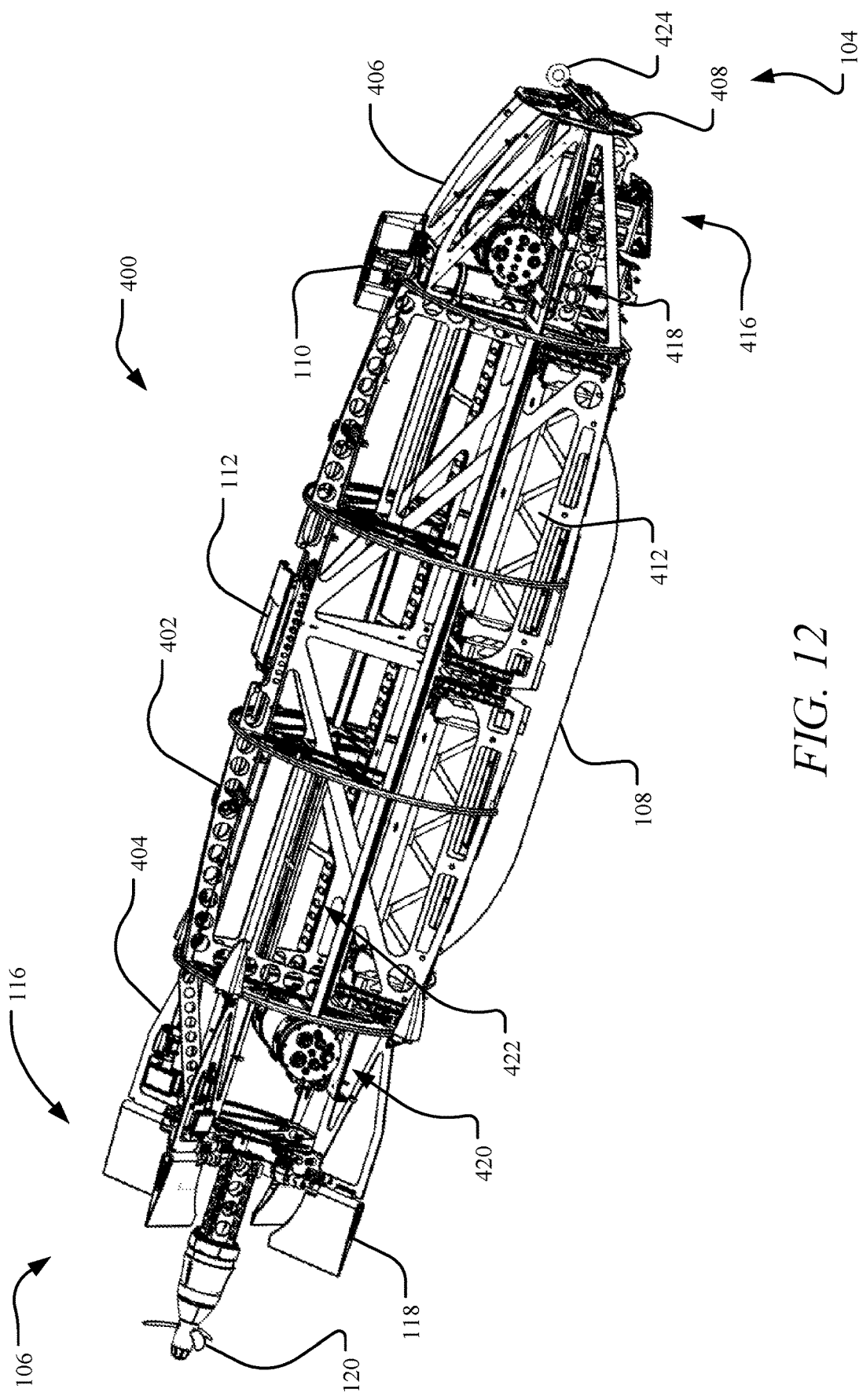
FIG. 12 depicts a side perspective view of the interior of the underwater vehicle with the floatation system removed.
Figure 13:
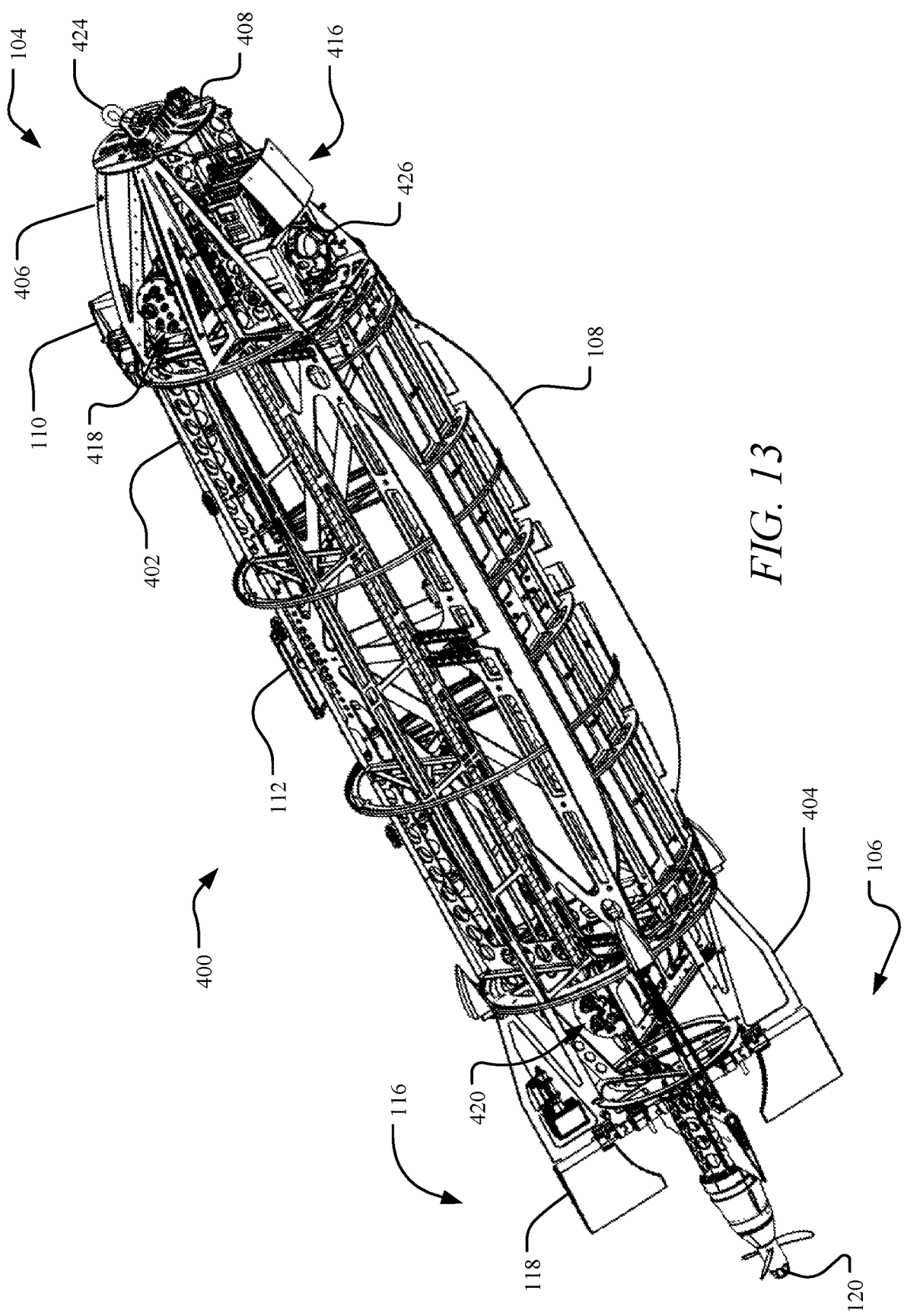
FIG. 13 depicts a bottom perspective view of the interior of the underwater vehicle with the floatation system removed.
Figure 14A:
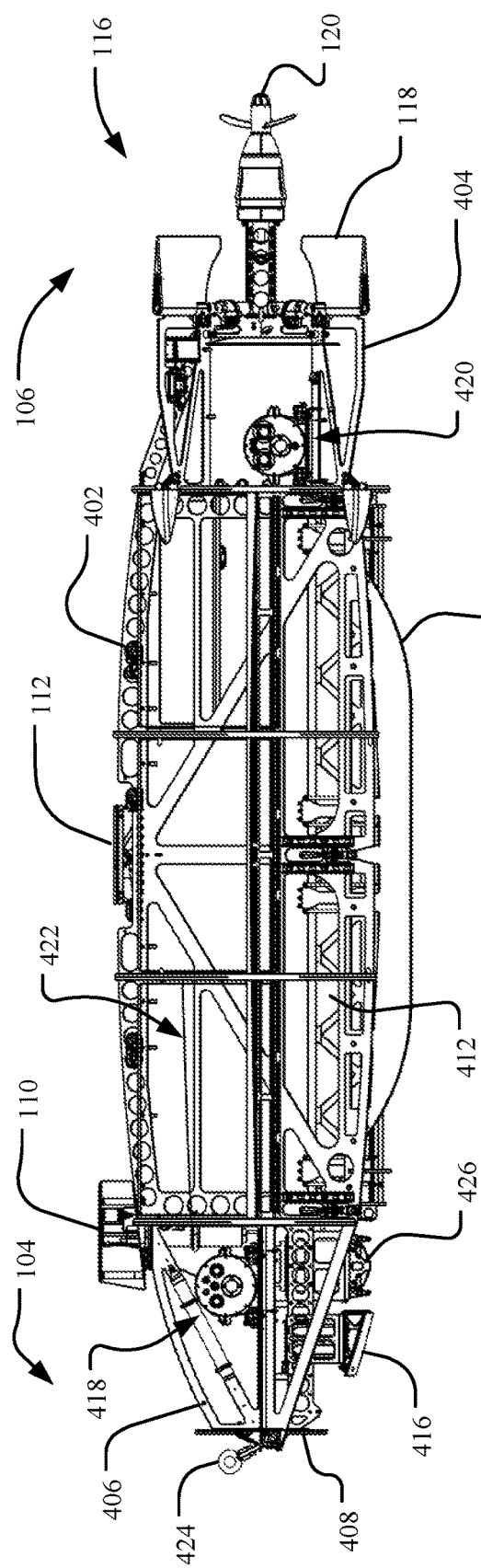
FIGS. 14A, 14B, 14C, 14D, 14E, and 14F show a side view, a side view, a top view, a bottom view, a back view, and a front view, respectively, of the interior of the underwater vehicle with the floatation system removed.
Figure 14B:
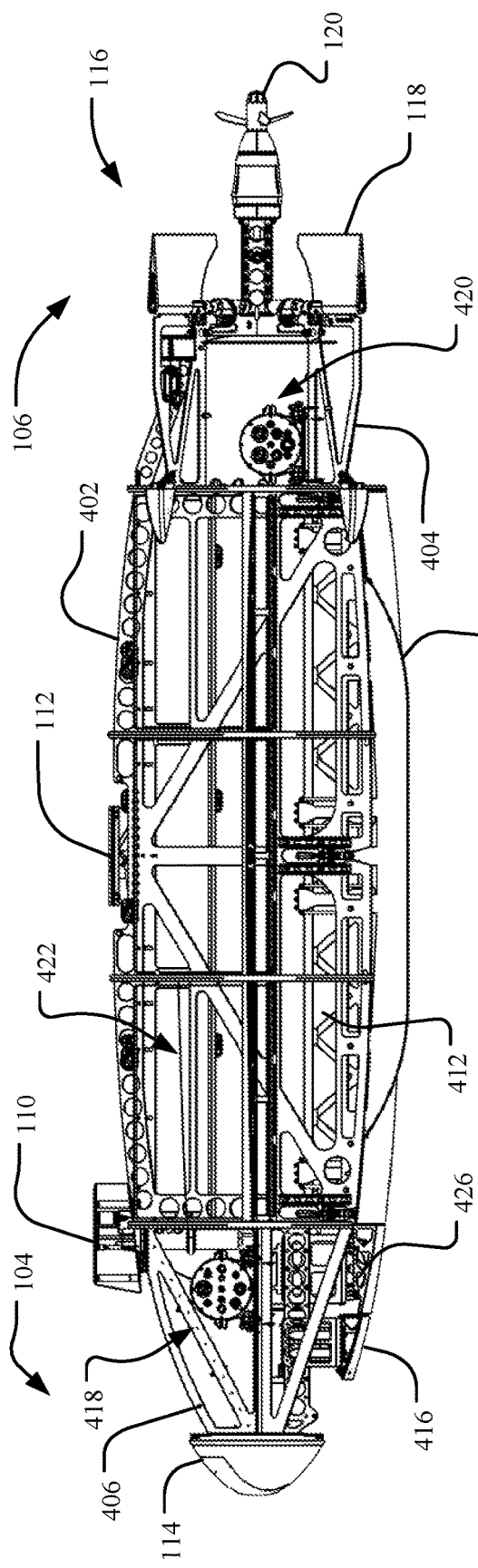
Figure 14C:
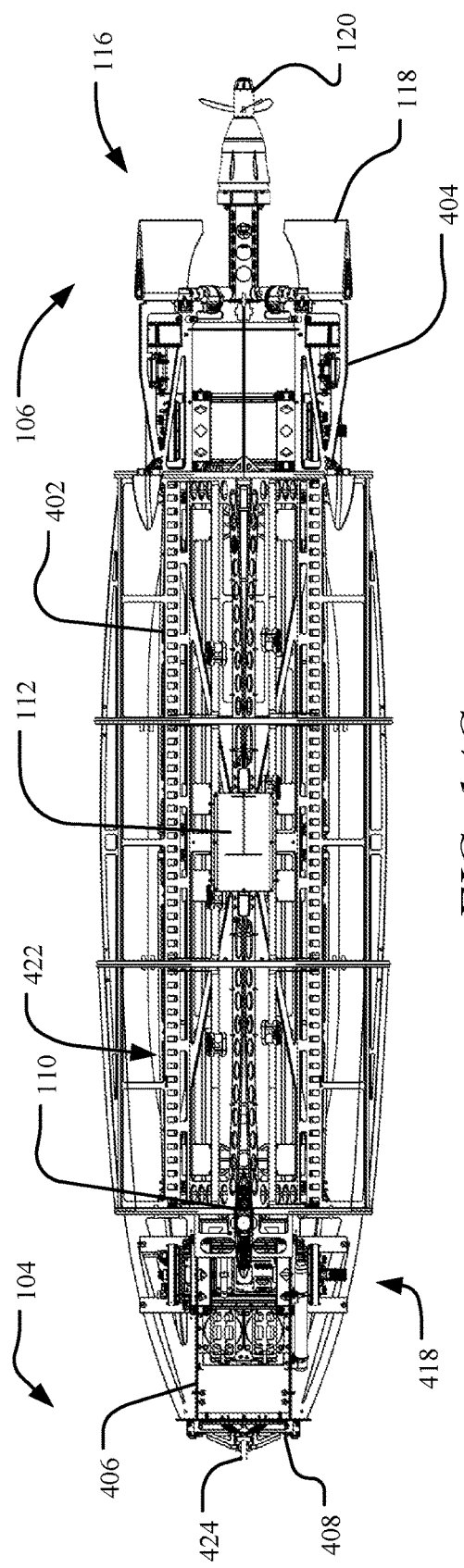
Figure 14D:
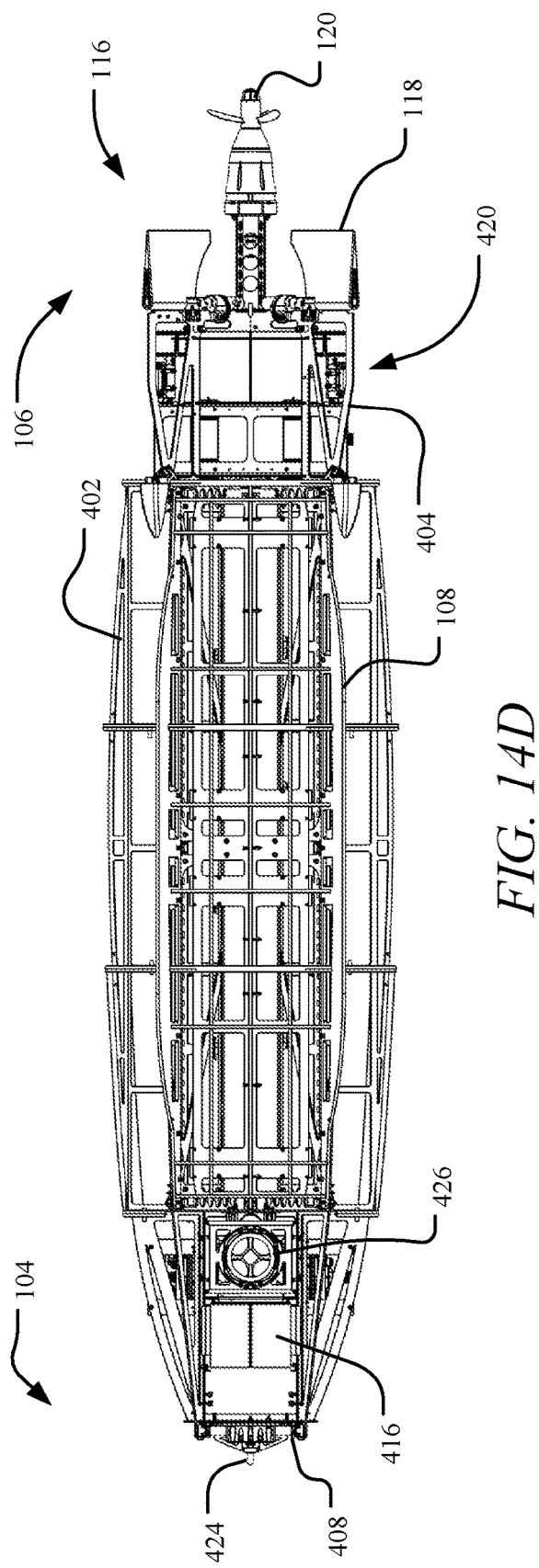
Figure 14F:
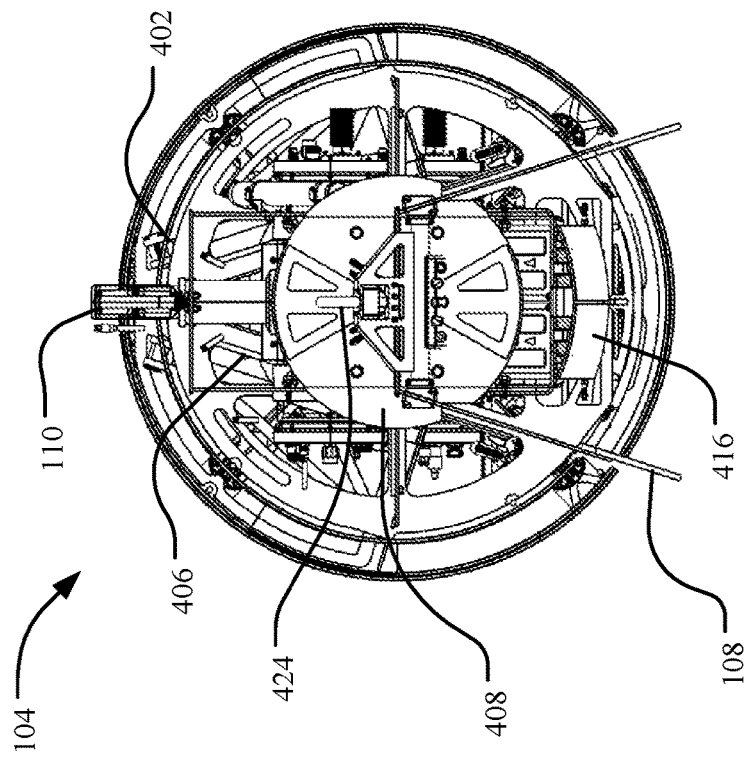
Figure 14E:
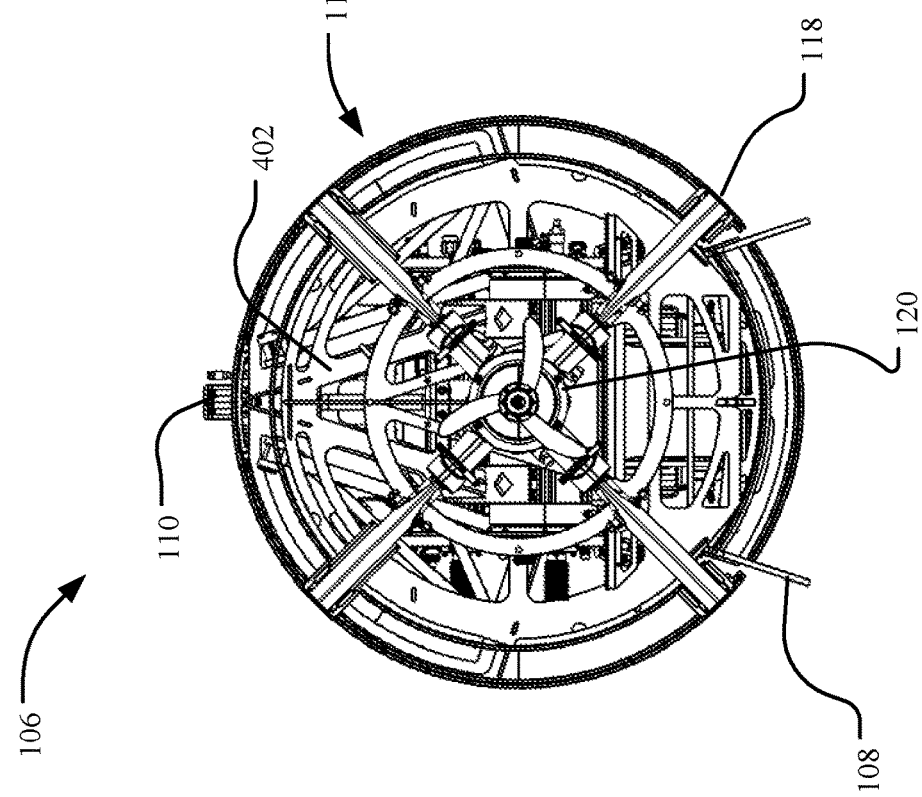

Referring to FIG. 12, a detailed description of an example computing system 1200 having one or more computing units that may implement various systems and methods discussed herein is provided. The computing system 1200 may be applicable to the vehicle controller, the emergency logic controller, the controller of the additive manufacturing system, the operator system, and other computing systems, controller, and/or network devices or units. It will be appreciated that specific implementations of these devices may be of differing possible specific computing architectures not all of which are specifically discussed herein but will be understood by those of ordinary skill in the art.

The computer system 1200 may be a computing system is capable of executing a computer program product to execute a computer process. Data and program files may be input to the computer system 1200, which reads the files and executes the programs therein. Some of the elements of the computer system 1200 are shown in FIG. 12, including one or more hardware processors 1202, one or more data storage devices 1204, one or more memory devices 1206, and/or one or more ports 1208-1210. Additionally, other elements that will be recognized by those skilled in the art may be included in the computing system 1200 but are not explicitly depicted in FIG. 12 or discussed further herein. Various elements of the computer system 1200 may communicate with one another by way of one or more communication buses, point-to-point communication paths, or other communication means not explicitly depicted in FIG. 12.

The processor 1202 may include, for example, a central processing unit (CPU), a microprocessor, a microcontroller, a digital signal processor (DSP), and/or one or more internal levels of cache. There may be one or more processors 1202, such that the processor 1202 comprises a single central-processing unit, or a plurality of processing units capable of executing instructions and performing operations in parallel with each other, commonly referred to as a parallel processing environment.

The computer system 1200 may be a conventional computer, a distributed computer, or any other type of computer, such as one or more external computers made available via a cloud computing architecture. The presently described technology is optionally implemented in software stored on the data stored device(s) 1204, stored on the memory device(s) 1206, and/or communicated via one or more of the ports 1208-1210, thereby transforming the computer system 1200 in FIG. 12 to a special purpose machine for implementing the operations described herein. Examples of the computer system 1200 include personal computers, terminals, workstations, mobile phones, tablets, laptops, personal computers, multimedia consoles, gaming consoles, set top boxes, and the like.

The one or more data storage devices 1204 may include any non-volatile data storage device capable of storing data generated or employed within the computing system 1200, such as computer executable instructions for performing a computer process, which may include instructions of both application programs and an operating system (OS) that manages the various components of the computing system

1200. The data storage devices 1204 may include, without limitation, magnetic disk drives, optical disk drives, solid state drives (SSDs), flash drives, and the like. The data storage devices 1204 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1206 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1204 and/or the memory devices 1206, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 1200 includes one or more ports, such as an input/output (I/O) port 1208, a communication port 1210, and a vehicle subsystems port, for communicating with other computing, network, or vehicle devices. It will be appreciated that the ports 1208-1210 may be combined or separate and that more or fewer ports may be included in the computer system 1200.

The I/O port 1208 may be connected to an I/O device, or other device, by which information is input to or output from the computing system 1200. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 1200 via the I/O port 1208. Similarly, the output devices may convert electrical signals received from computing system 1200 via the I/O port 1208 into signals that may be sensed as output by a human, such as sound, light, and/or touch. The input device may be an alphanumeric input device, including alphanumeric and other keys for communicating information and/or command selections to the processor 1202 via the I/O port 1208. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touch-screen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 1200 via the I/O port 1208. For example, an electrical signal generated within the computing system 1200 may be converted to another type of signal, and/or vice-versa. In one implementation, the environment transducer devices sense characteristics or aspects of an environment local to or remote from the computing device 1200, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 1200, such as, physical movement of some object (e.g., a mechanical actuator), heating or cooling of a substance, adding a chemical substance, and/or the like.

In one implementation, a communication port 1210 is connected to a network by way of which the computer system 1200 may receive network data useful in executing the methods and systems set out herein as well as transmitting information and network configuration changes determined thereby. Stated differently, the communication port 1210 connects the computer system 1200 to one or more communication interface devices configured to transmit and/or receive information between the computing system 1200 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 1210 to communicate one or more other machines, either directly over a point-to-point communication path, over a wide area network (WAN) (e.g., the Internet), over a local area network (LAN), over a cellular (e.g., third generation (3G) or fourth generation (4G) or fifth generation (5G)) network, or over another communication means. Further, the communication port 1210 may communicate with an antenna for electromagnetic signal transmission and/or reception. In some examples, an antenna may be employed to receive GPS data to facilitate determination of a location of a machine, vehicle, or another device.

The computer system 1200 may include a vehicle subsystems port for communicating with one or more systems related to the underwater vehicle 100 to control an operation of the underwater vehicle 100 and/or exchange information between the computer system 1200 and one or more subsystems of the underwater vehicle 100.

In an example implementation, mission planning data, diagnostics, mission data, and software and other modules and services for operating various aspects of the underwater vehicle 100 in connection with underwater exploration and operation may be embodied by instructions stored on the data storage devices 1204 and/or the memory devices 1206 and executed by the processor 1202. The computer system 1200 may be integrated with or otherwise form part of a vehicle. In some instances, the computer system 1200 is a portable device that may be in communication and working in conjunction with various systems or sub-systems of a vehicle.

The system set forth in FIG. 12 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An underwater vehicle comprising:
   a frame extending from a proximal end to a distal end;
   a fairing at least partially covering the frame; and
   a wall of the fairing, the wall having a single-bead thickness, the wall being configured for deployment in an underwater environment.

2. The underwater vehicle of claim 1, wherein the wall is manufactured using additive manufacturing.

3. The underwater vehicle of claim 1, wherein the wall has a bead-width to bead-height aspect ratio of at least 3:1.

4. The underwater vehicle of claim 1, wherein the wall is free from air voids.

5. The underwater vehicle of claim 1, wherein the wall is pressure tolerant, such that the fairing is configured to withstand a hydrostatic pressure in the underwater environment.

6. The underwater vehicle of claim 1, wherein the fairing is formed from a plurality of portions.

7. The underwater vehicle of claim 1, wherein the wall has a bead height that is less than a bead thickness.

8. The underwater vehicle of claim 1, wherein the wall includes an exterior surface that is smoothed using at least one smoothing technique.

9. The underwater vehicle of claim 8, wherein the at least one smoothing technique includes one or more of: application of an additive coating; chemical smoothing; and mechanical smoothing.

10. The underwater vehicle of claim 9, wherein the additive coating is one or more of a polymer, epoxy, urethane, and high-build primer.

11. The underwater vehicle of claim 9, wherein the chemical smoothing is performed using a solvent.

12. The underwater vehicle of claim 9, wherein the mechanical smoothing includes one or more of sanding or machining.

13. The underwater vehicle of claim 1, wherein the fairing is manufactured according to a customized fairing model.

14. The underwater vehicle of claim 1, wherein the fairing is made from at least one of glass fiber reinforced acrylonitrile butadiene styrene (ABS) material, carbon fiber reinforced ABS material, carbon fiber reinforced polycarbonate (PC) material, fiberglass epoxy composite, or carbon fiber epoxy composite.

15. An underwater vehicle comprising:
   a head fairing disposed at a proximal end;
   a tail fairing disposed at a distal end; and
   a body fairing disposed between the head fairing and the tail fairing to form a fairing enclosing an interior, the fairing including a wall, the wall having a single-bead thickness configured for deployment in an underwater environment.

16. The underwater vehicle of claim 15, wherein the body fairing includes a proximal body fairing, a middle body fairing, and a distal body fairing.

17. The underwater vehicle of claim 15, wherein the head fairing, the tail fairing, and the body fairing are separate portions.

18. The underwater vehicle of claim 15, further comprising:
   a nose fairing disposed at a head proximal end of the head fairing.

19. The underwater vehicle of claim 15, further comprising:
   a thruster fairing disposed at a tail distal end of the tail fairing.

* * * * *